United States Patent
Ishii (12)

(10) Patent No.: US 8,424,625 B2
(45) Date of Patent: Apr. 23, 2013

(54) TRANSAXLE

(75) Inventor: Norihiro Ishii, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 700 days.

(21) Appl. No.: 12/704,647

(22) Filed: Feb. 12, 2010

(65) Prior Publication Data

US 2010/0206649 A1 Aug. 19, 2010

(30) Foreign Application Priority Data

Feb. 13, 2009 (JP) .................... 2009-031960
Mar. 6, 2009 (JP) .................... 2009-053976

(51) Int. Cl.
*B60K 17/12* (2006.01)
(52) U.S. Cl.
USPC ................... 180/65.31; 180/65.51
(58) Field of Classification Search ........... 180/65.31, 180/65.51, 65.285, 65.6, 242, 245, 248; 310/156.35; 475/5; 477/3
See application file for complete search history.

(56) References Cited

U.S. PATENT DOCUMENTS

| | | | |
|---|---|---|---|
| 3,931,535 A * | 1/1976 | Roesel, Jr. .................... 310/113 |
| 4,488,053 A * | 12/1984 | Cronin .......................... 290/4 C |
| 4,596,119 A * | 6/1986 | Johnson ........................... 60/407 |
| 5,562,565 A * | 10/1996 | Moroto et al. .................... 477/3 |
| 6,062,330 A * | 5/2000 | Watson et al. ................. 180/248 |
| 6,378,638 B1 * | 4/2002 | Mizon et al. ................. 180/65.6 |
| 6,612,163 B2 * | 9/2003 | Kamiyama et al. ......... 73/116.01 |
| 6,732,827 B2 * | 5/2004 | San Miguel .................. 180/242 |
| 6,877,578 B2 * | 4/2005 | Krzesicki et al. ............. 180/243 |
| 7,262,579 B1 * | 8/2007 | Shepard ........................ 318/810 |
| 7,311,184 B2 * | 12/2007 | Patridge .......................... 192/16 |
| 7,533,747 B2 * | 5/2009 | Heinen ...................... 180/65.51 |

(Continued)

FOREIGN PATENT DOCUMENTS

| JP | 59-144388 | 8/1984 |
|---|---|---|
| JP | 01-291716 | 11/1989 |

(Continued)

OTHER PUBLICATIONS

European Search Report Search Opinion for European Application No. EP10153133.3, dated Jun. 22, 2010, 6 pages.

(Continued)

*Primary Examiner* — Katy M Ebner
*Assistant Examiner* — Brodie Follman
(74) *Attorney, Agent, or Firm* — Sterne, Kessler, Goldstein & Fox P.L.L.C.

(57) ABSTRACT

A transaxle includes an axle and a multiple motor generator unit for driving the axle. The multiple motor generator unit includes a common rotor shaft drivingly connected to the axle, armature windings serving as a first stator and a second stator aligned opposite each other in the axial direction of the rotor shaft, a common rotor member fixed on the rotor shaft, and permanent magnets provided on the common rotor member so as to serve as a first rotor facing the first stator, and as a second rotor facing the second stator. The first stator and the first rotor constitute a first motor generator. The second stator and the second rotor constitute the second motor generator. A total motor output torque of the first and second motor generators for rotating the rotor member and the rotor shaft can be changed in correspondence to a load applied from the axle to the rotor shaft.

20 Claims, 39 Drawing Sheets

U.S. PATENT DOCUMENTS

| | | | |
|---|---|---|---|
| 7,597,169 B2 * | 10/2009 | Borroni-Bird et al. | 180/253 |
| 8,191,342 B2 * | 6/2012 | Ishii et al. | 56/11.9 |
| 2001/0051557 A1 * | 12/2001 | Kawada et al. | 475/248 |
| 2001/0054321 A1 * | 12/2001 | Kamiyama et al. | 73/862.191 |
| 2003/0141129 A1 * | 7/2003 | Miguel | 180/242 |
| 2005/0029026 A1 * | 2/2005 | Heinen | 180/65.5 |
| 2006/0087185 A1 * | 4/2006 | Patridge | 310/92 |
| 2007/0084664 A1 | 4/2007 | Beck et al. | |
| 2007/0188125 A1 * | 8/2007 | Shepard | 318/778 |
| 2008/0121443 A1 * | 5/2008 | Clark et al. | 180/65.1 |
| 2008/0234096 A1 * | 9/2008 | Joshi et al. | 477/3 |
| 2009/0050384 A1 * | 2/2009 | Muller et al. | 180/65.21 |
| 2009/0312136 A1 * | 12/2009 | Perakes et al. | 475/204 |
| 2010/0236845 A1 * | 9/2010 | Ishii et al. | 180/65.6 |
| 2011/0271794 A1 * | 11/2011 | Hinds | 74/665 F |

FOREIGN PATENT DOCUMENTS

| | | |
|---|---|---|
| JP | 9-205703 | 8/1997 |
| JP | 2001-095341 | 4/2001 |
| JP | 2002-147596 | 5/2002 |
| JP | 2003-191760 | 7/2003 |
| JP | 2004-190615 | 7/2004 |
| JP | 2005-012900 | 1/2005 |
| JP | 2006-194257 | 7/2006 |
| JP | 2006-520299 | 9/2006 |
| JP | 2008-131684 | 6/2008 |
| JP | 2008-259302 | 10/2008 |
| JP | 2009-038871 | 2/2009 |
| JP | 2009-038934 | 2/2009 |
| JP | 2009-047223 | 3/2009 |

OTHER PUBLICATIONS

Office Action in corresponding Japanese Application No. 2009-053976, mailed Feb. 5, 2013, 4 pages, with 3-page English translation Summary.

* cited by examiner

TRANSAXLE

BACKGROUND OF THE INVENTION

1. Field of the Invention

The present invention relates to transaxles, each of which includes an axle and a motor for driving the axle and has a function to change rotary speed or torque of the axle. A wheel hub drive unit to be attached to a hub of a single wheel serves as one of the transaxles. The wheel hub drive unit is integrally provided with a single axle to be drivingly connected to the wheel, and with a motor for driving the axle. The wheel hub drive unit is further integrally provided with a mechanical speed changing transmission, such as a gear transmission, interposed between the motor and the axle so as to change the rotary speed or torque of the axle. Additionally or alternatively, the wheel hub drive unit is provided with a plurality of motor generators serving as the motor so that the motor generators output variable torque for changing the rotary speed or torque of the axle. Another transaxle is provided with a pair of axles to be connected to respective drive wheels of a vehicle, and is provided with a plurality of motor generators serving as the motor so that the motor generators output variable torque for changing the rotary speed or torque of the axles. These transaxles are adaptable to a vehicle, especially, a working vehicle such as a lawn mower.

2. Related Art

As disclosed in Japanese Patent No. 3584106 (hereinafter, "Reference 1"), Japanese Laid-Open Gazette No. 2002-147596 (hereinafter, "Reference 2"), and U.S. Publication No. 2007/0084664 (hereinafter, "Reference 3"), there exists a well-known and conventional wheel hub drive unit, which is one type of transaxle, attached onto a hub of each of the drive wheels of a vehicle. The wheel hub drive unit includes an axle serving as a center axis of the wheel, a motor for driving the axle, and a high/low speed changing transmission, such as a gear transmission, interposed between the motor and the axle.

Each of the wheel hub drive units disclosed in References 1 and 2 is entirely expanded radially with respect to the axle because a motor output shaft of the motor and the axle are not coaxial, but rather are parallel to each other. A high speed gear train and a low speed gear train are interposed between the motor output shaft and the axle so as to serve as the high/low speed changing transmission.

Conversely, in the wheel hub drive unit disclosed in Reference 3, a rotary axis of the motor and the axle (spindle) are coaxial to each other so as to minimize the wheel hub drive unit radially with respect to the axle. Therefore, a hub casing of the wheel hub drive unit, fixed to a vehicle body, is disposed in a rim of the drive wheel of the vehicle, while the hub casing incorporates the entire motor and all components for transmitting power from the motor to the axle. The motor is an electric motor whose stator is fixed to the hub casing. A rotor serving as an output rotary member of the motor is fixed onto the spindle so as to be disposed between the spindle and the hub casing therearound.

Further, the wheel hub drive unit of Reference 3 includes a planetary gear mechanism serving as the speed changing transmission interposed between the motor and the axle. The planetary gear mechanism has a sun gear fixed on the spindle, and has a planetary gear carrier engaging with the rotor so as to be rotatably integral with the rotor. The spindle has a center axial hole into which a shift drum is inserted and is driven by another motor so as to axially move in the hole. The planetary gear mechanism has a ring gear. A ring gear clutch member (dog ring) is fitted to the hub casing axially slidable and unrotatable relative to the hub casing so as to selectively engage or disengage with and from the ring gear, and interlocks with a first shift lever pressed against the shift drum. On the other hand, a carrier clutch member (dog ring) is fitted to the sun gear axially slidable and unrotatable relative to the sun gear so as to selectively engage or disengage with and from the planetary gear carrier, and interlocks with a second shift lever pressed against the shift drum. The axial movement of the shift drum changes rotational positions of the respective first and second shift levers, thereby controlling the engagement and disengagement of the ring gear with and from the hub casing and the engagement and disengagement of the planetary gear carrier with and from the sun gear.

When the shift drum is disposed at its high speed position, the ring gear disengages from the hub casing, and meanwhile, the planetary gear carrier engages with the sun gear, thereby locking the rotor to the axle (spindle). Therefore, the axle is rotated at the same speed as the rotor. When the shift drum is disposed at its low speed position, the ring gear engages with the hub casing, and meanwhile, the planetary gear carrier disengages from the sun gear, so that the sun gear rotates planetary gears against the ring gear so as to rotate the axle slower than the rotor. When the shift drum is disposed at its neutral position, the ring gear disengages from the hub casing, and the planetary gear carrier disengages from the sun gear, thereby making the axle rotatable freely from the rotor.

Another conventional wheel hub drive unit, as disclosed in Japanese Laid-Open Gazette No. 2006-194257 (hereinafter, "Reference 4"), includes a plurality of motors which are independently controlled to change their output torque so as to change rotary speed or torque of the axle. Each of the motors includes exclusive stator and rotor, while the motors share a common rotor shaft, serving as a center axis of a drive wheel, and are aligned opposite to each other in the axial direction of the rotor shaft. More specifically, in the wheel hub drive unit shown in Reference 4, a first motor includes a first rotor and a first stator, a second motor includes a second rotor and second stator, and the first and second motors share a common rotor shaft serving as a common rotary axis of the first and second rotors, and are aligned opposite to each other in the axial direction of the rotor shaft. The first and second rotors are disposed to face the respective first and second stators. When at least one of the first and second stators is supplied with electric power, the corresponding first or second rotor facing the stator supplied with electric power is rotated, so that the rotary force of the rotating rotor is transmitted to the common rotor shaft. In this way, while the first and second motors are individually supplied with electric power to their respective stators, torques outputted from the respective motors are totaled, and the total torque rotates the common rotor shaft for driving the axle.

Further, in the wheel hub drive unit shown in Reference 4, while the first rotor is fixed onto the rotor shaft, the second rotor is rotatable relative to the rotor shaft, and is axially slidable along the rotor shaft. The relative rotation of the first and second rotors is converted into the axial slide of the second rotor relative to the first rotor, thereby applying a brake for braking the rotor shaft. Further, the second rotor can be rotated opposite to the rotation direction of the first rotor so as to brake the rotor shaft. The first motor is a motor generator which can regenerate electric power from the first stator when its first rotor receives rotary force of the axle. The second rotor is biased axially toward the first rotor by a spring so as to be initially rotatable integrally with the first rotor. Thus, the first motor can function as a regenerator only when its first rotor is rotatably integral with the second rotor due to the biasing force of the spring.

SUMMARY OF THE INVENTION

Regarding the wheel hub drive unit including the speed changing transmission interposed between the motor and the axle, the coaxial arrangement of the rotary axis of the motor and the axle as disclosed in Reference 3 is desirable for minimizing the wheel hub drive unit, i.e., for avoiding expansion of the wheel hub drive unit radially with respect to the axle so as to enable the wheel hub drive unit to be accommodated in a rim of the wheel. In this regard, the wheel hub drive unit disclosed in Reference 3 includes the only one planetary gear mechanism (i.e., only one sun gear and only one ring gear) to be interposed among the hub casing, the rotor and the axle. However, the dog rings, serving as the ring gear clutch member and the carrier clutch member, have to be interposed between the ring gear and the hub casing, and between the planetary gear carrier and the sun gear, respectively. In this way, the clutch members, the first and second shift levers interlocking with the respective clutch members, and the shift drum inserted into the spindle serving as the axle constitute a complicated shift mechanism for shifting the planetary gear mechanism serving as the speed changing transmission between a high speed state and a low speed state.

In other words, the shift mechanism has to be minute and complicated so as to increase costs because it has to realize rotational positions of the first and second shift levers corresponding to the respective high-speed, low-speed and neutral positions of the shift drum so as to achieve the above-mentioned engagement/disengagement states of the ring gear clutch member with or from the ring gear and of the carrier clutch member with or from the planetary gear carrier. For example, the shift drum must be accurately shaped, and positions of the first and second shift levers relative to the shift drum must be accurate, so as to properly press the first and second shift levers against the shift drum.

A first object of the invention is to provide a minimized, simplified and economized transaxle including an axle, a motor having a motor output shaft extended coaxially to the axle, and a speed changing planetary gear transmission for transmitting power from the motor output shaft to the axle, wherein the transaxle is adaptable as a wheel hub drive unit whose axle is connected to a hub of each drive wheel of a vehicle.

To achieve the first object, a transaxle according to the invention comprises an axle, a motor having a motor output shaft extended coaxially to the axle, and a speed changing planetary gear transmission for transmitting power from the motor output shaft to the axle. The speed changing gear transmission includes a carrier serving as an output member for outputting power to the axle, a high speed gear train, a low speed gear train, and a shifter. The high speed gear train includes a high speed sun gear and a high speed planetary gear. The high speed sun gear is provided on the motor output shaft so as to be rotatable relative to the motor output shaft, and the high speed planetary gear is pivoted on the carrier. The low speed gear train includes a low speed sun gear and a low speed planetary gear. The low speed sun gear is provided on the motor output shaft so as to be rotatable relative to the motor output shaft, and the low speed planetary gear is pivoted on the carrier. The shifter is provided on the motor output shaft so as to be axially slidable on the motor output shaft and be unrotatable relative to the motor output shaft. The shifter is shiftable between a high speed position for transmitting power from the motor output shaft to the high speed gear train and a low speed position for transmitting power from the motor output shaft to the low speed gear train according to its axial sliding on the motor output shaft. The shifter and at least one of the high and low sun gears are engageable with each other, so that, when the shifter is disposed at one of the high and low speed positions, the at least one of the high and low sun gears engages with the shifter so as to receive power from the motor output shaft.

Therefore, due to the coaxial arrangement of the motor output shaft with the axle, the transaxle is minimized in the radial direction of the motor output shaft and the axle so as to be adaptable as a wheel hub drive unit. While the speed changing planetary gear transmission includes two speed gear trains, i.e., the high and low speed gear trains, for transmitting power from the motor output shaft to the carrier, the only shifter serves as a member axially slidable along the motor output shaft so as to constitute a shift mechanism for selecting whether the high or low speed gear train transmits power from the motor output shaft to the axle, i.e., for selecting either a high or low speed state of the speed changing planetary gear transmission. Further, due to the axial sliding of the shifter on the motor output shaft and the arrangement of the high and low sun gears on the motor output shaft, to constitute the shift mechanism for realizing the high or low speed state of the speed changing planetary gear transmission by the engagement of the shifter with the at least one of the high and low speed sun gears, only the shifter and the at least one of the high and low sun gears need to be formed to have a structure for engaging with each other, however, the structure can be simple, e.g., a slidable key and a key groove or spline-teeth. In this way, the shift mechanism of the transaxle adaptable as the wheel hub drive unit according to the present invention is simplified and economized in comparison with the complicated shift mechanism of the conventional wheel hub drive unit disclosed in Reference 3 including three slidable members, i.e., the shift drum and both the clutch members, whose respective slide positions have to be set to realize each of the high and low speed states of the speed changing transmission.

Preferably, the high speed planetary gear and the low speed planetary gear are provided on a common planetary gear member pivoted on the carrier. Therefore, the number of components for providing the high and low speed planetary gears is reduced. Further, rotational angle deviation between the high and low speed planetary gears does not have to be considered when the shifter is shifted between the high and low speed positions, thereby simplifying control of the shifter.

Preferably, in a first aspect of the transaxle, both the high and low speed sun gears are engageable with the shifter, so that the shifter, when being disposed at the high speed position, engages with the high speed sun gear so as to be unrotatable relative to the high speed sun gear, and disengages from the low speed sun gear so as to be rotatable relative to the low speed sun gear, and so that the shifter, when being disposed at the low speed position, engages with the low speed sun gear so as to be unrotatable relative to the low speed sun gear, and disengages from the high speed sun gear so as to be rotatable relative to the high speed sun gear. Therefore, as a result of the axial sliding of the shifter on the motor output shaft and the arrangement of both the high and low sun gears on the motor output shaft, to constitute the shift mechanism for realizing each of the high and low speed states of the speed changing planetary gear transmission by the engagement of the shifter with the corresponding high or low speed sun gear, only the shifter and each of the high and low sun gears need to be formed to have a structure for engaging with each other. However, the structure can be simple, e.g., a slidable key and a key groove or spline-teeth. In other words, the shift mechanism constituted by the shifter can be simplified regardless of whether it realizes the high or low state of the speed changing planetary gear transmission. In this way, the transaxle is simplified and economized.

In the first aspect, in some embodiments, the shifter is further shiftable to a neutral position according to its axial sliding on the motor output shaft, so that the shifter, when being disposed at the neutral position, disengages from both the high and low speed sun gears so as to isolate both the high and low speed gear trains from power of the motor output shaft. Therefore, the transaxle can be set in a neutral state of the speed changing planetary gear transmission when shifting between the high speed state and the low speed state. This neutral state can be realized only by sliding the shifter to the neutral position to disengage from both the high and low sun gears. In other words, the simple shift mechanism constituted by the shifter can realize any of the high, low and neutral states of the speed changing planetary gear transmission. In this way, the transaxle is simplified and economized.

Further, in some embodiments, the shifter is automatically controlled to be held on standby at the neutral position when shifting between the high speed position and the low speed position. Further, in some embodiments, the standby of the shifter at the neutral position is maintained until rotation of the motor output shaft becomes synchronous to rotation of the high or low speed sun gear corresponding to the target high or low speed position. Therefore, the transaxle is prevented from causing a sudden shocking change of traveling speed of a vehicle or a sudden damaging load on the motor when the shifter is engaging with the sun gear.

Alternatively, in some embodiments, in a second aspect of the transaxle, the shifter and the high speed sun gear are engageable with each other, and an overrunning clutch is interposed between the low speed sun gear and the motor output shaft, so that when the shifter is disposed at the high speed position, the shifter engages with the high speed sun gear so as to be unrotatable relative to the high speed sun gear, and so that when the shifter is disposed at the low speed position, the shifter disengages from the high speed sun gear so as to be rotatable relative to the high speed sun gear, and the overrunning clutch transmits power from the motor output shaft to the low speed sun gear. Therefore, only the two high and low speed positions are provided for shift of the shifter, so that the shifter can be easily positioned. The neutral position is unnecessary to be set between the high and low speed positions of the shifter, thereby minimizing the transaxle in the axial direction of the output shaft. Only the high speed sun gear has to be formed with a structure, e.g., a key groove or spline-teeth, to be engageable with the shifter, thereby simplifying the low speed sun gear which needs no portion for engaging with the shifter.

In the third aspect, in some embodiments, the transaxle is equipped on a vehicle provided with an accelerator to be operated for changing a traveling speed of the vehicle. The shifter is automatically controlled to be shifted between the high speed position and the low speed position in correspondence to a relation of an actual traveling speed of the vehicle to an operation degree of the accelerator. Therefore, a gear ratio of either the high or low speed gear trains corresponds to the operation degree of the accelerator so as to realize a target traveling speed of the vehicle. If the traveling speed of the vehicle traveling at the high speed by setting the shifter at the high speed position is unexpectedly reduced to a lower level mismatching with the operation degree of the accelerator, the shifter is automatically shifted to the low speed position to transmit power via the high torque low speed gear train so as to prevent shortage of torque causing troubles such as unexpected stopping of the vehicle, even if manual operation of the accelerator to another operation degree corresponding to the lower level of the reduced traveling speed is missed.

In the third aspect, in some embodiments, the shifter disposed at the high speed position is automatically shifted to the low speed position when a load applied from the axle to the motor output shaft exceeds a threshold value. Therefore, the motor is prevented from being overloaded, thereby prolonging a life of the motor.

In the third aspect, in some embodiments, the shifter is automatically disposed at the low speed position when the wheel is stationary. Therefore, when the vehicle starts, a wheel of the vehicle receives power from the high torque low speed gear train so as to achieve smooth and sure starting of the vehicle.

In the third aspect, in some embodiments, the shifter is further shiftable to a neutral position according to its axial sliding on the motor shaft, so that the shifter, when being disposed at the neutral position, isolates both the high and low speed gear trains from power of the motor output shaft. The shifter is automatically and temporarily held on standby at the neutral position when shifting the shifter between the high speed position and the low speed position. Therefore, the transaxle is prevented from causing a sudden shocking change of traveling speed of a vehicle or a sudden damaging sudden load on the motor when the shifter is engaging with the sun gear.

In the third aspect, in some embodiments, the shifter is further shiftable to a neutral position according to its axial sliding on the motor shaft, so that the shifter, when being disposed at the neutral position, isolates both the high and low speed gear trains from power of the motor output shaft. The shifter is automatically disposed at the neutral position when the axle is stationary. Therefore, when the vehicle starts, the transaxle is initially set in neutral so as to avoid a sudden shocking start of the vehicle. Further, the vehicle is prevented from unexpectedly starting even if the accelerator is wrongly operated while the vehicle is stationary.

In the third aspect, in some embodiments, the shifter is adaptable to be manually controlled. A vehicle equipped with the transaxle is provided with a mode selection means for selecting either a manual mode for manually positioning the shifter or an automatic mode for automatically controlling the position of the shifter. Therefore, an operator can select the manual mode and can optionally select either the high or low speed state of the transaxle.

Further, in some embodiments, even when the manual mode is selected, the shifter at the high speed position cannot be shifted to the low speed position while a rotary speed of the axle exceeds a threshold value. Therefore, in spite of an operator's wrong operation for shifting the shifter to the low speed position while the axle rotates fast at a speed exceeding the threshold value, the shifter is not shifted to the low speed position, thereby preventing the traveling speed of the vehicle from being unexpectedly suddenly reduced, and thereby preventing the motor from being suddenly loaded from its output side by the high speed rotation of the axle.

In some embodiments, to provide the transaxle as a wheel hub drive unit attached to a hub of a drive wheel of a vehicle, the transaxle further comprises a casing supporting the axle and incorporating the motor and the speed changing planetary gear transmission. When the transaxle is equipped on a vehicle, the axle is drivingly connected to a wheel of the vehicle, and at least a part of the casing is disposed within a rim of the wheel. Therefore, a vehicle equipped with the transaxle serving as a wheel hub drive unit is miniaturized in the lateral direction thereof corresponding to the axial direction of the motor output shaft and the axle of the transaxle.

In some embodiments, the motor of the transaxle is an electric motor. Therefore, a vehicle equipped with the transaxle can be an electric vehicle or a hybrid car, for example, thereby eliminating or reducing noxious exhaust gas such as carbon dioxide.

Further, in some embodiments, the electric motor has a function as a regenerator for converting rotational force of the axle into electric energy. Therefore, electric energy required for driving the electric motor is naturally charged while the wheel is braked, for example. Especially, if the speed changing planetary gear transmission is set in the high speed state, the energy can be efficiently regenerated from the high speed rotation of the axle when being braked.

Alternatively, in some embodiments, the motor is a hydraulic motor. Therefore, the hydraulic motor needs no charger required for the electric motor.

In some embodiments, the transaxle includes a reduction transmission interposed between the carrier of the speed changing planetary gear mechanism and the axle. Therefore, the speed changing planetary gear transmission does not have to be large-scaled for ensuring sufficient gear ratios.

Regarding the conventional wheel hub drive unit shown in Reference 4, the first and second electric motors have the common rotor shaft. However, they have respective rotors, which are complicatedly shaped and are complicatedly connected to each other for causing the braking action as mentioned above. Such complicated structure of the rotors spoils their assembly and maintenancability, and increases components and costs. Further, Reference 4 teaches the independent control of electric power supply to the first and second stators of the respective first and second motors. However, it does not teach how the electric power supply to the respective first and second stators is controlled in correspondence to load applied from the axle to the rotor shaft. The load causes problems such as lack of motor output torque for driving the axle or insufficient traveling speed of a vehicle. In other words, the wheel hub drive unit disclosed in Reference 4 does not teach how the plurality of electric motors, which also serve as generators, are simplified and how their electric power supply is controlled to solve the problems caused by load applied from the axle to the rotor shaft. Especially, the problems are serious if the wheel hub drive unit is a small-sized unit liable to have the load.

A second object of the invention is to provide a simplified and economized transaxle, which may serve as a wheel hub drive unit, including an axle and a plurality of motor generators having a common rotor shaft for rotating the axle, wherein the transaxle is free from problems caused by a load applied from the axle to the rotor shaft, such as lack of motor output torque for driving the axle or insufficient traveling speed of a vehicle.

To achieve the second object, a transaxle according to the invention comprises an axle, and a multiple motor generator unit including first and second motor generators for driving the axle. The multiple motor generator unit includes a common rotor shaft drivingly connected to the axle, armature windings, a common rotor member, and permanent magnets. The armature windings serve as a first stator and a second stator aligned opposite in the axial direction of the rotor shaft. The rotor shaft serves as a rotary axis of the rotor member and is rotatably integral with the rotor member. The permanent magnets are provided on the common rotor member so as to serve as a first rotor facing the first stator and a second rotor facing the second stator. The first stator and the first rotor constitute the first motor generator. The second stator and the second rotor constitute the second motor generator. The first stator and the second stator can be independently supplied with electric power so that, when at least one of the first and second stators is supplied with electric power, the corresponding first or second motor generator functions as a motor and outputs a torque to rotate the rotor member and the rotor shaft. A total motor output torque of the first and second motor generators for rotating the rotor member and the rotor shaft can be changed in correspondence to load applied from the axle to the rotor shaft.

Therefore, as a result of the common rotor member provided thereon with the permanent magnets serving as the first and second rotors, the multiple motor generator unit, in which the first and second motor generators include the respective first and second stators aligned opposite in the axial direction of the rotor shaft, is simplified so as to reduce components and costs, and to improve assembly and maintenancability. Further, due to the control of electric power supply to the first and second motor generators corresponding to the load, a vehicle equipped with the transaxle can be prevented from problems caused by a load applied from the axle to the rotor shaft, such as lack of motor output torque for driving the axle or insufficient traveling speed of the vehicle. Therefore, the vehicle can smoothly and surely start, can keep traveling at a low speed with a sufficient torque of the axle or can travel at a sufficiently high speed.

In some embodiments, the transaxle is equipped on a vehicle having a drive wheel drivingly connected to the axle, and a torque applied from the drive wheel to the rotor shaft is detected and recognized as the load. Therefore, for example, a torque sensor can be provided to detect the torque. The torque sensor can be provided adjacent to the drive wheel of the vehicle equipped with the transaxle, so as to directly and accurately detect the load as a resistance of the ground against the drive wheel contacting the ground.

Alternatively, in some embodiments, the transaxle is equipped on a vehicle having a drive wheel drivingly connected to the axle, an actual traveling speed of the vehicle is detected as a vehicle traveling speed, and an actual rotary speed of the drive wheel is detected as a wheel rotary speed, so that a ratio of a difference between the vehicle traveling speed and the wheel rotary speed to the vehicle traveling speed is recognized as the load. This ratio indicates a degree of a slip of the drive wheel corresponding to the load applied from the axle to the rotor shaft. Therefore, an existing sensor for detecting the vehicle traveling speed, such as an optical sensor, and an existing sensor for detecting the wheel rotary speed can be used for recognizing the load instead of a detection means for detecting a torque as the load, such as the torque sensor, thereby reducing components and costs.

In some embodiments, the multiple motor generator unit is automatically shiftable between a single motor driving mode, where only the first stator is supplied with electric power to rotate the rotor member, and a double motor driving mode, where both the first and second stators are supplied with electric power to rotate the rotor member, so as to correspond to the load. When the multiple motor generator unit is set in the single motor driving mode, the second motor generator can function as a regenerator. Therefore, if the load is normal and the motor output torque of only the first motor generator is sufficient to ensure a smooth start of a vehicle or to ensure a sufficient traveling speed of the vehicle, the multiple motor generator unit is set in the single motor driving mode so as to save consumption of electric power. Further, when the multiple motor generator unit is set in the single motor driving mode, the electric power regenerated by the second motor generator can be charged in a battery, thereby efficiently compensating for consumption of electric power. If the load is excessive and the motor output torque of only the first motor generator is insufficient, the multiple motor generator unit is set in the double motor driving mode so as to ensure a sufficient motor output torque from both the first and second motor generators, thereby smoothening start of the vehicle or ensuring a sufficient traveling speed of the vehicle.

In the transaxle having the automatically shiftable multiple motor generator unit, in some embodiments, the multiple motor generator unit can be also manually shifted between the single motor driving mode and the double motor driving mode. Therefore, an operator can optionally control the total motor output torque of the multiple motor generator unit in correspondence to work condition, an operator's skill, or any other condition.

In some embodiments, the transaxle, having the multiple motor generator unit shiftable between the single motor driving mode and the double motor driving mode, is equipped on a vehicle having an accelerator to be operated for changing a traveling speed of the vehicle. The multiple motor generator unit is set in the double motor driving mode when an operation degree of the accelerator is not zero and when the load exceeds a threshold value. Therefore, the total motor output torque of the first and second motor generators is increased by the electric power to both the first and second stators so as to correspond to the load exceeding the threshold value, thereby ensuring traveling of the vehicle at a low speed with a sufficient torque of the axle, or ensuring a sufficient traveling speed of the vehicle.

In some embodiments, the transaxle, having the multiple motor generator unit shiftable between the single motor driving mode and the double motor driving mode, is equipped on a vehicle having an accelerator to be operated for changing a traveling speed of the vehicle, and having a steering operation device to be operated for turning of the vehicle. The multiple motor generator unit is set in the double motor driving mode when an operation degree of the accelerator is not zero and when an operation degree of the steering operation device exceeds a threshold value. Therefore, the total motor output torque of the first and second motor generators is increased by the electric power to both the first and second stators so as to correspond to the operation degree of the steering operation device exceeding the threshold value, thereby ensuring turning of the vehicle with a sufficient torque of the axle.

In some embodiments, the transaxle, having the multiple motor generator unit shiftable between the single motor driving mode and the double motor driving mode, is equipped on a vehicle having an accelerator to be operated for changing a traveling speed of the vehicle, and having a steering operation device to be operated for turning of the vehicle. While an operation degree of the accelerator is not zero, the multiple motor generator unit is set in the double motor driving mode when the load exceeds its threshold value or when an operation degree of the steering operation device exceeds its threshold value. While the operation degree of the accelerator is not zero, the multiple motor generator unit is set in the single motor driving mode when the load does not exceed its threshold value and when the operation degree of the steering operation device does not exceed its threshold value. Therefore, the traveling vehicle has the above-mentioned effects ensured by the multiple motor generator unit set in the double motor driving mode when the load is excessive or when the operation degree of the steering operation device is large for turning the vehicle on a small circle. On the other hand, when the load is not excessive, and when the operation degree of the steering operation device is small for turning of the vehicle on a large circle, or zero for straight traveling of the vehicle, the traveling of the vehicle with a sufficient torque of the axle or at a sufficient speed can be ensured by the total motor output torque of the first and second motor generators by the electric power supply to only the first stator, thereby reducing waste consumption of electric power.

In some embodiments, the transaxle, having the multiple motor generator unit shiftable between the single motor driving mode and the double motor driving mode, is equipped on a vehicle having an accelerator to be operated for changing a traveling speed of the vehicle. While an operation degree of the accelerator is zero, neither the first stator nor the second stator is supplied with electric power for rotating the rotor member, and at least one of the first and second motor generators can function as a regenerator. Therefore, if the operation degree of the accelerator is zeroed for braking the vehicle or for descending of the vehicle on a slope, the rotary force of the axle is transmitted as a torque to the rotor member, so that the stator of the at least one of the first and second motor generators generates electric energy corresponding to the rotational energy of the rotor member caused by the torque applied from the axle. The regenerated electric power can be charged in a battery of the vehicle, thereby efficiently compensating for consumption of electric power.

In some embodiments, in the multiple motor generator unit shiftable between the single motor driving mode and the double motor driving mode, a capacity of the first motor generator for driving the rotor member is larger than a capacity of the second motor generator for driving the rotor member. Therefore, the multiple motor generator unit, while being set in the single motor driving mode, can cover a large range for variation of its total motor output torque for rotating the axle relative to traveling speed of a vehicle, thereby reducing requirements of the shift of the multiple motor generator unit into the double motor driving mode, and thereby small-sizing or lightening the second motor generator.

In some embodiments, the multiple motor generator unit includes an axial air gap type motor generator, in which its stator, its rotor and an air gap between the stator and the rotor are aligned in the axial direction of the rotor shaft, so as to serve as at least one of the first and second motor generators. Therefore, magnetic flux areas of the axial air gap type motor generator between its stator and rotor can be expanded in the radial direction of the rotor shaft, or in other words, the axial air gap type motor generator is advantageous for reducing its length in the axial direction of the rotor shaft while ensuring sufficient magnetic flux areas.

Further, in some embodiments, both the first and second motor generators are axial air gap type motor generators. The rotor member is formed with a portion having axially opposite surfaces between the first and second stators. The permanent magnet serving as the first rotor is provided on one of the surfaces of the portion of the rotor member so as to face the first stator. The permanent magnet serving as the second rotor is provided on the other of the surfaces of the portion of the rotor member so as to face the second stator. Therefore, the first and second motor generators aligned oppositely in the axial direction of the rotor shaft can be axially shortened while ensuring sufficient magnetic flux areas between the first stator and the first rotor and between the second stator and the second rotor. Especially, the portion of the rotor member is disposed between the first and second stators so as to provide its axially opposite surfaces for both the first and second rotors, thereby effectively reducing the axial length of the first and second motor generators.

In some embodiments, the multiple motor generator unit including the axial air gap type motor generator further includes a radial air gap type motor generator, in which its stator, its rotor and an air gap between the stator and the rotor are aligned radially with respect to the rotor shaft, so as to serve as at least one of the first and second motor generators. Therefore, the multiple motor generator unit also has a merit of the radial air type motor generator for reducing axial deviation or vibration of the rotor shaft during rotation, while reducing the length thereof in the axial direction of the rotor shaft due to the short axial length of the axial air gap type motor generator.

In some embodiments, the transaxle further comprises a brake including a brake rotor disposed on the rotor shaft. Therefore, the brake is simplified and the brake can be assembled with the multiple motor generator unit, thereby ensuring compactness of the transaxle, and improving assembility and maintenancability of the brake in the transaxle.

Alternatively, in some embodiments, the transaxle further comprises a brake including a brake rotor constituted by a part of the rotor member. Therefore, no additional member serving as the brake rotor is needed, thereby reducing components and costs, and improving the maintenancability of both the multiple motor generator unit and the brake.

In some embodiments, the transaxle further comprises a speed changing transmission interposed between the rotor shaft and the axle so as to transmit power from the rotor shaft to the axle. Therefore, in addition to the control of electric power supply to the first and second stators for controlling the total motor output torque of the multiple motor generator unit, the speed changing transmission can change a speed ratio between the rotor shaft and the axle, thereby expanding the variation of speed and torque of the axle relative to the total motor output torque.

In some embodiments, the axle and the rotor shaft are coaxial to each other, and the transaxle further comprises a reduction transmission interposed between the rotor shaft and the axle so as to power from the rotor shaft to the axle. Therefore, the reduction transmission for reducing the rotary speed of the axle relative to the rotor shaft can be minimized in the radial direction of the rotor shaft and the axle and be simplified so as to reduce components and costs and to improve its maintenancability.

Further, in some embodiments, the transaxle further comprises a casing incorporating both the multiple motor generator unit and the reduction transmission. Therefore, the multiple motor generator unit and the reduction transmission can be compactly assembled together so as to facilitate their handling.

In some embodiments, the transaxle serves as a wheel hub drive unit including a single axle to be connected to a hub of a drive wheel of a vehicle. Therefore, the transaxle serving as the wheel hub drive unit can be compactly mounted in the vehicle so as to minimize the vehicle or to enlarge a free space in the vehicle. Further, if the vehicle has a plurality of drive wheels, a plurality of transaxles are provided for driving the respective drive wheels, so as to accurately control the respective drive wheels. Further, each of the transaxles can be small-sized.

Further, in some embodiments, at least a part of the transaxle is disposed in a rim of the drive wheel. Therefore, the dead space in the rim can be effectively used for arrangement of the part of the transaxle, thereby further minimizing the vehicle, especially in the axial direction of the rotor shaft and the axle, i.e., in the lateral direction of the vehicle.

Alternatively, in some embodiments, the axle is paired, and the transaxle further comprises a differential unit differentially connecting the pair of axles to each other. Therefore, while the multiple motor generator unit applies its total motor output torque equally onto the respective axles, the differential unit allows differential rotation of the axles so as to ensure smooth turning or curving of the vehicle. Further, to drive a pair of drive wheels of a vehicle, the transaxle does not have to be paired, thereby reducing components and costs.

These, other and further objects, features and advantages of the invention will appear more fully from the following description with reference to accompanying drawings.

DETAILED DESCRIPTION OF THE INVENTION

Figure 1:
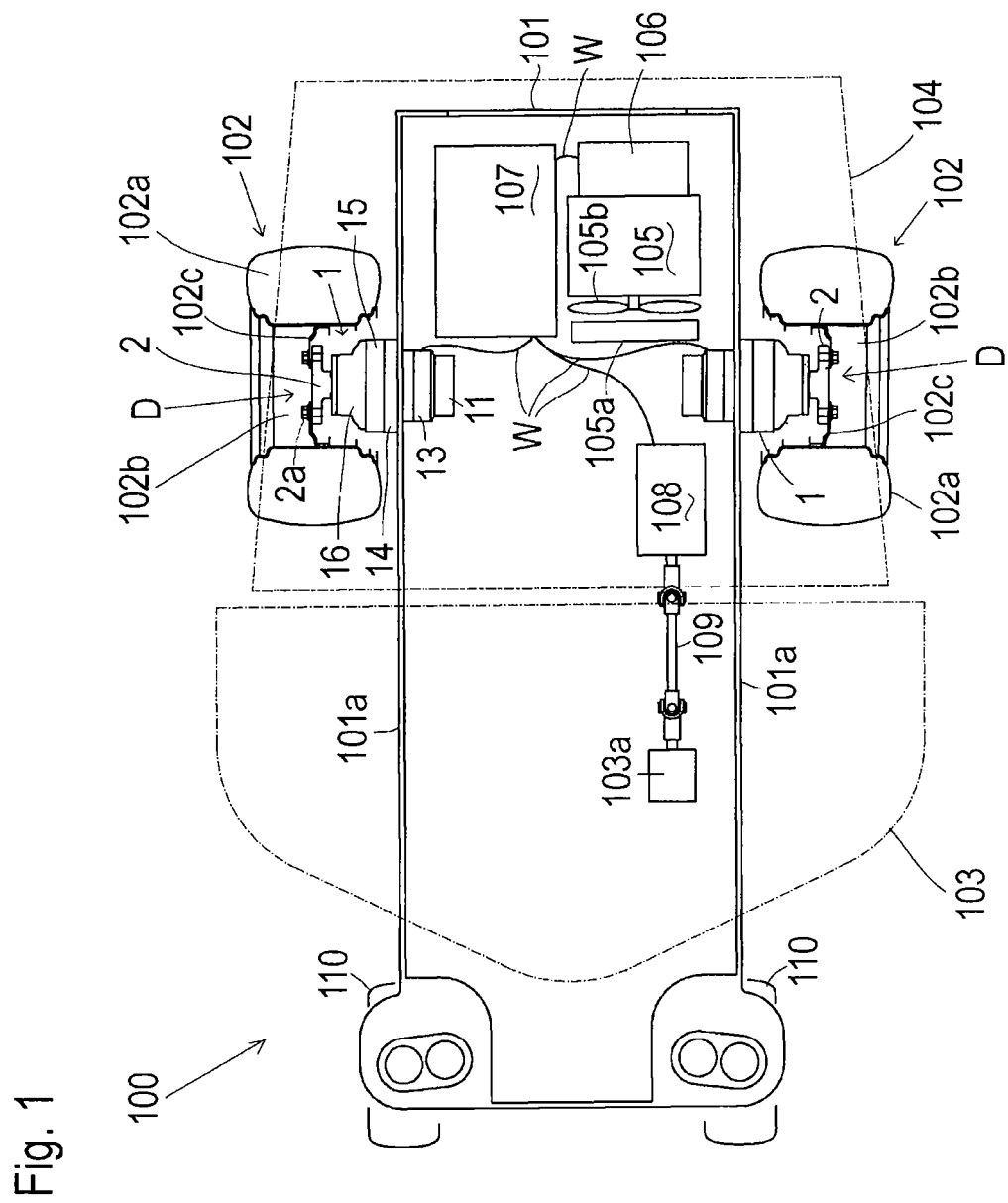
FIG. 1 is a schematic plan view of a lawn mower 100 serving as a vehicle equipped with right and left wheel hub drive units D for driving respective right and left drive wheels 102.

Description will be given of a lawn mower 100 serving as an embodiment of a vehicle equipped with right and left wheel hub drive units D with reference to FIG. 1. Lawn mower 100 includes right and left drive wheels (rear wheels) 102, and is equipped with right and left wheel hub drive units D for driving respective right and left drive wheels 102. Each wheel hub drive unit D includes a hub casing 1 incorporating a motor, a speed changing transmission and so on, as discussed later. Hub casing 1 journals a later-discussed axle 4 (see FIG. 2). A hub 2 is fixed on axle 4 so as to serve as a hub of drive wheel 102.

Hub casings 1 of respective right and left wheel hub drive units D are fixed to respective right and left side plate portions 101a of a vehicle body frame 101 of lawn mower 100. Hub casings 1 project laterally distally from respective side plate portions 101a. Axles 4 project outward from laterally distal ends of respective hub casings 1, and hubs 2 fixed on the laterally distal ends of respective axles 4 are disposed in rims 102b of respective drive wheels 102. Each drive wheel 102 includes a tire 102a, an annular rim 102b attached to an inner peripheral edge of tire 102a, and a wheel 102c fixed in a circular opening surrounded by rim 102b. Hub 2 is fastened to wheel 102c in rim 102b by bolts 2a.

Figure 2:
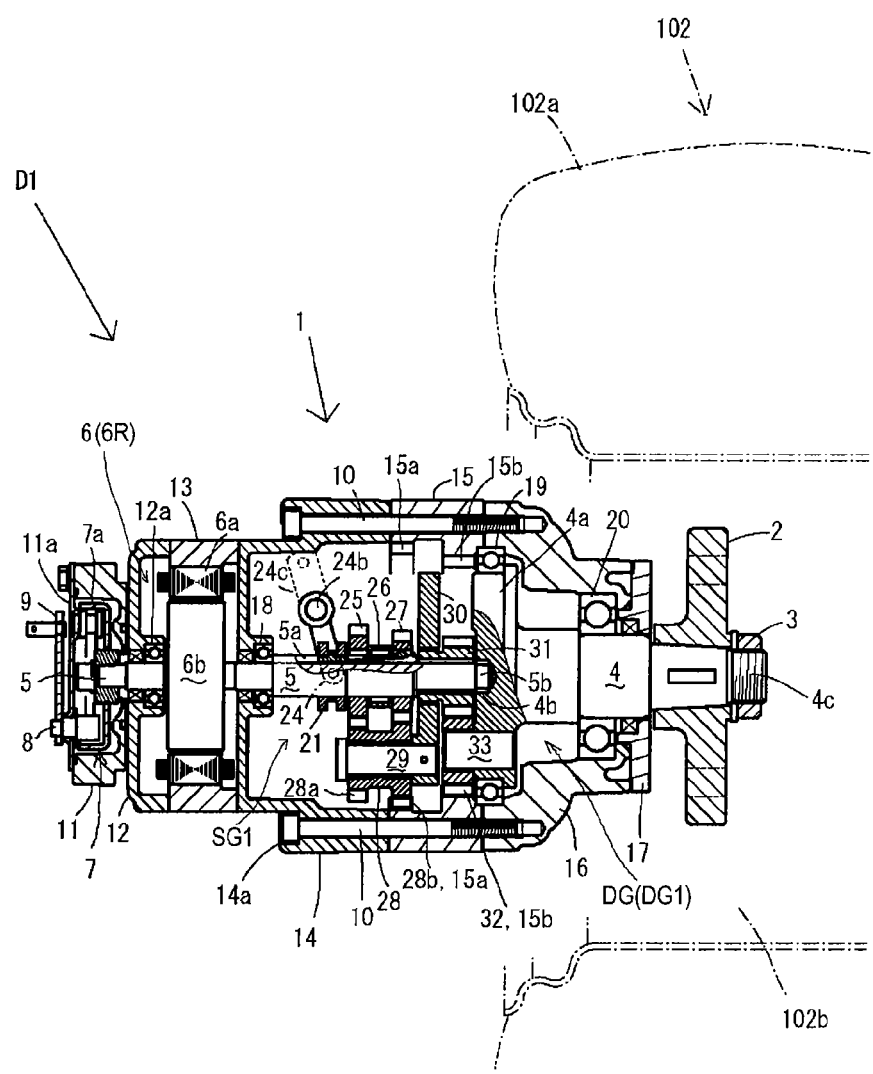
FIG. 2 is a sectional front view of wheel hub drive unit D1 serving as a representative embodiment of wheel hub drive unit D including an electric motor 6, a speed changing transmission, a reduction transmission and an axle 4, wherein wheel hub drive unit D1 includes a radial air gap type electric motor 6R, a speed changing planetary gear transmission SG1 and a reduction planetary gear transmission DG1, and wherein speed changing planetary gear transmission SG1 includes a shifter 21 which is shiftable among three positions, i.e., a high speed position H, a neutral position N and a low speed position L.
Figure 3:
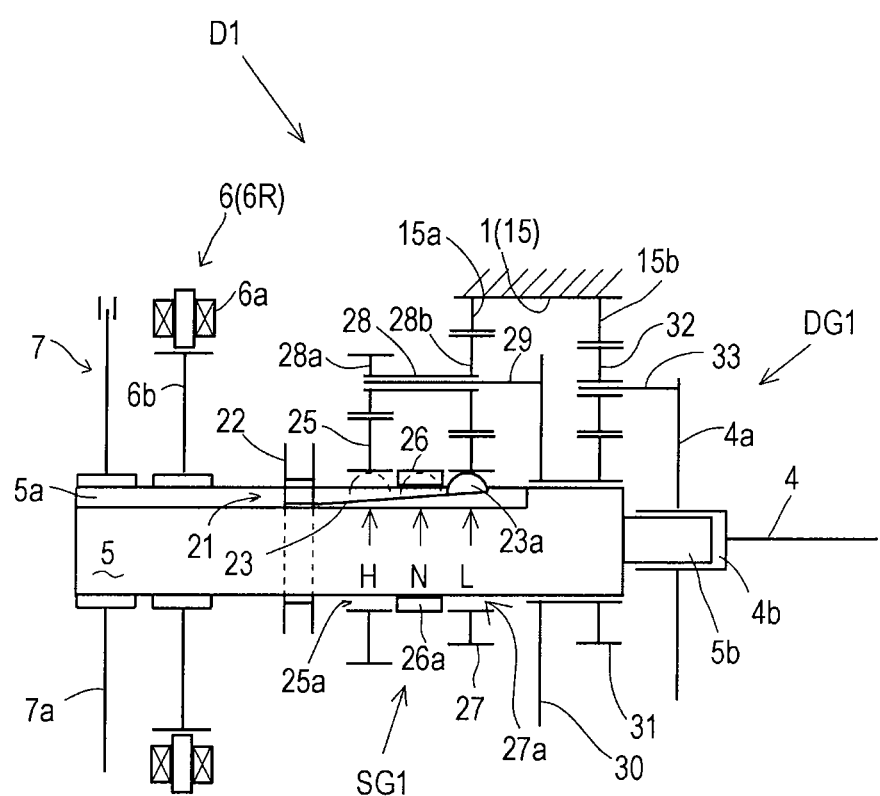
FIG. 3 is a skeleton diagram of wheel hub drive unit D1.

Here, description will now be given of a structure of hub casing 1 of wheel hub drive unit D and a structure of wheel hub drive unit D for supporting hub 2 with reference to FIG. 2, on an assumption that FIG. 2 illustrates a representative wheel hub drive unit D1 serving as an embodiment of wheel hub drive unit D. A brake housing 11, an inside cover 12, a motor housing 13, a shifter housing 14, a reduction gear housing 15, an axle housing 16 and an outside cover 17 are aligned in an axial direction of axle 4 (and a later-discussed motor output shaft 5 disposed coaxially to axle 4) in order from a laterally proximal vehicle side toward a laterally distal vehicle side, and are joined to one another so as to constitute hub casing 1. In hereinafter description of embodiments of wheel hub drive unit D, words "axial" and "axially" designate the axial direction of axle 4 (and motor output shaft 5), phrases "axially outward" and "axially outer" designate the axial direction toward hub 2, and phrases "axially inward" and "axially inner" designate the axial direction opposite to hub 2.

Figure 22:
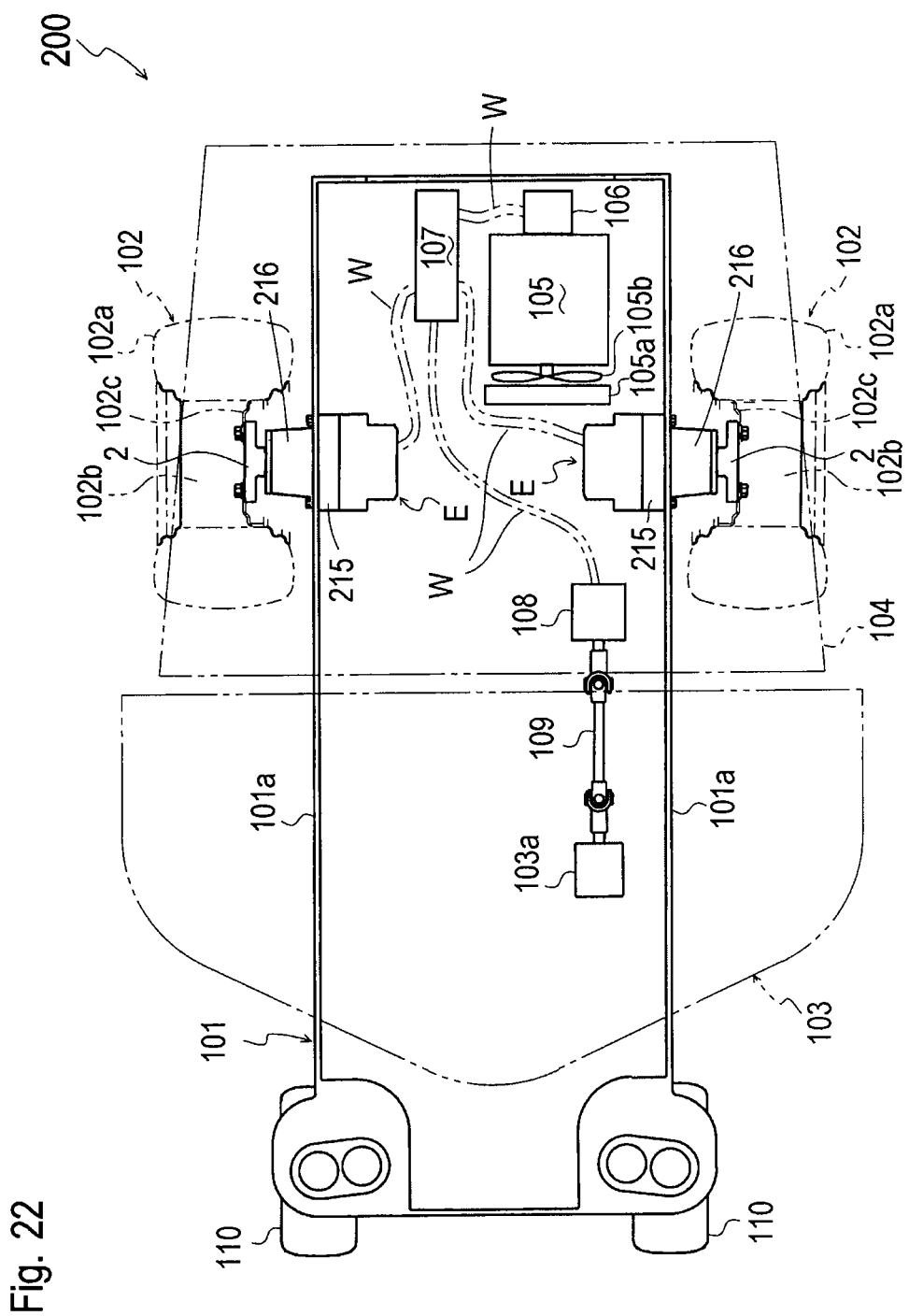
FIG. 22 is a schematic plan view of a lawn mower 200 serving as a vehicle equipped with right and left wheel hub drive units E for driving respective right and left drive wheels 102.

Shifter housing 14 of hub casing 1 is stepped at an axially intermediate outer peripheral portion thereof so as to have a vertical surface 14a perpendicular to axle 4 and motor output shaft 5. Bolts 10 are axially screwed from vertical surface 14a into shifter housing 14, reduction gear housing 15 and axle housing 16 so as to fasten housings 14, 15 and 16 together. Further, as shown in FIG. 1, vertical surface 14a contacts an outer side vertical surface of each of right and left side plate portions 101a of vehicle body frame 101, and hub casing 1 is fixed to each side plate portion 101a, so that an axially outward portion of hub casing 1 having housings 15 and 16 and cover 17 is extended laterally (axially) outward from corresponding side plate portion 101a, and an axially inward portion of hub casing 1 having housings 13 and 11 and cover 12 is extended laterally (axially) inward from corresponding side plate portion 101a. Incidentally, side plate portion 101a abutting against vertical surface 14a may be fastened together with housings 14, 15 and 16 by bolts 10 shown in FIG. 2. How to support hub casing 1 by side plate portion 101a will be detailed later in description of attachment of a hub casing 201 of another wheel hub drive unit E to side plate portion 101a with reference to FIGS. 22, 26 and 27.

As shown in FIG. 2 and others, axle 4 is journalled at an axial intermediate portion thereof by axle housing 16 of hub casing 1 via a bearing 20 and projects at an axially outer end portion thereof outward from outside cover 17 so as to be fixedly provided thereon with hub 2. Hub 2 is fitted on the axially outer end portion of axle 4 via a key, and is retained to axle 4 by a nut 3 screwed on a threaded portion 4c formed on the outer end of axle 4. Hub 2 is disposed in rim 102b of drive wheel 102 as mentioned above, and is fastened to wheel 102c in rim 102b by bolts 2a, thereby attaching drive wheel 102 to wheel hub drive unit D.

The initial description of the structure of lawn mower 100 with reference to FIG. 1 will be revived. Front wheels 110 are supported by right and left front end portions of vehicle body frame 101. Front wheels 110 may be steerable wheels turned by operation of a steering operation device, i.e., a later-discussed steering wheel 46, or may be casters. If front wheels 110 are casters, the steering operation device may be operated to differentially rotate right and left rear drive wheels 102 so that lawn mower 100 turns according to the differential rotation of rear wheels 102.

A mower unit 103 incorporating a blade (not shown) for mowing lawn is disposed below a fore-and-aft intermediate portion of vehicle body frame 101. A main body cover 104 is mounted on vehicle body frame 101 rearward from mower unit 103. An engine 105, a generator 106 and a battery 107 are disposed in main body cover 104 between right and left side plate portions 101a of main body frame 101. Engine 105 is provided with a radiator 105a and a radiator fan 105b.

Generator 106 is driven by engine 105 so as to generate DC (direct current) electric power, and charges the generated electric power into battery 107. On an assumption that the motors of respective wheel hub drive units D are electric motors 6 (see FIG. 2 and others) as discussed later, motors 6 (i.e., armature windings as stators of motors 6) are supplied with electric power outputted from battery 107. Incidentally, motors 6 may be directly supplied with the electric power from generator 106 without battery 107. As later discussed in description of alternative lawn mower 200, lawn mower 100 is provided with a driver (not shown) including an inverter, which converts the DC electric power from battery 107 (or generator 106) into AC (alternating current) electric power before the electric power is supplied to motors 6. Battery 107 is electrically connected via respective wires W to generator 106, the stators of motors 6 of respective wheel hub drive units D, and a later-discussed mower driving motor 108.

Figure 7:
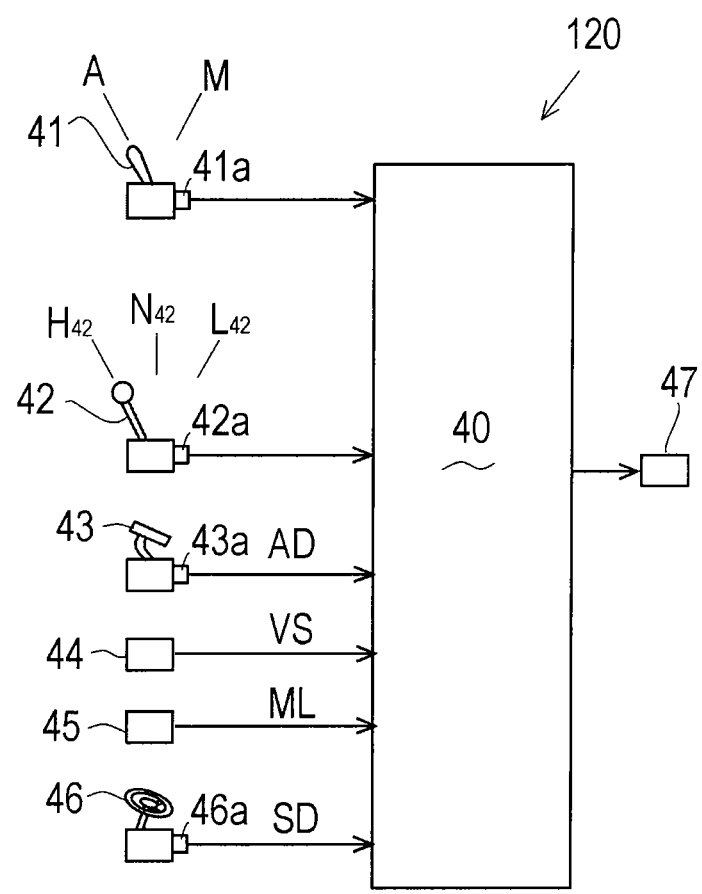
FIG. 7 is a block diagram of a control system 120 for controlling a shifter actuator 47 for shifting shifter 21 of speed changing planetary gear transmission SG1.

Referring to FIG. 7, lawn mower 100 is equipped with an accelerator pedal 43 whose depression degree is referred to as an accelerator operation degree AD and is detected by an accelerator sensor 43a. Accelerator pedal 43 is a representative "accelerator" defined as a manipulator for changing a vehicle traveling speed VS that is a traveling speed of lawn mower 100. The "accelerator" may be a lever or another manipulator. Accelerator pedal 43 is operated for controlling an output volume or frequency of the electric power supplied from battery 107 (or generator 106) to electric motors 6 of wheel hub drive units D, thereby changing rotary speeds of right and left drive wheels 102, and thereby changing vehicle traveling speed VS. In other words, the DC electric power outputted from generator 106 or charged in battery 107 is converted into AC electric power having the volume or frequency corresponding to a detection signal from accelerator sensor 43a indicating accelerator operation degree AD as depression degree of accelerator pedal 43, and is supplied to electric motors 6 of respective wheel hub drive units D.

Further, referring to FIG. 7, lawn mower 100 is equipped with a steering wheel 46 whose rotation direction and degree are referred to as a steering operation direction (for determining whether lawn mower 100 turns left or right) and a steering operation degree SD (for determining a turning radius of lawn mower 100) and are detected by a steering sensor 46a. Steering wheel 46 is a representative steering manipulator for turning steerable front wheels 110, or for differentially rotating right and left rear drive wheels 102. If steering wheel 46 is provided for differentially rotating right and left rear drive wheels 102, motors 6 of respective right and left wheel hub drive units D are supplied with respective electric powers having difference therebetween in correspondence to a detection signal from steering sensor 46a indicating the steering operation direction and steering operation degree SD of steering wheel 46, thereby differentially rotating right and left drive wheels 102, and thereby turning lawn mower 100. Lawn mower 100 may be provided with any type steering manipulator, such as a lever or a joystick, other than steering wheel 46.

Lawn mower 100 is equipped with a controller, which receives the detection signals from accelerator sensor 43a and steering sensor 46a, recognizes accelerator operation degree AD of accelerator pedal 43 and steering operation degree SD and direction of steering wheel 46, and controls the volume or frequency of electric power from battery 107 or generator 106 to be supplied to the stators of motors 6 of wheel hub drive units D. This controller may be assembled in generator 106, for example. Further, as shown in FIG. 7, lawn mower 100 is provided with a shifter control system 120 including a controller 40, which controls a shifter actuator 47 for shifting a shifter of a speed changing transmission in wheel hub drive unit D in correspondence to the detection signals from accelerator sensor 43a and steering sensor 46a, as discussed later.

Further, each of electric motors 6 of respective wheel hub drive units D is a motor generator having function of regeneration for converting the rotation of drive wheel 102, when being braked, for example, into electric energy to be charged in battery 107. Especially, if wheel hub drive unit D is set in a high speed state, i.e., if a later-discussed shifter 21 or 34 is set at a high speed position H, the electric energy can be efficiently regenerated from the high speed rotational force of drive wheel 102 when being braked.

Mower unit 103 includes a gearbox 103a incorporating a gear mechanism for driving the blade, such as a rotary blade. Mower driving motor 108 for driving the gear mechanism in gearbox 103a is disposed in main body cover 104 between right and left side plate portions 101a of vehicle body frame 101. An output shaft of motor 108 is drivingly connected to an input shaft of the gear mechanism in gearbox 103a via a propeller shaft 109 with universal joints.

Description will now be given of a wheel hub drive unit D1 serving as a first embodiment of wheel hub drive unit D with reference to FIGS. 2 to 6. In the meaning of comparison with later-discussed wheel hub drive units E, F and transaxle G, wheel hub drive unit D is defined as a wheel hub drive unit including a single axle, a motor for driving the axle, and a speed changing transmission interposed between the motor and the axle. A representative electric motor serving as the motor of wheel hub drive unit D is not multiplied with plural motor generators or is not multi-controlled. In hereinafter description of embodiments of wheel hub drive unit D, lawn mower 100 is simply referred to as "vehicle" unless it needs to be specified as lawn mower 100.

In wheel hub drive unit D1, as mentioned above, hub casing 1 is constituted by housings 11, 13, 14, 15 and 16 and covers 12 and 17, axle housing 16 of hub casing 1 supports axle 4, and hub 2 is attached onto axle 4.

An annular stator 6a, which is an assembly of peripherally arranged armature windings, is fixed onto an inner peripheral surface of motor housing 13. A rotor 6b including permanent magnets is fixed on a horizontal motor output shaft 5 rotatably integrally with motor output shaft 5, and is disposed in a cavity surrounded by annular stator 6a so that the permanent magnets on the outer peripheral surface of rotor 6b face an inner peripheral surface of stator 6a. In this way, stator 6a and rotor 6b constitute electric motor 6. Especially, electric motor 6, in which stator 6a, rotor 6b and an air gap between stator 6a and rotor 6b are aligned radially with respect to the center axis of motor output shaft (serving as a rotor shaft) 5, is defined as a radial air gap type electric motor 6R.

Horizontal motor output shaft 5 is extended axially inward (laterally inward of the vehicle) from a center portion of rotor 6b into brake housing 11 via a bearing 12a supported by inside cover 12. Motor output shaft 5 is provided therearound with a brake 7 in brake housing 11 so as to serve as a shaft to be braked by brake 7. Brake 7 includes a brake rotor 7a disposed coaxially to motor output shaft 5 and fixed on motor output shaft 5, thereby being minimized radially with respect to rotor shaft 5. A recess is formed in brake housing 11 so as to have an axially inwardly opened opening, and brake 7 including brake rotor 7a is disposed in the recess. A cover plate 11a is attached to an axially inward side end surface of brake housing 11 so as to cover the opening of the recess. A brake operation shaft 8 for operating brake 7 is extended from brake 7 and projects outward from hub casing 1 via cover plate 11a, and a brake arm 9 is fixed on an end portion of brake operation shaft 8 outward of hub casing 1. The vehicle is equipped with an unshown brake manipulator, such as a brake pedal, and brake arm 9 is mechanically connected to the brake manipulator. Alternatively, brake arm 9 may be connected to a brake actuator which is controlled electrically or the like based on a detection signal indicating an operation position of the brake manipulator or/and another detection signal.

Motor output shaft 5 is also extended axially outward (laterally outward of the vehicle) from the center portion of rotor 6b into shifter housing 14 and reduction gear housing 15 via a bearing 18 supported at an axially outward (lateral inward of the vehicle) end portion of shifter housing 14. An axial outward end portion of reduction gear housing 15 and an axial inward end portion of axle housing 16 are joined to each other, and their inner peripheral surface portions support a bearing 19 journaling a flange 4a which is formed integrally on an axially inward end portion of axle 4. Motor output shaft 5 is formed at an axially outward end thereof integrally with a pin 5b, and pin 5b is fitted into a recess 4b formed in a central portion of flange 4a of axle 4 so as to be rotatable relative to axle 4. Horizontal axle 4 is extended axially outward (laterally outward of the vehicle) from flange 4a coaxially to motor output shaft 5. As mentioned above, axle 4 is journalled at the axially intermediate portion thereof by bearing 20 in axle housing 16, and is extended outward from hub casing 1 via outside cover 17 so as to be fixedly provided on the distal end thereof with hub 2.

Hub 2 is disposed in rim 102b of drive wheel 102 so as to be fastened to wheel 102c of drive wheel 102, as mentioned above. Further, at least a part of hub casing 1 is disposed in rim 102b. In this embodiment, outside cover 17 and axle housing 16 of hub casing 1 are disposed in rim 102b. Therefore, an axial extension of wheel hub drive unit D1 between drive wheel 102 and the main vehicle body is reduced so as to laterally minimize the vehicle (lawn mower 100).

A speed changing planetary gear transmission SG1 is configured in shifter housing 14 and reduction gear housing 15. In this regard, a high speed sun gear 25, a neutral sleeve 26 and a low speed sun gear 27 are fitted on motor output shaft 5 rotatably relative to motor output shaft 5 and are aligned in the axially outward order so as to neighbor one another and to be rotatable relative to one another. Sun gears 25 and 27 are formed with respective latch grooves 25a and 27b, which are shaped as key grooves and face an outer peripheral surface of motor output shaft 5. Neutral sleeve 26 is formed with an annular latch groove 26a facing the outer peripheral surface of motor output shaft 5.

A shifter 21 is fitted on motor output shaft 5. As shown in FIGS. 3 to 6, shifter 21 is formed by joining a slidable ring member 22 and a key member 23 integrally to each other. Ring member 22 is formed with an annular fork groove 22a to be fitted to a fork 24. Key member 23 is formed at a tip portion thereof with a latch 23a. Ring member 22 is axially slidably fitted on motor output shaft 5 axially inward of high speed sun gear 25 (on the side of high speed sun gear 25 toward motor 6). An axially extended key groove 5a is formed on the outer peripheral surface of motor output shaft 5, and key member 23 fixed to ring member 22 is fitted into key groove 5a, so that shifter 21 is fitted on motor output shaft 5 so as to be axially slidable on motor output shaft 5 and unrotatable relative to motor shaft 5.

Figure 4:
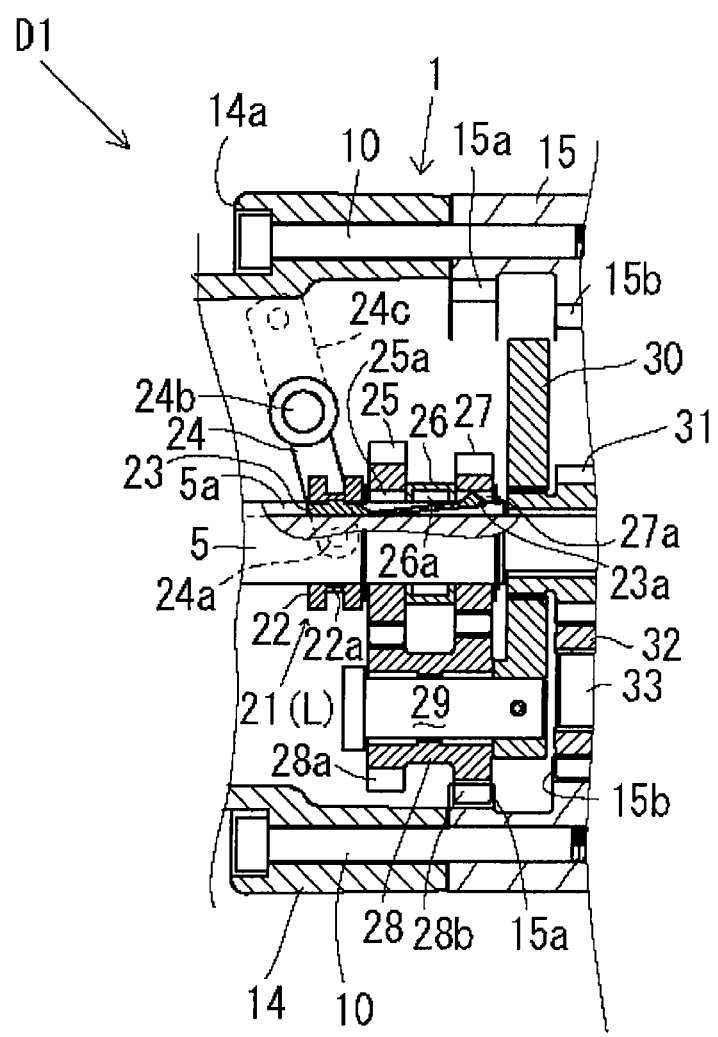
FIG. 4 is an enlarged fragmentary sectional front view of wheel hub drive unit D1, showing speed changing planetary gear transmission SG1 when shifter 21 is set at low speed position L.
Figure 5:
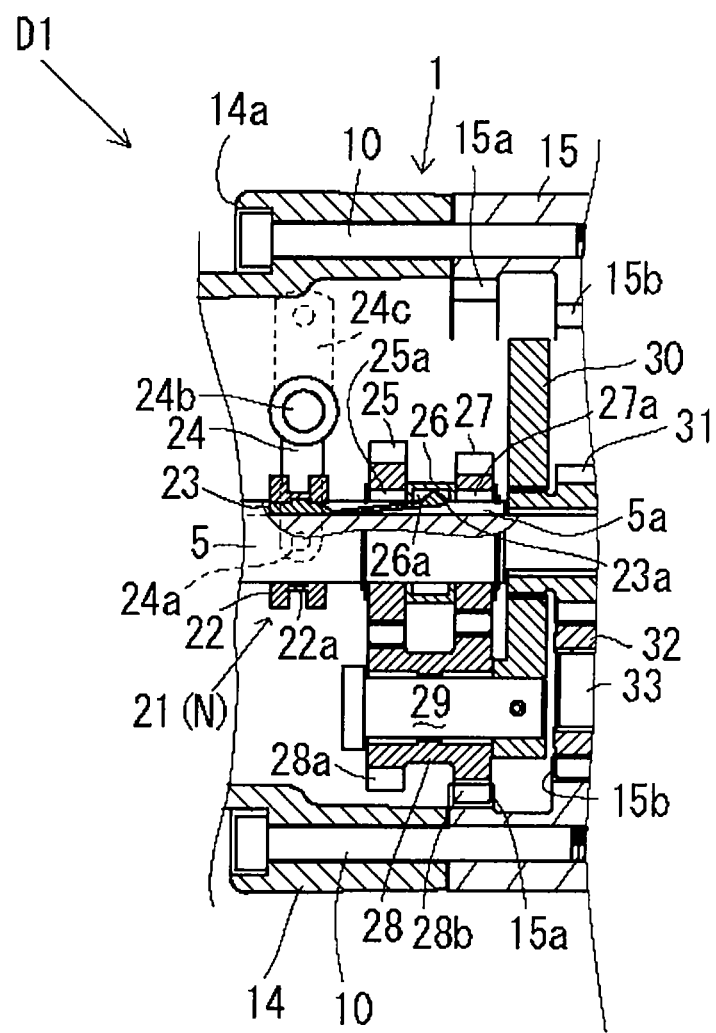
FIG. 5 is an enlarged fragmentary sectional front view of wheel hub drive unit D1, showing speed changing planetary gear transmission SG1 when shifter 21 is set at neutral position N.
Figure 6:
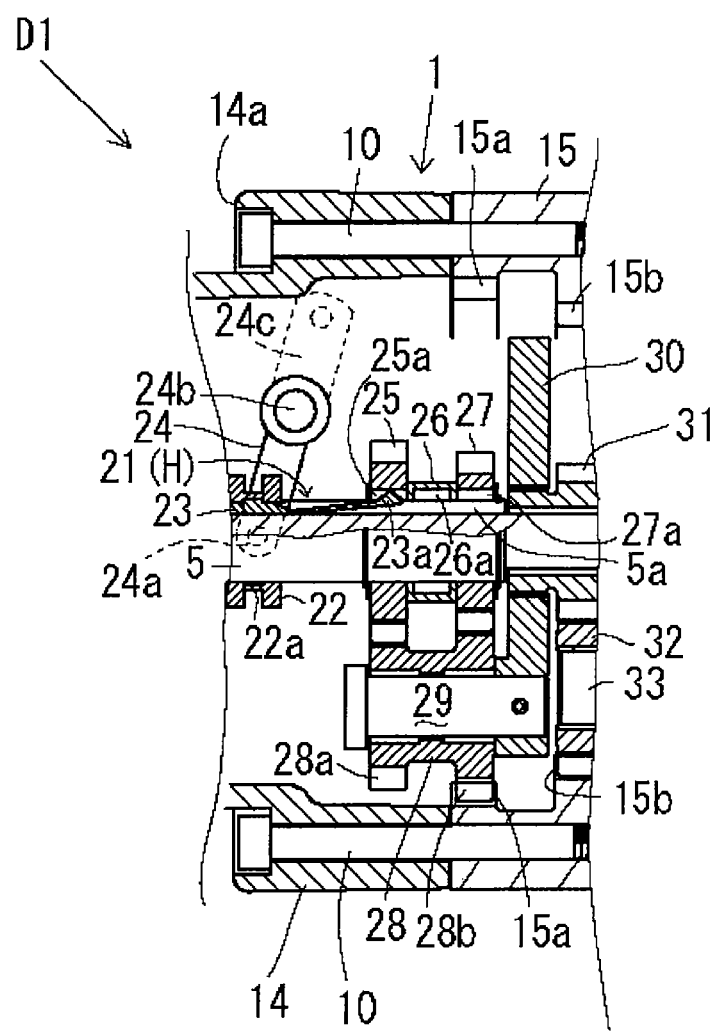
FIG. 6 is an enlarged fragmentary sectional front view of wheel hub drive unit D1, showing speed changing planetary gear transmission SG1 when shifter 21 is set at high speed position H.

Key member 23 of shifter 21 engages with ring member 22 at an axially inward end portion thereof, and has an axially outwardly extended elastic portion whose tip is formed as latch 23a. Latch 23a can be fitted into one of latch grooves 25a, 27a and 26a of respective sun gears 25 and 27 and neutral sleeve 26 selectively depending on the axial slide of shifter 21. In this regard, latch 23a cannot be fitted to each of latch grooves 25a and 27a of sun gears 25 and 27 before corresponding latch groove 25a or 27a becomes coincident to key groove 5a during rotation of corresponding sun gear 25 or 27. A position of shifter 21, when latch 23a is fitted into latch groove 27a of low speed sun gear 27 as shown in FIG. 4, is defined as a low speed position L. A position of shifter 21, when latch 23a is fitted into latch groove 26a of neutral sleeve 26 as shown in FIG. 5, is defined as a neutral position N. A position of shifter 21, when latch 23a is fitted into latch groove 25a of high speed sun gear 25 as shown in FIG. 6, is defined as a high speed position H.

Fork 24 is formed on a tip thereof with a pin 24a. Pin 24a is fitted into annular fork groove 22a of ring member 22 slidably along annular fork groove 22a. Fork 24 is pivoted at a basal (top) end thereof onto a wall portion of shifter housing 14 via a pivot shaft 24b. An outer end of pivot shaft 24b projects outward from hub casing 1 and is provided thereon with an operation arm 24c which is rotatably integral with fork 24. Operation arm 24c is operatively connected to shifter actuator 47 (see FIG. 7) provided in the vehicle.

Here, shifter control system 120 shown in FIG. 7 will be described. Shifter actuator 47, e.g., an electric actuator or a hydraulic actuator, is controlled by controller 40. The vehicle is provided with a mode selection manipulator, e.g., a lever or a dial, for selecting either an automatic mode or a manual mode, and with a speed change manipulator, such as a lever or a pedal, for selecting one of a low speed state, a high speed state and a neutral state. In the embodiment of FIG. 7, a mode selection switch 41, serving as the mode selection manipulator, is switchable between an automatic mode position A and a manual mode position M.

A speed change lever 42, serving as the speed change manipulator, is switchable among three positions, i.e., a low speed position $L_{42}$, a neutral position $N_{42}$ and a high speed position $H_{42}$. A sensor 41a detects a position of mode selection switch 41, which is either position A or M, and transmits a detection signal indicating the detected position to controller 40. A sensor 42a detects a position of speed change lever 42, which is one of positions $L_{42}$, $N_{42}$ and $H_{42}$, and transmits a detection signal indicating the detected position to controller 40.

Further, accelerator sensor 43a, a vehicle traveling speed sensor 44, a load sensor 45 and steering sensor 46a are used for controlling shifter 21 when the automatic mode is selected. As mentioned above, accelerator sensor 43a detects accelerator operation degree AD of accelerator pedal 43, and steering sensor 46a detects steering operation degree SD of steering wheel 46. Vehicle traveling speed sensor 44 detects vehicle traveling speed VS. Vehicle traveling speed sensor 44 is an optical sensor or a Doppler radar, or has a rotary wheel whose rotary speed is measured, for example. Load sensor 45 is disposed on each drive wheel 102 or on any portion of the power train in each of wheel hub drive units D between motor output shaft 5 and axle 4 so as to detect a torque applied from axle 4 (i.e., grounding drive wheels 102) onto motor output shaft 5, regarding the torque as a load ML applied from axle 4 (i.e., grounding drive wheel 102) onto motor shaft 5. In other words, load ML is resistance of the ground contacting drive wheel 102 against rotation of motor output shaft 5. Sensors 43a, 44, 45 and 46a transmit the respective detection signals to controller 40, and controller 40 controls shifter actuator 47 in correspondence to the detection signals.

Incidentally, it should be noted that vehicle traveling speed VS is the actual movement speed of the vehicle relative to the ground and does not always match with a speed corresponding to actual rotary speed of drive wheels 102. If any of drive wheels 102 slips, vehicle traveling speed VS deviates from the speed corresponding to the rotary speed of drive wheels 102. This deviation caused by the slip of drive wheel 102 can be recognized as load applied from drive wheels 102 onto motors 6. This thing will be discussed later in description of a lawn mower 200 and wheel hub drive unit E.

When the manual mode is selected, i.e., mode selection switch 41 is set at manual mode position M, shifter 21 is disposed at one of low speed position L, neutral position N and high speed position H in correspondence to an operator's optional setting of speed change lever 42. When the automatic mode is selected, i.e., mode selection switch 41 is set at automatic mode position A, shifter 21 is automatically disposed at one of positions L, N and H in correspondence to a relation of vehicle traveling speed VS detected by vehicle traveling speed sensor 44 to accelerator operation degree AD detected by accelerator sensor 43a, regardless of the position of speed change lever 42. Incidentally, even if the automatic mode is selected, shifter 21 can be forcedly controlled regardless of the setting of speed change lever 42. It will be detailed later with reference to FIGS. 8 and 9 where shifter 21 is set in correspondence to what is the condition in the automatic mode.

A reduction sun gear 31 is fitted on motor output shaft 5 between low speed sun gear 27 and flange 4a rotatably relative to motor output shaft 5. Deceleration sun gear 31 is extended axially inward at a boss end portion thereof so as to be fittingly provided thereon with a planetary gear carrier 30, which is unrotatable relative to reduction sun gear 31. Planetary gear carrier 30 serves as an output member of speed changing planetary gear transmission SG1, and reduction sun gear 31 serves as an input member of a later-discussed reduction planetary gear transmission DG1 for receiving the rotational power of planetary gear carrier 30.

A planetary gear shaft 29 projects from planetary gear carrier 30 in parallel to motor output shaft 5, and a planetary gear member 28 is fitted on planetary gear shaft 29 rotatably relative to respective planetary gear shaft 29. Planetary gear member 28 is formed with a high speed planetary gear 28a and a low speed planetary gear 28b. High speed planetary gear 28a constantly meshes with high speed sun gear 25, and low speed planetary gear 28b constantly meshes with low speed sun gear 27. In this way, high speed planetary gear 28a and low speed planetary gear 28b are rotatably integral with each other, i.e., are not rotatable relative to each other. A ring gear (internal gear) 15a is formed on an inner peripheral surface of reduction gear housing 15 and constantly meshes with low speed planetary gear 28b.

In this way, high speed sun gear 25 and high speed planetary gear 28a meshing with each other serve as a high speed gear train of speed changing planetary gear transmission SG1. Low speed sun gear 27 and low speed planetary gear 28b meshing with each other serve as a low speed gear train of speed changing planetary gear transmission SG1. Each of sun gears 25 and 27 of the respective high and low speed gear trains is engageable with shifter 21 and is disengageable from shifter 21. The high and low speed gear trains are interposed in parallel between motor output shaft 5 and planetary gear member 28, so that planetary gear member 28 serves as a common output gear of the high and low speed gear trains so as to receive the rotary force of motor output shaft 5 via either the high or low speed gear train depending on whether shifter 21 is set at high speed position H or low speed position L.

While planetary gear member 28 receives the rotary force of motor output shaft 5 via the high planetary gear train (i.e., gears 25 and 28a) when setting shifter 21 at high speed position H, or via the low planetary gear train (i.e., gears 27 and 28b) when setting shifter 21 at low speed position L, planetary gear member 28 receives a rotation-resistant force resisting the rotation thereof via ring gear 15a from hub casing 1 fixed to the vehicle body (i.e., vehicle body frame 101 of lawn mower 100), so that planetary gear member 28 revolves centered on the axis of motor output shaft 5 according to a resultant force of the resistant force received from ring gear 15a and of the rotary force received from either the high speed gear train or the low speed gear train. Therefore, planetary gear carrier 30 and reduction sun gear 31 rotate centered on the axis of motor output shaft 5 so as to follow the revolution of planetary gear member 28.

In this regard, when shifter 21 is disposed at low speed position L, high speed sun gear 25 rotates on motor output shaft 5 so as to follow the rotation of low speed sun gear 27 and planetary gear member 28 driven by motor output shaft 5 and to be free from motor output shaft 5. On the other hand, when shifter 21 is disposed at high speed position H, low speed sun gear 27 rotates on motor output shaft 5 so as to follow the rotation of high speed sun gear 25 and planetary gear member 28 driven by motor output shaft 5 and to be free from motor output shaft 5. When shifter 21 is disposed at neutral position N, only neutral sleeve 26 rotates integrally with motor output shaft 5, and neither the low speed gear train nor the high speed gear train receives the rotary force of motor output shaft 5. In other words, planetary gear member 28 does not receive the rotary force of motor output shaft 5, but receives only the rotation-resistant force from ring gear 15a.

Deceleration planetary gear transmission DG1 is configured in reduction gear housing 15 so as to transmit power from speed changing planetary gear transmission SG1 to axle 4. In this regard, flange 4a of axle 4 supports a planetary gear shaft 33 parallel to motor output shaft 5. A planetary gear 32 is pivoted onto flange 4a via planetary gear shaft 33. Planetary gear 32 constantly meshes with reduction sun gear 31, and constantly meshes with a ring gear (internal gear) 15b formed on an inner peripheral surface of reduction gear housing 15. In this way, reduction sun gear 31, planetary gear 32 and ring gear 15b constitute reduction planetary gear transmission DG1 interposed between planetary gear carrier 30 and axle 4, serving as a representative embodiment of reduction transmission DG for transmitting the output power of the speed changing transmission at the upstream thereof to axle 4.

Planetary gear 32 receives the rotary force from sun gear 31 rotating synchronously to planetary gear carrier 30, and receives a rotation-resistant force resisting the rotation thereof via ring gear 15b from hub casing 1, i.e., reduction gear housing 15, fixed to the vehicle body, i.e., vehicle body frame 101. Planetary gear 32 revolves centered on the axis of motor output shaft 5 based on the received rotary force and rotation-resistant force. Flange 4a of axle 4 serves as a planetary gear carrier of reduction planetary gear transmission DG1 and rotates following the revolution of planetary gear 32, so as to rotate axle 4 integrally with flange 4a.

Figure 8:
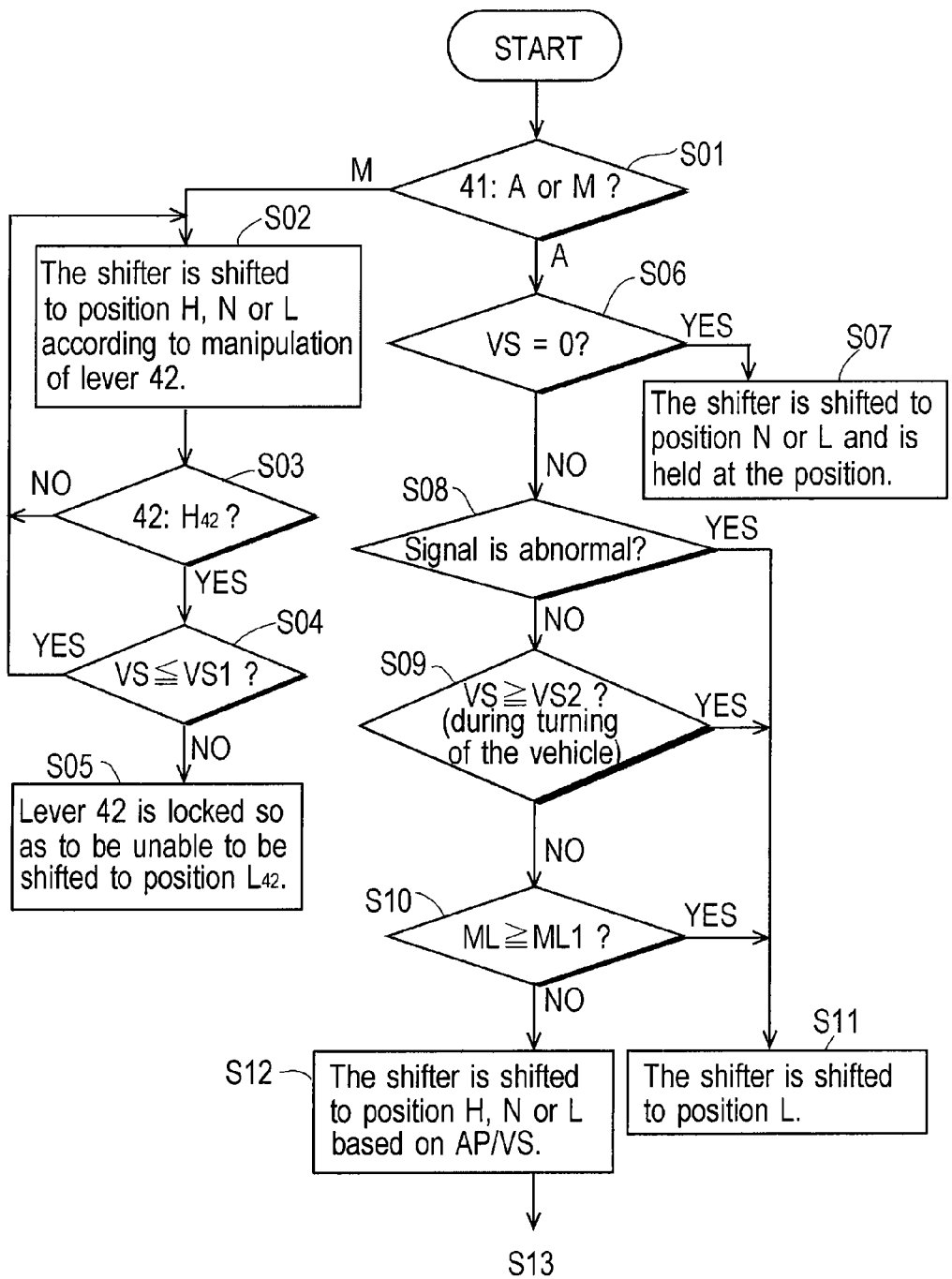
FIG. 8 is a flow chart for controlling shifter 21 in correspondence to various settings and conditions.
Figure 9:
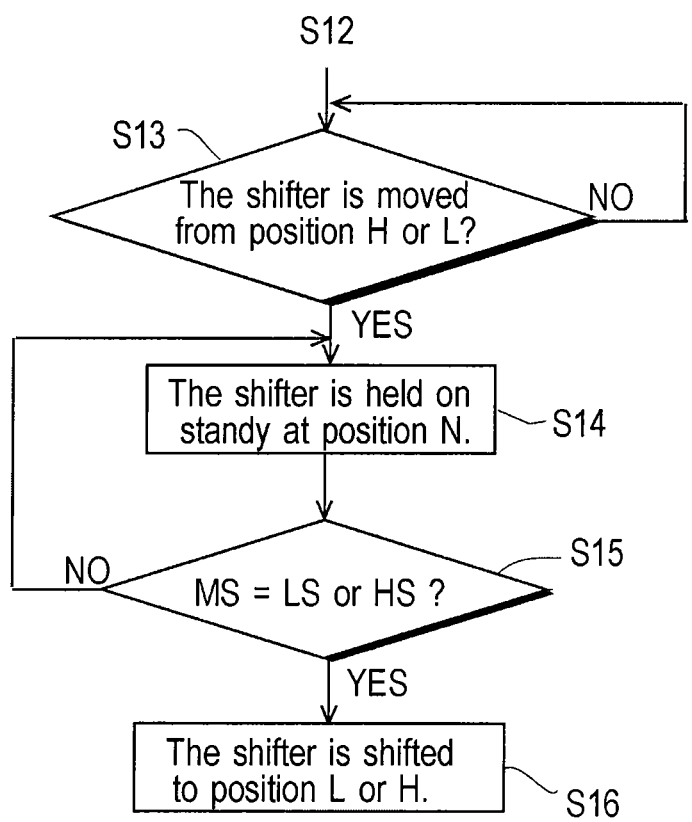
FIG. 9 is a flow chart continuing from the flow chart of FIG. 8 for controlling movement of shifter 21 between high and low speed positions H and L when an automatic mode is selected.

Description will be given of a flow chart of FIGS. 8 and 9, illustrating the control of the position of shifter 21 by controller 40 in correspondence to various conditions of the vehicle (i.e., lawn mower 100) equipped with wheel hub drive units D1 having the above-mentioned structure. First, as shown in FIG. 8, when the manual mode is selected by setting mode selection switch 41 at manual mode position M (at a step S01, M), shifter 21 is disposed at one of high speed position H, neutral position N and low speed position L in correspondence to at which of high speed position $H_{42}$, neutral position $N_{42}$ and low speed position $L_{42}$ the operator optionally sets speed change lever 42 (at a step S02).

However, speed change lever 42 is locked to be prevented from being shifted to low speed position $L_{42}$ (at a step S05) when speed change lever 42 is set at high speed position $H_{42}$ during the selection of the manual mode (at a step S03, YES) and vehicle traveling speed VS is higher than a threshold value VS1 (at a step S04, NO). Alternatively, speed change lever 42 may be shiftable to low speed position $L_{42}$, and meanwhile, shifter 21 may be held at high speed position H during reduction of actual vehicle traveling speed VS toward threshold value VS1, and may be shifted to low speed position L after reduced actual vehicle traveling speed VS becomes equal to threshold value VS1 or less than threshold value VS1.

As show in FIG. 8, when the automatic mode is selected by setting mode selection switch 41 at automatic mode position A (at step S01, A), shifter 21 is essentially set at either high speed position H or low speed position L in correspondence to the ratio AP/VS, which is calculated as a ratio of accelerator operation position AP, that is optionally set by the operator and is detected by accelerator sensor 43a, to actual vehicle traveling speed VS, that is detected by vehicle traveling speed sensor 44 (at a step S12).

For example, on an assumption that a normal range of ratio AP/VS is predetermined, shifter 21 is retained at high speed position H as long as calculated ratio AP/VS exists within the normal range. Shifter 21 is shifted to low speed position L to drive wheels 102 by the high torque via the low speed gear train if calculated ratio AP/VS exceeds a maximum limit of the normal range because vehicle traveling speed VS is abnormally reduced relatively to accelerator operation degree AD. Shifter 21 is also shifted from high speed position H to low speed position L to forcedly reduce vehicle traveling speed VS if vehicle traveling speed VS abnormally increases relatively to accelerator operation degree AD so that calculated ratio AP/VS becomes less than a minimum limit of the normal range thereof.

Here, as shown in FIG. 9, on the way of shift of shifter 21 between high speed position H and low speed position L based on ratio AP/VS in the automatic mode, shifter 21 moved from high speed position H or low speed position L (at a step S13, YES) is temporarily stopped at neutral position N (at a step S14). Shifter 21 is held on standby at neutral position N (at step S14) while either a rotary speed HS of high speed sun gear 25 (if the high speed is target) or a rotary speed LS of low speed sun gear 27 (if the low speed is target) does not match with a rotary speed MS of motor output shaft 5 (at a step S15, NO). Shifter 21 held on standby at neutral position N is shifted to target high or low speed position H or L (at a step S16) as soon as rotary speed HS or LS of target high or low speed sun gear 25 or 27 becomes equal to rotary speed MS of motor output shaft 5 (at step S15, YES). Therefore, the vehicle (lawn mower 100) is prevented from being subjected to sudden speed change or shock the moment that latch 23a engages with target speed sun gear 25 or 27, thereby smoothening change of vehicle traveling speed VS and of rotary speed of motor 6.

For example, when shifting shifter 21 from high speed position H to low speed position L in correspondence to the abnormal reduction of vehicle traveling speed VS, shifter 21 moved from high speed position H is temporarily held at neutral position N. While shifter 21 is held at neutral position N, the depression degree of accelerator pedal 43, i.e., accelerator operation degree AD is reduced so as to reduce the output of motor 6 and rotary speed MS of motor output shaft 5. Shifter 21 held at neutral position N is shifted to low speed position L as soon as reduced rotary speed MS of motor output shaft 5 becomes equal to actual rotary speed LS of low speed sun gear 27. At this time, latch 23a is fitted into latch groove 27a of low speed sun gear 27 rotating substantially synchronously to motor output shaft 5. Therefore, vehicle traveling speed VS and rotary speed MS of motor output shaft 5 are hardly changed at the time of engagement of latch 23a into latch groove 27a.

If the ratio AP/VS is normal, shifter 21 may be considered to be held at high speed position H until the vehicle stops by returning accelerator pedal 43 to its initial non-depression position. However, if shifter 21 is held at high speed position H while the vehicle is stationary, the vehicle must start by the torque via the high speed gear train, which may be insufficient for starting the vehicle. To avoid this problem, during the stationary state of the vehicle after the vehicle stops, i.e., after vehicle traveling speed VS becomes zero (at a step S06, YES), shifter 21 is held at low speed position L for smooth starting of the vehicle by the high torque via the low planetary gear train. Alternatively, during the stationary state of the vehicle, shifter 21 may be held at neutral position N (at a step S07) so as to avoid unexpected start of the vehicle because of an operator's misoperation.

Besides the shift of shifter 21 to low speed position L in correspondence to the calculated ratio AP/VS, shifter 21 set at high speed position H is automatically shifted to low speed position L in correspondence to any of the conditions described hereafter. That is, if any of the conditions is recognized by controller 40 during traveling of the vehicle set in the high speed state, controller 40 automatically shifts shifter 21 to low speed position L. One of the conditions is a case that any of the signals from input and output means inputted to controller 40 is recognized as abnormal (at a step S08, YES). In this case, shifter 21 is forcedly shifted to low speed position L (at a step S11) so as to slow down the vehicle, thereby avoiding danger, and thereby alarming the operator of the abnormal condition.

Another of the conditions to automatically shift shifter 21 to low speed position L is a case that vehicle traveling speed VS is recognized to be equal to or more than a predetermined value VS2 during turning of the vehicle (step S09 and YES), i.e., when the vehicle is recognized as being turning based on the detection signal from steering sensor 46a. In this case, shifter 21 is automatically shifted to low speed position L (step S11) so as to reduce vehicle traveling speed VS during turning of the vehicle, thereby ensuring safety of the vehicle and stable turning of the vehicle.

Another of the conditions to automatically shift shifter 21 to low speed position L is a case that load ML, as a torque applied from drive wheel 102 to motor 6, is recognized to be equal to or more than a threshold value ML1 (step S10 and YES). In this case, shifter 21 is automatically shifted to low speed position L (step S11) so as to reduce the rotary speed of drive wheel 102, thereby reducing load ML. Therefore, motor 6 is prevented from being damagingly overloaded, thereby prolonging its life.

FIGS. 10 to 13 illustrate an alternative wheel hub drive unit D2. Only different points of wheel hub drive unit D2 from wheel hub drive unit D1 will be described on an assumption that elements of wheel hub drive unit D2, which are identical or similar to respective corresponding elements of wheel hub drive unit D1, are designated by the same reference numerals as those designating the elements of wheel hub drive unit D1. This is also adapted to hereinafter descriptions, i.e., descriptions of other alternative wheel hub drive units D3, D4, D5, D6, D7 and D8 shown in FIGS. 14 to 21, of alternative wheel hub drive units E (E1, E2, E3 and E4) shown in FIGS. 25 to 30, of alternative wheel hub drive units F (F1 and F2) shown in FIGS. 31 to 33, and of transaxles G (G1, G2, G3, G4, G5 and G6) shown in FIGS. 34 to 39. That is, each of elements of respective wheel hub drive units D3 to D8, E (E1 to E4) and F (F1 and F2) and respective transaxles G (G1 to G6), which are designated by foregoing reference numerals, is described only if it needs to be described specifically.

In wheel hub drive unit D2, an alternative speed changing planetary gear transmission SG2 is configured in shifter housing 14 and reduction gear housing 15. In this regard, a high speed sun gear 36 is fitted on motor output shaft 5 rotatably relative to motor output shaft 5. A low speed sun gear 38 neighboring high speed sun gear 36 is provided on an inner peripheral surface thereof with an overrunning clutch 37, and is fitted on motor output shaft 5 via overrunning clutch 37. A spline-type shifter 34 is fitted on motor output shaft 5 so as to neighbor high speed sun gear 36 axially opposite to low speed sun gear 38.

Shifter 34 includes a spline hub 35 fixed on an outer peripheral surface of motor output shaft 5, and includes slidable ring member 22, whose inner peripheral surface is splined and is spline-fitted onto a splined outer peripheral surface of spline hub 35 axially slidable on spline hub 35 and unrotatable relative to spline hub 35. An end portion of high speed sun gear 36 facing ring member 22 is formed with clutch-teeth 36a. High speed planetary gear 28a of planetary gear member 28 constantly meshes with high speed sun gear 36, so that gears 36 and 28a serve as a high speed gear train. Low speed planetary gear 28b of planetary gear member 28 meshing with ring gear 15a constantly meshes with low speed sun gear 38, so that gears 38 and 28b serve as a low speed gear train. In this way, in speed changing planetary gear transmission SG2, similar to speed changing planetary gear transmission SG1, the high and low speed gear trains are interposed in parallel between motor output shaft 5 and planetary gear member 28, so that planetary gear member 28 serves as a common output gear of the high and low speed gear trains.

Shifter 34 is shiftable between high speed position H and low speed position L by axial slide of ring member 22 on spline hub 35. A state of shifter 34 shown in FIG. 12, where ring member 22 disengages from clutch-teeth 36a of high speed sun gear 36 and meshes with only spline hub 35, is defined as low speed position L of shifter 34. A state of shifter 34 shown in FIG. 13, where ring member 22 meshes with spline hub 35 and clutch-teeth 36a, is defined as high speed position H of shifter 34.

When shifter 34 is set at high speed position H, high speed sun gear 36 engages with motor output shaft 5 via ring member 22 and spline hub 35 so as to be unrotatable relative to motor output shaft 5. Planetary gear member 28 receives the rotary force of motor output shaft 5 via the high speed gear train, i.e., gears 36 and 28a, and also receives the rotation-resistant force from hub casing 1 via ring gear 15a, so as to revolve around motor output shaft 5, thereby rotating planetary gear carrier 30.

The rotary force of planetary gear carrier 30 is transmitted to axle 4 via reduction planetary gear transmission DG1 in reduction gear housing 15. In reduction planetary gear transmission DG1, reduction planetary gear 32 receives the rotary force of planetary gear carrier 30 via reduction sun gear 31, and receives the rotation-resistant force resisting its rotation from hub casing 1 via ring gear 15b, so as to revolve around reduction sun gear 31, thereby rotating flange 4a of axle 4.

On the other hand, when shifter 34 is set at low speed position L, high speed sun gear 36 is rotatable freely from motor output shaft 5. Meanwhile, low speed sun gear 38 receives the rotary force of motor output shaft 5 via overrunning clutch 37. Overrunning clutch 37 does not transmit the rotary force of motor output shaft 5 to low speed sun gear 38 while the rotary speed of motor output shaft 5 exceeds the rotary speed of low speed sun gear 38. In other words, the rotary force of motor output shaft 5 is transmitted to low speed sun gear 38 only if the rotary speed of low speed sun gear 38 becomes equal to the rotary speed of motor output shaft 5.

In this regard, above-mentioned wheel hub drive unit D1 is configured so that controller 40 controls shifter actuator 47 so as to hold shifter 21 targeting low speed position L at neutral position N before rotary speed LS of target low speed sun gear 27 becomes equal to rotary speed MS of motor output shaft 5, as shown in FIG. 9 (at step S14 and at step S15, NO). On the other hand, wheel hub drive unit D2 uses overrunning clutch 37 instead of control of shifter actuator 47. Due to the above-mentioned structure of overrunning clutch 37, shifter 34 set at low speed position L is held in its neutral state to prevent its transmission of rotary force to the high and low speed gear trains before the rotation of low speed sun gear 38 becomes synchronous to the rotation of motor output shaft 5, and shifter 34 is naturally shifted into its low speed state to transmit the rotary force of motor output shaft 5 to the low speed gear train as soon as the rotation of low speed sun gear 38 becomes synchronous to the rotation of motor output shaft 5. Therefore, wheel hub drive unit D2 when being shifted to the low speed state is prevented from causing shockingly sudden change of the vehicle traveling speed or overloading motor 6.

In this way, shifter 34 is shiftable between high speed position H and low speed position L and is not provided with a neutral position, however, due to the above-mentioned structure of overrunning clutch 37, the control of actuator 47 by controller 40 in correspondence to the detection of rotary speeds of motor output shaft 5 and low speed sun gear 38 is adapted only for controlling shifter 34 between high speed position H and low speed position L. In other words, wheel hub drive unit D1, when shifted from the neutral state to the low speed state, needs the position control of shifter 21 based on the comparison of rotary speed between motor output shaft 5 and low speed sun gear 27, and on the other hand, wheel hub drive unit D2 having overrunning clutch 37 can be shifted from the neutral state to the low speed state while holding shifter 34 at low speed position L. That is, wheel hub drive unit D2, when shifted from the neutral state to the low speed state, requires no detection means for detecting or calculating rotary speeds of motor output shaft 5 and low speed sun gear 38. Therefore, the configuration of wheel hub drive unit D2 for automatically controlling shifter 34 can be simplified because detection of the rotary speeds and detection of the conditions are used only for determining either high or low speed position H or L of shifter 34.

The control flow for controlling shifter 21 of wheel hub drive unit D1 shown in FIG. 8 is adaptable to the two-position shift control of shifter 34 of wheel hub drive unit D2 between high and low speed positions H and L, excluding that shifter 21 is shiftable to neutral position N in correspondence to the ratio AP/VS during traveling of the vehicle (step S12), and that shifter 21 can be held at neutral position N while the vehicle is stationary (step S07).

Figure 14:
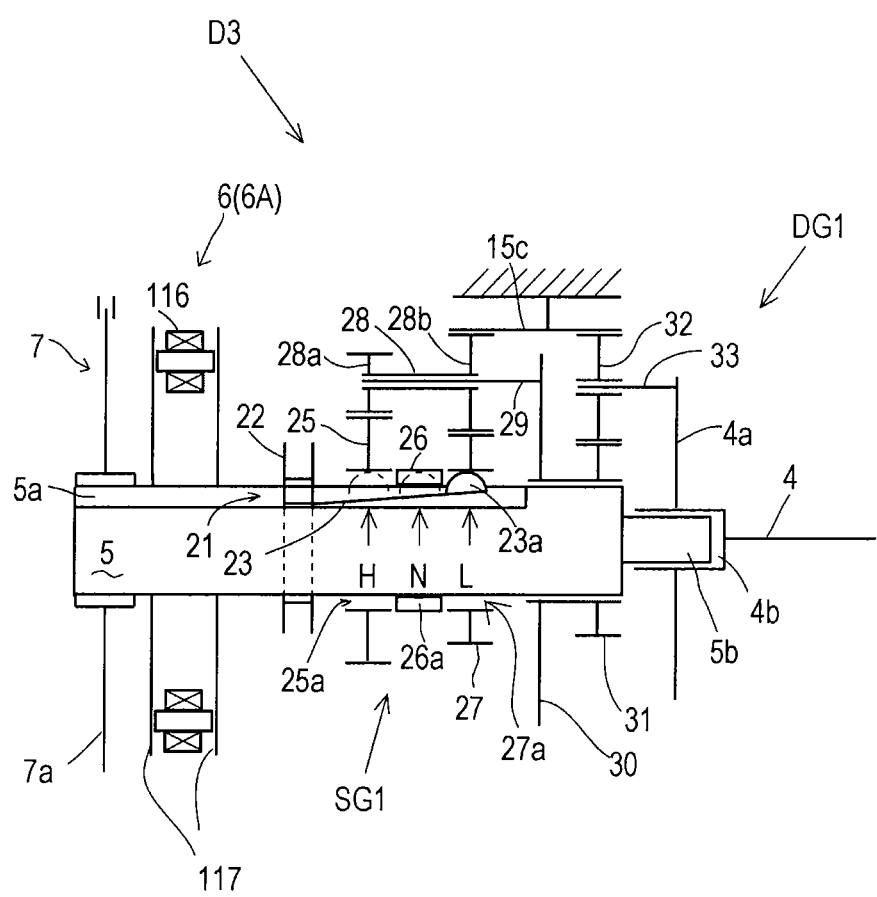
FIG. 14 is a skeleton diagram of a wheel hub drive unit D3 serving as wheel hub drive unit D1 modified to include an axial air gap type electric motor 6A instead of radial air gap type electric motor 6R.

Other alternative wheel hub drive units D will be described. Referring to FIG. 14, a wheel hub drive unit D3 is provided with an axial air gap type electric motor 6A in which a stator 116 is disposed between two discoid rotors 117 so that stator 116, rotors 117 and air gaps between stator 116 and respective rotors 117 are aligned in the axial direction of motor output shaft 5, in comparison to radial air gap type electric motor 6R of wheel hub drive unit 1, in which stator 6a, rotor 6b and the air gap between stator 6a and rotor 6b are aligned radially with respect to motor output shaft 5 serving as a rotary center axis of motor 6.

Referring to FIG. 14, wheel hub drive unit D3 including axial air gap type electric motor 6A is provided with speed changing planetary gear transmission SG1, shifter control system 120 for the three-position control of key-type shifter 21, and reduction planetary gear transmission DG1, similar to those of wheel hub drive unit D1. In wheel hub drive unit D3, speed changing gear transmission SG2 provided with the two-position controlled shifter 34, similar to that of wheel hub drive unit D2, may replace speed changing planetary gear transmission SG1 so as to be combined with axial air gap type electric motor 6A.

In wheel hub drive unit D3, speed changing planetary gear transmission SG1 (which may be replaced with speed changing gear transmission SG2) and reduction planetary gear transmission DG1 have a common ring gear 15c in comparison to that, in each of wheel hub drive units D1 and D2, individual ring gears 15a and 15b are provided for respective transmissions SG1 (or SG2) and DG1. More specifically, in wheel hub drive unit D3, ring gear 15c is integrally formed on an inner peripheral surface of reduction gear housing 15 of hub casing 1 so that a portion of ring gear 17c meshes with low speed planetary gear 28a of planetary gear member 28 to serve as ring gear 15a for speed changing planetary gear transmission SG1 (or SG2), and another portion of ring gear 17c meshes with reduction planetary gear 32 to serve as ring gear 15b for reduction gear transmission DG, thereby simplifying forming of the ring gears on hub casing 1 for constituting planetary gear transmissions SG1 (or SG2) and DG1. In each of wheel hub drive units D1 and D2, having radial air gap type motor 6R, hub casing 1 may be formed with ring gear 15c which has a portion corresponding to ring gear 15a for transmission SG1 (or SG2) and has another portion corresponding to ring gear 15b for transmission DG1.

Any wheel hub drive unit D1, D2 or D3 serving as wheel hub drive unit D including electric motor 6 and speed changing transmission SG1 or SG2 may include a plurality of electric motors 6. All electric motors 6 may be radial air gap type motors 6R, or axial air gap type motors 6A, or combination of radial air gap type motor (or motors) 6R and axial air gap type motor (or motors) 6A. However, such a wheel hub drive unit having a plurality of electric motors and a speed changing transmission is defined as later-discussed wheel hub drive unit F.

Figure 15:
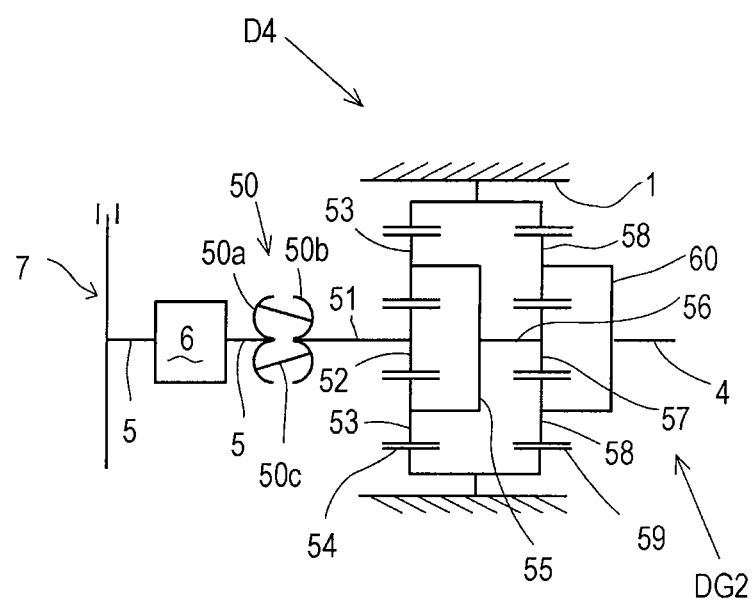
FIG. 15 is a skeleton diagram of a wheel hub drive unit D4 serving as another embodiment of wheel hub drive unit D, wherein wheel hub drive unit D4 includes an electric motor 6, a toroidal CVT 50 serving as a speed changing transmission, and a reduction gear transmission DG2.
Figure 16:
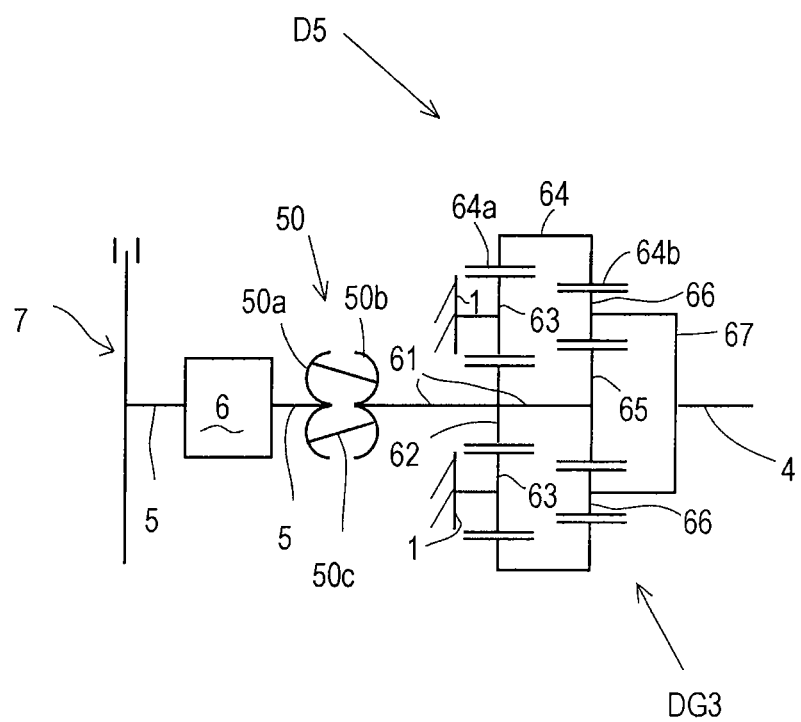
FIG. 16 is a skeleton diagram of a wheel hub drive unit D5 serving as another embodiment of wheel hub drive unit D, wherein wheel hub drive unit D5 includes electric motor 6, toroidal CVT 50, and a reduction gear transmission DG3.

FIG. 15 illustrates a wheel hub drive unit D4, and FIG. 16 illustrates a wheel hub drive unit D5. In each of wheel hub drive units D4 and D5, output shaft 5 of electric motor 6 is disposed coaxially to axle 4, and a toroidal CVT (Continuously Variable Transmission) 50 serves as a speed changing transmission for transmitting power from output shaft 5 of motor 6 to a reduction transmission for driving axle 4. Electric motor 6 may be a radial air gap type motor, an axial air gap type motor, or combination of radial and axial air gap type motors. This is adaptable to electric motor 6 of each of later-discussed wheel hub drive units D6, D7 and D8.

Toroidal CVT 50 includes an input disc 50a, an output disc 50b, and a power roller 50c between input and output discs 50a and 50b. A tilt of power roller 50c between discs 50a and 50b is changed so as to change a rotary speed ratio of output disc 50b to input disc 50a. Motor output shaft 5 is fixed at an axial outward end thereof to input disc 50a.

A doubled reduction planetary gear transmission DG2 of wheel hub drive unit D4 shown in FIG. 15 includes double planetary gear mechanisms, i.e., a first planetary gear mechanism and a second planetary gear mechanism on the downstream of the first planetary gear mechanism. A speed change output shaft (serving as a first reduction input shaft) 51 is fixed to output disc 50b of toroidal CVT 50 and is extended axially outward from output disc 50b and coaxially to motor output shaft 5 and axle 4. The first planetary gear mechanism includes a first sun gear 52, a first ring gear (internal gear) 54, and first planetary gears 53 each of which constantly meshes with both first sun gear 52 and first ring gear 54. First sun gear 52 is fixed on speed change output shaft 51. First ring gear 54 is formed on an inner peripheral surface of hub casing 1. A first planetary gear carrier 55 pivotally supports first planetary gear 53 so as to serve as an output member of the first planetary gear mechanism. A first reduction output shaft (serving as a second reduction input shaft) 56 is fixed to first planetary gear carrier 55, and is extended axially outward from first planetary gear carrier 55 and coaxially to axle 4.

Figure 10:
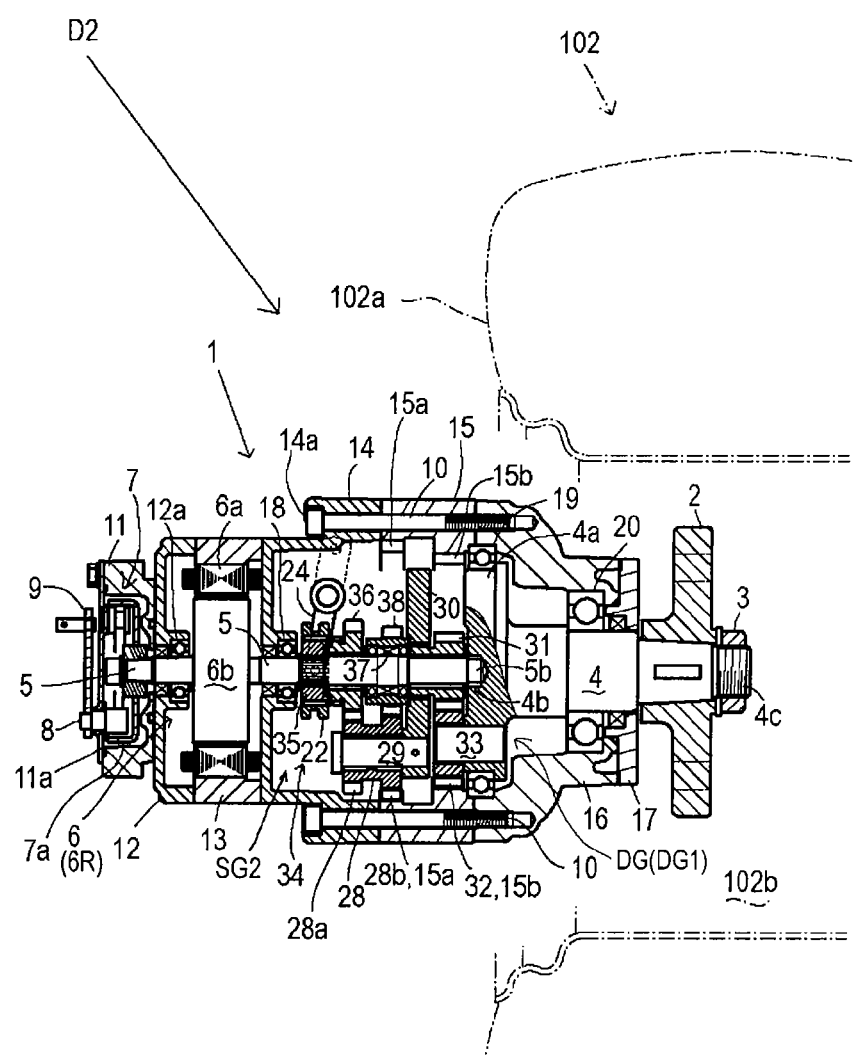
FIG. 10 is a sectional front view of a wheel hub drive unit D2 serving as another embodiment of wheel hub drive unit D, wherein wheel hub drive unit D2 includes radial air gap type electric motor 6R, a speed changing gear transmission SG2 and reduction planetary gear transmission DG1, and wherein speed changing gear transmission SG2 includes a shifter 34 which is shiftable between two positions, i.e., a high speed position H and a low speed position L.
Figure 11:
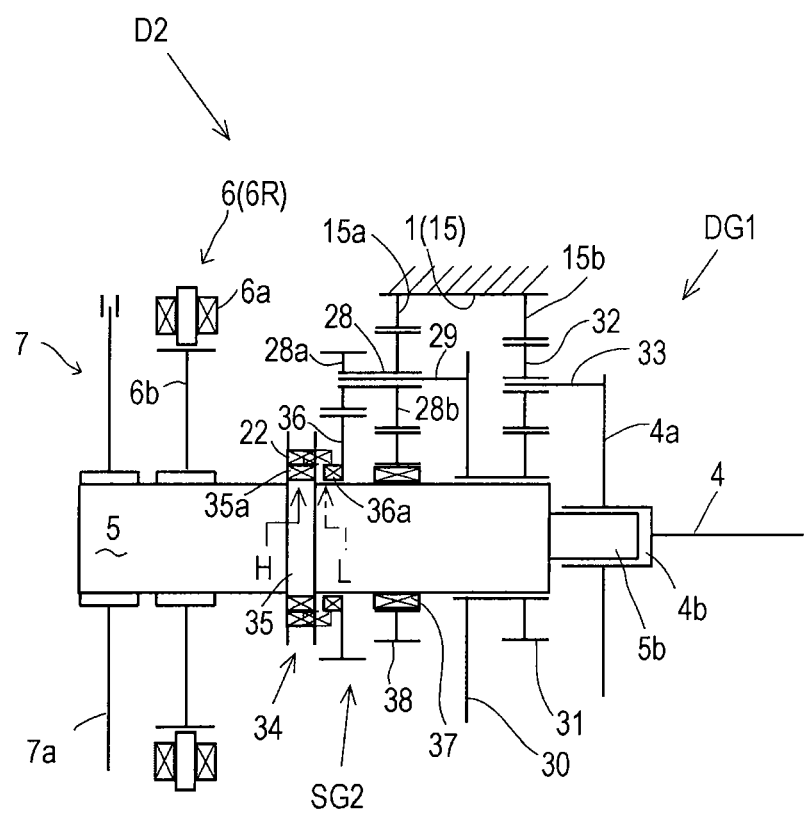
FIG. 11 is a skeleton diagram of wheel hub drive unit D2.
Figure 12:
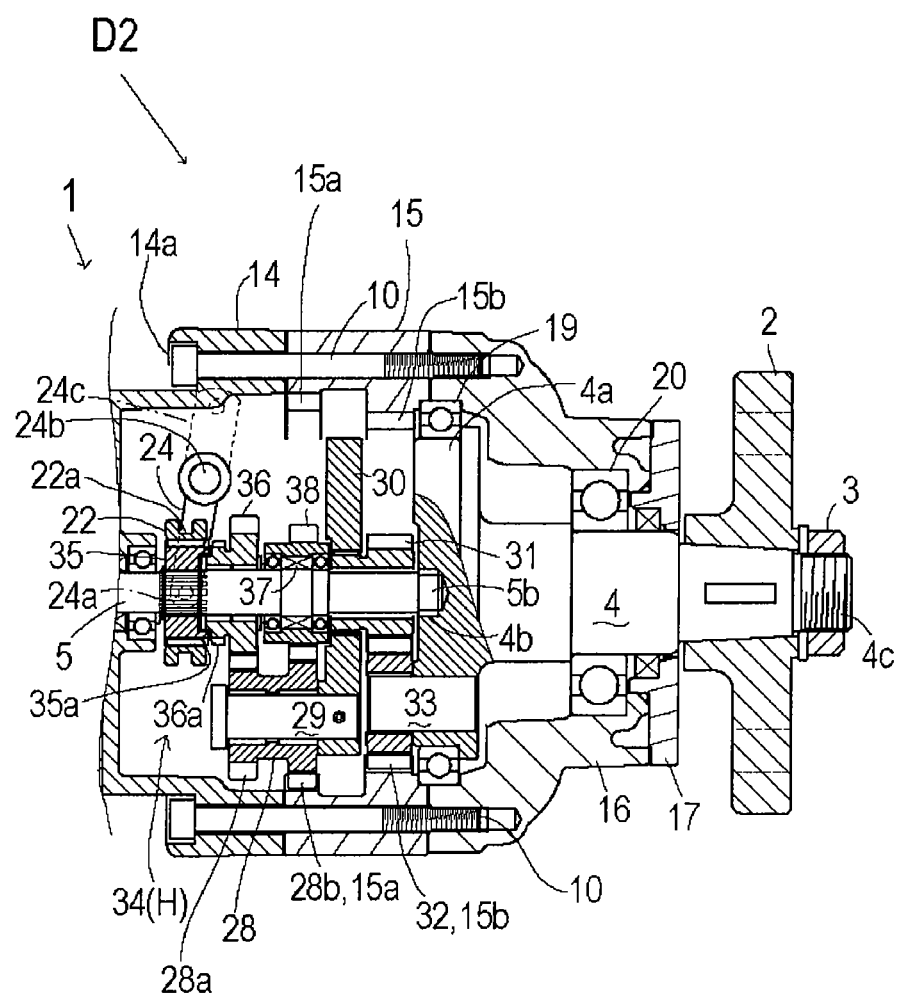
FIG. 12 is an enlarged fragmentary sectional front view of wheel hub drive unit D2, showing speed changing gear transmission SG2 when shifter 34 is set at high speed position H.
Figure 13:
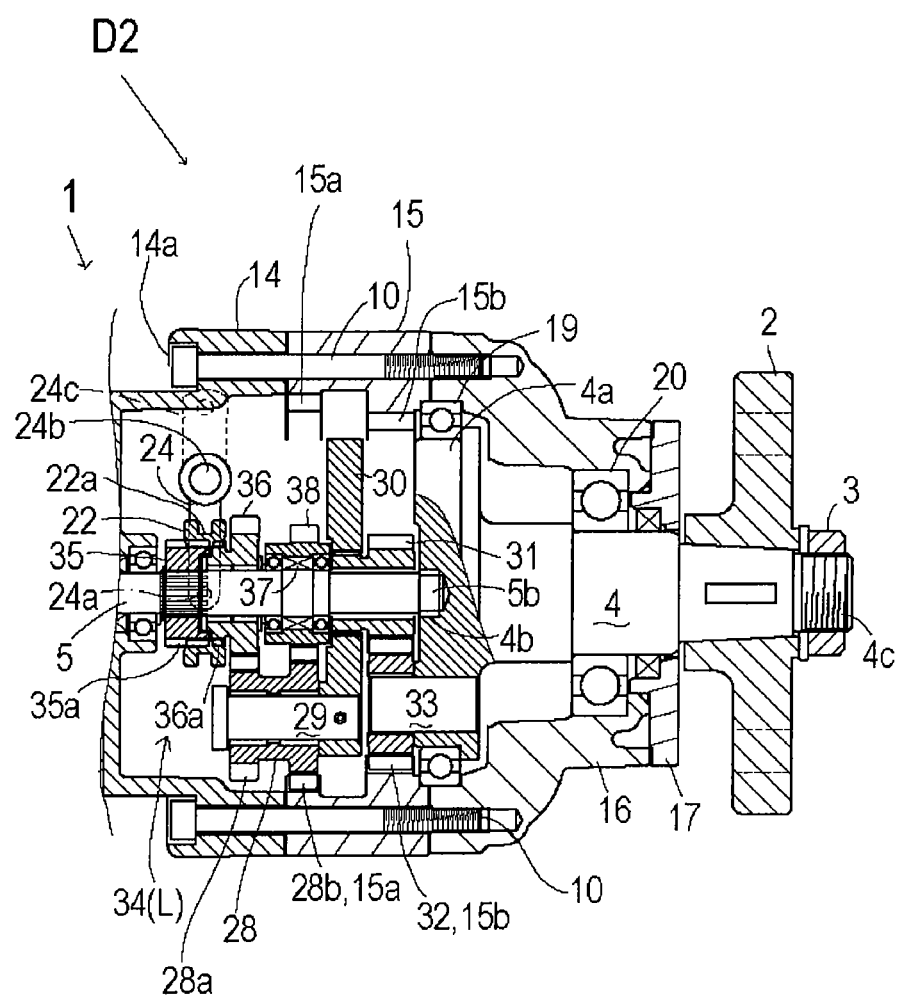
FIG. 13 is an enlarged fragmentary sectional front view of wheel hub drive unit D2, showing speed changing gear transmission SG2 when shifter 34 is set at low speed position L.

The second planetary gear mechanism includes a second sun gear 57, a second ring gear (internal gear) 59, and a second planetary gear 58 constantly meshing with second sun gear 57 and second ring gear 59. Second sun gear 57 is fixed on first reduction output shaft 56. Second ring gear 59 is formed on an inner peripheral surface of hub casing 1. A second planetary gear carrier 60 pivotally supports second planetary gear 58 so as to serve as an output member of the second planetary gear mechanism. Axle 4 is fixed to second planetary gear carrier 60 and is extended axially outward from second planetary gear carrier 60. Flange 4a of axle 4 as shown in FIGS. 2 and 10 may serve as second planetary gear carrier 60.

Accordingly, in the first reduction gear mechanism, first planetary gears 53 receive the rotary force of output shaft 51 of toroidal CVT 50 via first sun gear 52, receive the rotation-resistant force from first ring gear 54 so as to decelerate the rotation thereof by the force from sun gear 52, and output the resultant rotary force to the second reduction gear mechanism via planetary gear carrier 55 and first reduction output shaft 56. Then, in the second reduction gear mechanism, second planetary gears 58 receive the rotary force of first reduction output shaft 56, which is the output force of the first reduction gear mechanism, via second sun gear 57; receive the rotation-resistant force from second ring gear 59 so as to decelerate the rotation thereof by the force from second sun gear 57; and output the resultant force to axle 4 via planetary gear carrier 60.

A reduction gear transmission DG3 of wheel hub drive unit D5 shown in FIG. 16 is a hyper-reduction planetary gear mechanism. In this regard, a speed change output shaft (reduction input shaft) 61 is fixed to output disc 50b of toroidal CVT 50 and is extended axially outward from output disc 50b and coaxially to motor output shaft 5 and axle 4. Sun gears 62 and 65 are fixed on speed change output shaft 61. Planetary gears 53 are supported by hub casing 1 and constantly mesh with sun gear 62. A ring gear member 64 is formed integrally with a first ring gear (internal gear) 64a and a second ring gear (internal gear) 64b. Each of planetary gears 66 constantly meshes with both second ring gear 64b and sun gear 65. A planetary gear carrier 67 pivotally supports planetary gears 66 so as to serve as an output member of reduction gear transmission DG3. Axle 4 is fixed to planetary gear carrier 67 and is extended axially outward from planetary gear carrier 67. Flange 4a of axle 4 as shown in FIGS. 2 and 10 may serve as planetary gear carrier 67.

Therefore, planetary gears 66 pivotally supported by planetary gear carrier 67 receive the output force of toroidal CVT 50, i.e., the rotary force of speed change output shaft 61, via sun gear 65, receives a great rotation-resistant force via ring gears 64a and 64b from sun gear 62 fixed on speed change output shaft 61 and planetary gears 63 supported on hub casing 1 so as to greatly decelerate the rotation thereof by the force from sun gear 65, and output the resultant force to axle 4 via planetary gear carrier 65.

Figure 17:
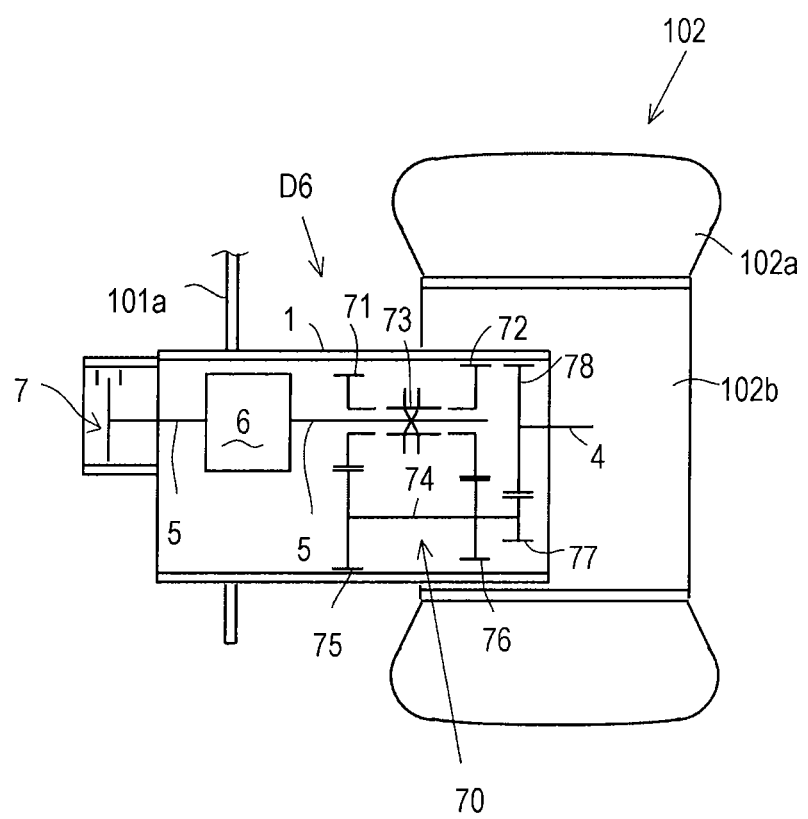
FIG. 17 is a skeleton diagram of a wheel hub drive unit D6 serving as another embodiment of wheel hub drive unit D, wherein wheel hub drive unit D6 includes a motor output shaft 5 disposed axially eccentrically to axle 4, includes an intermediate shaft 74 disposed axially eccentrically to motor output shaft 5 and axle 4, includes a speed changing gear transmission 70 interposed between motor output shaft 5 and intermediate shaft 74, and includes a reduction gear train interposed between intermediate shaft 74 and axle 4.

Description will now be given of wheel hub drive units D6, D7 and D8 each of which includes motor output shaft 5 and axle 4 that are not coaxial, i.e., are axially eccentric to each other. FIG. 17 illustrates wheel hub drive unit D6. In this regard, in hub casing 1, a low speed gear 71 and a high speed gear 72 are fitted on motor output shaft 5 of motor 6 rotatably relative to motor output shaft 5. A shifter 73 is fitted on motor output shaft 5 between gears 71 and 72 axially slidable on motor output shaft 5 and unrotatable relative to motor output shaft 5. Shifter 73 is shiftable among three positions, i.e., a low speed position L, a neutral position N and a high speed position H, according to its axial slide on motor output shaft 5. Shifter 73 set at low speed position L meshes with low speed gear 71 so that low speed gear 71 engages with motor output shaft 5 unrotatably relative to motor output shaft 5. Shifter 73 set at high speed position H meshes with high speed gear 72 so that high speed gear 72 engages with motor output shaft 5 unrotatably relative to motor output shaft 5. Shifter 73 set at neutral position N meshes with neither gear 71 nor gear 72 so that both gears 71 and 72 are rotatable relative to motor output shaft 5.

In hub casing 1 of wheel hub drive unit D6, an intermediate shaft 74 is supported in parallel to motor output shaft 5, a low speed gear 75 is provided on intermediate shaft 74 and constantly meshes with low speed gear 71, and a high speed gear 76 is provided on intermediate shaft 74 and constantly meshes with high speed gear 72, so that a speed changing gear transmission 70, which includes gears 71 and 75 serving as a low speed gear train and includes gears 72 and 76 serving as a high speed gear train, is interposed between motor output shaft 5 and intermediate shaft 74. Further, a pinion 77 is provided on an end portion of intermediate shaft 74 and constantly meshes with a final bull gear 78. Axle 4 is fixed to a center portion of final bull gear 78 and is extended axially outward from final bull gear 78. In this way, pinion 77 and final bull gear 87 serve as a reduction gear train interposed between intermediate shaft 74 and axle 4.

Figure 18:
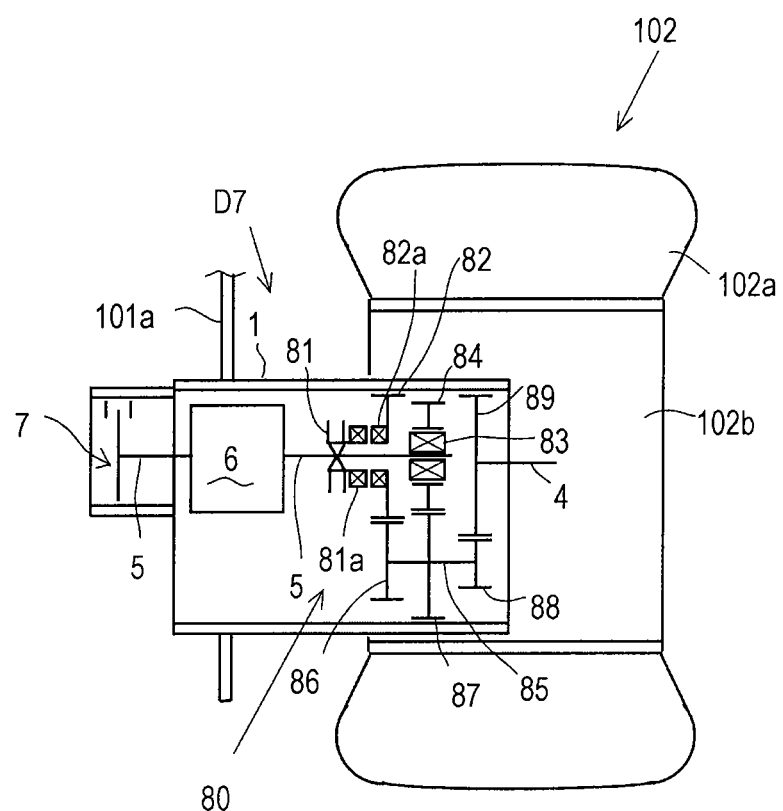
FIG. 18 is a skeleton diagram of a wheel hub drive unit D7 serving as another embodiment of wheel hub drive unit D, wherein wheel hub drive unit D7 includes motor output shaft 5 disposed axially eccentrically to axle 4, includes an intermediate shaft 85 disposed axially eccentrically to motor output shaft 5 and axle 4, includes a speed changing gear transmission 80 interposed between motor output shaft 5 and intermediate shaft 85, and includes a reduction gear train interposed between intermediate shaft 85 and axle 4.

FIG. 18 illustrates wheel hub drive unit D7. In this regard, in hub casing 1, a high speed gear 82 is fitted on motor output shaft 5 of motor 6 rotatably relative to motor output shaft 5, and a low speed gear 84 is fitted on motor output shaft 5 via an overrunning clutch 83. High speed gear 82 is formed with clutch-teeth 82a on an axial end portion thereof opposite to low speed gear 84. A shifter 82 is fitted on motor output shaft 5 axially slidable on motor output shaft 5 and unrotatable relative to motor output shaft 5. Shifter 81 is shiftable between two positions, i.e., a high speed position H and a low speed position L, according to its axial slide. Clutch-teeth 81a of shifter 81 set at high speed position H mesh with clutch-teeth 82a of high speed gear 82. Clutch-teeth 81a of shifter 81 set at low speed position L are separated from clutch-teeth 82a of high speed gear 82.

In hub casing 1 of wheel hub drive unit D7, an intermediate shaft 85 is supported in parallel to motor output shaft 5, a high speed gear 86 is provided on intermediate shaft 85 and constantly meshes with high speed gear 82, and a low speed gear 87 is provided on intermediate shaft 85 and constantly meshes with low speed gear 84, so that a speed changing gear transmission 80, which includes gears 82 and 86 serving as a high speed gear train and includes gears 84 and 87 serving as a low speed gear train, is interposed between motor output shaft 5 and intermediate shaft 85. Further, a pinion 88 is provided on an end portion of intermediate shaft 85 and constantly meshes with a final bull gear 89. Axle 4 is fixed to a center portion of final bull gear 89 and is extended axially outward from final bull gear 89. In this way, pinion 88 and final bull gear 89 serve as a reduction gear transmission interposed between intermediate shaft 85 and axle 4.

Figure 19:
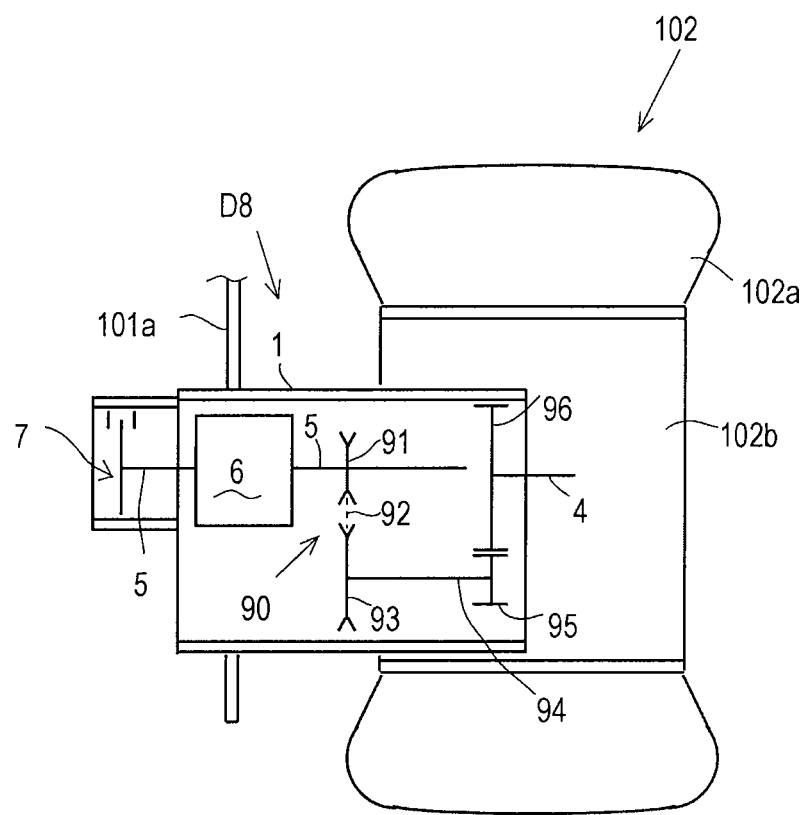
FIG. 19 is a skeleton diagram of a wheel hub drive unit D8 serving as another embodiment of wheel hub drive unit D, wherein wheel hub drive unit D8 includes motor output shaft 5 disposed axially eccentrically to axle 4, includes an intermediate shaft 94 disposed axially eccentrically to motor output shaft 5 and axle 4, includes a speed changing belt transmission 90 interposed between motor output shaft 5 and intermediate shaft 94, and includes a reduction gear train interposed between intermediate shaft 94 and axle 4.

FIG. 19 illustrates wheel hub drive unit D8. In this regard, a belt CVT 90 is disposed in hub casing 1 so as to serve as a speed changing transmission of wheel hub drive unit D8. An input pulley 91 of belt CVT 90 is fixed on motor output shaft 5 of motor 6 in hub casing 1. An intermediate shaft 94 is journalled in hub casing 1 in parallel to motor output shaft 5, and an output pulley 93 of belt CVT 90 is fixed on intermediate shaft 94. A belt 92 made of rubber, metal or other material, is interposed between pulleys 91 and 93 so as to constitute belt CVT 90 serving as the speed changing transmission interposed between motor output shaft 5 and intermediate shaft 94. A pinion 95 is provided on an axial end portion of reduction shaft 94 and constantly meshes with a final bull gear 96. Axle 4 is fixed to a center portion of final bull gear 96, and is extended axially outward from final bull gear 89. In this way, pinion 95 and final bull gear 96 serve as a reduction gear transmission interposed between intermediate shaft 94 and axle 4.

Regarding each of wheel hub drive units D6, D7 and D8, hub casing 1 is fixed to side plate portion 101a of vehicle body frame 101 of the vehicle, i.e., lawn mower 100, as shown in FIGS. 17, 18 and 19. Axle 4 projects at an axial outer portion thereof outward from hub casing 1, and is disposed in rim 102b of drive wheel 102 so as to serve as a center axis of drive wheel 102.

Figure 20:
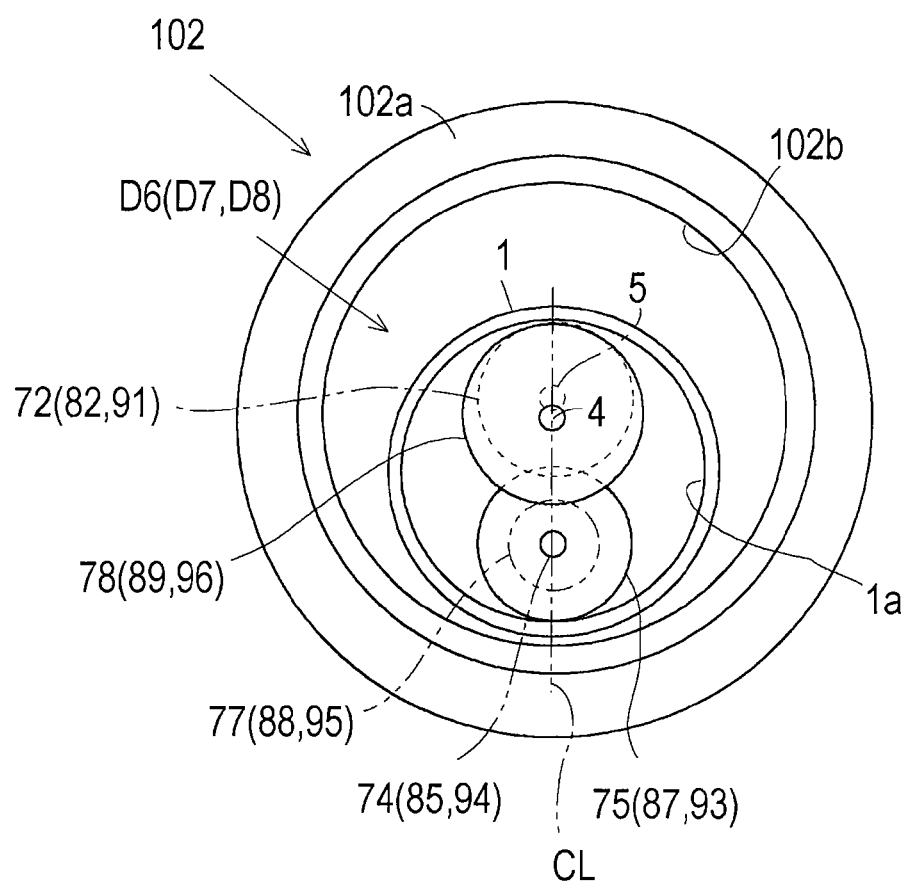
FIG. 20 is a diagram of an arrangement of gears of wheel hub drive unit D6, D7 or D8 disposed in a rim 102b of drive wheel 102 when viewed in an axial direction of axle 4.
Figure 21:
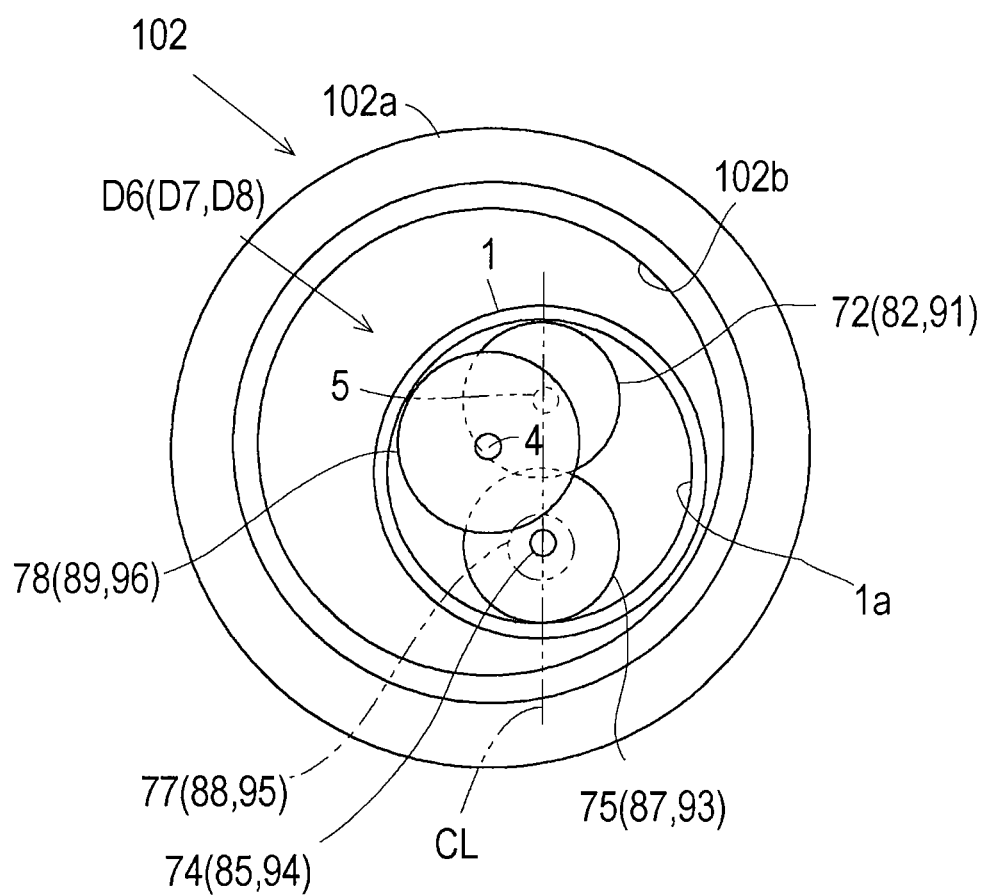
FIG. 21 is a diagram of another arrangement of gears of wheel hub drive unit D6, D7 or D8 disposed in rim 102b of drive wheel 102 when viewed in the axial direction of axle 4.

In this regard, referring to FIGS. 20 and 21, when wheel hub drive unit D6 or D7 is viewed in the axial direction of axle 4, a diametrically largest gear on motor output shaft 5, i.e., high speed gear 72 of wheel hub drive unit D6 or high speed gear 82 of wheel hub drive unit D7, and a diametrically largest gear on intermediate shaft 74 or 85, i.e., low speed gear 75 of wheel hub drive unit D6 or low speed gear 87 of wheel hub drive unit D7, are disposed as inscribed circles inscribed in a circle of inner peripheral surface 1a of hub casing 1 of wheel hub drive unit D6 or D7. When hub drive unit D8 is viewed in the axial direction of axle 4, input pulley 91 on motor output shaft 5 and output pulley 93 on intermediate shaft 94 are disposed as inscribed circles inscribed in the circle of inner peripheral surface 1a of hub casing 1. In each of these arrangements, axle 4 serves as the center axial shaft of final bull gear 78, 89 or 96 and of drive wheel 102, and is disposed in the circle of inner peripheral surface 1a of hub casing 1 so that, when viewed in the axial direction of axle 4, hub casing 1 is wholly disposed in rim 102b so as to have no part projecting outward from rim 102b, thereby ensuring compactness of each of wheel hub drive units D6, D7 and D8 when attached to drive wheel 102.

Axle 4, when axially viewed, is disposed on a line CL joining the axis of motor output shaft 5 to the axis of intermediate shaft 74, 85 or 94 as shown in FIG. 20, or is offset from line CL as shown in FIG. 21.

Alternatively, the motor of each of wheel hub drive units D1 to D8 may be a hydraulic motor, e.g., an axial piston type hydraulic motor having pistons which are slidable in the axial direction of motor output shaft 5. In this case, the hydraulic motor may be provided with a swash plate for defining a displacement thereof. The swash plate is a fixed swash plate when the hydraulic motor has a fixed displacement. Alternatively, the swash plate is a movable swash plate when the hydraulic motor has a variable displacement. In this case, control of the movable swash plate is combined with the shift control of the speed change transmission including the high and low speed gear trains on the downstream of the hydraulic motor, so as to enhance the speed variation of axle 4.

Description will be given of a lawn mower 200 serving as an embodiment of a vehicle equipped with right and left wheel hub drive units E with reference to FIGS. 22-25. The description of the components of lawn mower 100 is adapted as description of components of lawn mower 200 designated by the same reference numerals because the components of lawn mower 200 are identical or similar to those of lawn mower 100 designated by the same reference numerals. Further, wheel hub drive unit E (including wheel hub drive units E1, E2, E3 and E4) will be described on the assumption that the words "axial" and "axially" and the phrases "axially outward", "axially outer", "axially inward" and "axially inner" are defined as mentioned in the description of wheel hub drive unit D. Law mower 200 will be simply referred to as the vehicle, unless it has to be referred to as lawn mower 200. These things will be adapted to later descriptions of lawn mower 300, wheel hub drive unit F (including wheel hub drive units F1 and F2) and transaxle G (including transaxles G1, G2, G3, G4 and G5).

Figure 23:
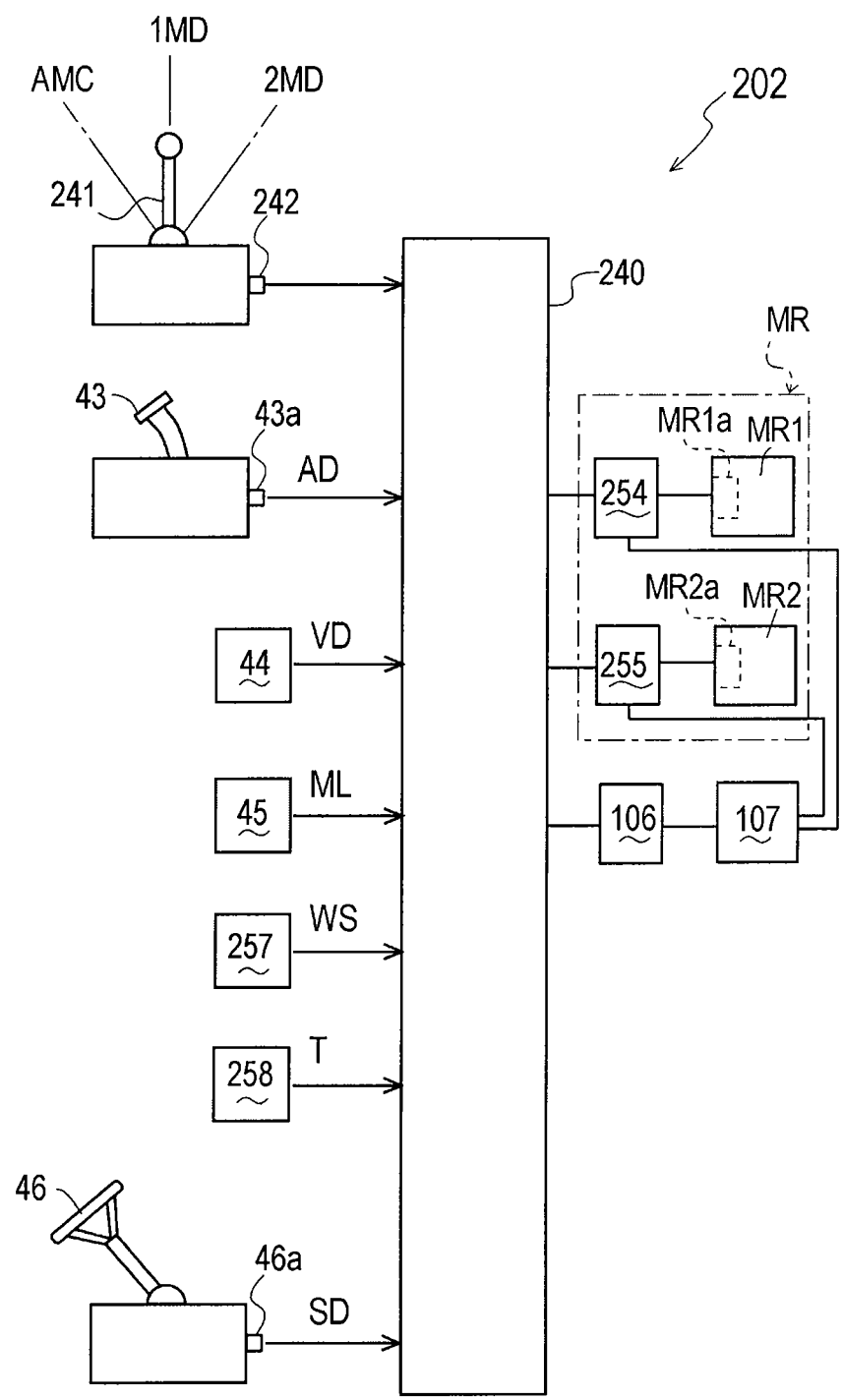
FIG. 23 is a block diagram of a motor torque control system 202 for controlling electric power supply to first and second motor generators MR1 and MR2 in a multiple motor generator unit MR of wheel hub drive unit E.

Referring to FIG. 23, wheel hub drive unit E is defined as a wheel hub drive unit, which includes no mechanical speed changing transmission, such as those of wheel hub drive unit D, but includes a multiple motor generator unit MR. Multiple motor generator unit MR includes a first motor generator MR1 and a second motor generator MR2, whose respective stators (i.e., armature windings) MR1a and MR2a are supplied with electric power from battery 107 (or generator 106) so as to drive a common rotor shaft 205 corresponding to motor output shaft 5 of wheel hub drive unit D. While first and second motor generators MR1 and MR2 share common rotor shaft 205, stators MR1a and MR2a of respective motor generators MR1 and MR2 are supplied with electric power independently of each other.

The electric power supply to first motor generator MR1 has a priority over the electric power supply to second motor generator MR2. In other words, first motor generator MR1 serves as a main motor for driving rotor shaft 205, and second motor generator MR2 serves as an auxiliary motor which is supplementarily supplied with electric power at need so as to drive rotor shaft 205. Either a single motor driving mode or a double motor driving mode is selected as a motor driving mode of multiple motor generator unit MR for driving rotor shaft 205. When multiple motor generator unit MR is set in the single motor driving mode, only first motor generator MR1 is supplied with electric power from battery 107 or generator 106 to its stator MR1a so as to output a motor torque to rotor shaft 205. When multiple motor generator unit MR is set in the double motor driving mode, both motor generator units MR1 and MR2 are supplied with electric power from battery 107 or generator 106 to respective stators MR1a and MR2a thereof so as to output their total motor torque to the rotor shaft.

Each of first and second motor generators MR1 and MR2 serves as a generator for regenerating electric power to be supplied to battery 107 when its stator MR1a or MR2a is not supplied with electric power from battery 107 or generator 106. More specifically, each of stators MR1a and MR2a, when being supplied with no electric power, regenerates electric power while drive wheels 102 are braked or while the vehicle descends a slope.

Lawn mower 200 is provided with a motor torque control system 202 for controlling the output torques of first and second motor generators MR1 and MR2 for driving rotor shaft 205. In this regard, lawn mower 200 is provided with a controller 240, with a first driver 254 for supplying electric power to first stator MR1a of first motor generator MR1, and with a second driver 255 for supplying electric power to second stator MR2a of second motor generator MR2. Each of first and second drivers 254 and 255 includes an inverter, which converts the DC electric power from battery 107 or generator 106 into AC electric power having volume or frequency according to a command signal from controller 240.

Lawn mower 200 is provided with a motor control lever 241 for controlling the electric power supply to stators MR1a and MR2a of motor generators MR1 and MR2. Motor control lever 241 is shiftable among an automatic motor driving control position AMC, a single motor driving position 1MD and a double motor driving position 2MD. A lever sensor 242 detects which of positions AMC, 1MD and 2MD motor control lever 241 is set at, and transmits a detection signal indicating any of positions AMC, 1MD and 2MD to controller 240.

Regarding the motor driving mode of multiple motor generator unit MR, an operator can optionally (manually) select either the single motor driving mode or the double motor driving mode by setting motor control lever 241 at either single motor driving position 1MD or double motor driving position 2MD. When motor control lever 241 is set at single motor driving position 1MD, controller 240 commands only first driver 254 so as to supply stator MR1a of only first motor generator MR1 with the AC electric power from first driver 254, thereby setting multiple motor generator unit MR in the single motor driving mode. While multiple motor generator unit MR is set in the single motor driving mode, second motor generator MR2 can regenerate electric power to be charged to battery 107. When motor control lever 241 is set at double motor driving position 2MD, controller 240 commands both drivers 254 and 255 so as to supply stators MR1a and MR2a of both motor generators MR1 and MR2 with the AC electric powers from respective drivers 254 and 255, thereby setting multiple motor generator unit MR in the double motor driving mode.

Further, when motor control lever 241 is set at automatic motor control position AMC, an automatic motor driving control mode is set so that controller 240 automatically selects either the single motor driving mode or the double motor driving mode in correspondence to various conditions regarding accelerator operation degree AD, vehicle traveling speed VS, load ML, steering operation degree SD, and so on. In this regard, accelerator sensor 43a, vehicle traveling speed sensor 44, load sensor 45, a wheel rotary speed sensor 257, a motor torque sensor 258 and steering sensor 46a transmit respective detection signals to controller 240, so as to serve as detection signal inputting means of motor torque control system 202 for automatically selecting either the single motor driving mode or the double motor driving mode.

As mentioned above in the description of shifter control system 120 of lawn mower 100, the detection signal from accelerator sensor 43a indicates accelerator operation degree AD which is the depression degree of accelerator pedal 43. The detection signal from vehicle traveling speed sensor 44 indicates vehicle traveling speed VS which is the actual traveling speed of lawn mower 200 relative to the ground surface. For example, vehicle traveling speed sensor 44 is an optical sensor or a Doppler radar, or has a rotary wheel whose rotary speed is measured, as mentioned above. The detection signal from load sensor 45 indicates load ML which is torque applied from drive wheel 102 to multiple motor generator unit MR. The detection signal from steering sensor 46a indicates steering operation degree SD which is the rotational degree of steering wheel 46, and a steering operation direction which is the rotational direction of steering wheel 46.

Further, referring to motor torque control system 202 of lawn mower 200, motor torque sensor 258 detects a torque of rotor shaft 205 of multiple motor generator unit MR, for example, so as to issue a detection signal indicating a motor output torque T of multiple motor generator unit MR.

The detection signal from wheel rotary speed sensor 257 indicates a wheel rotary speed WS which is the actual rotary speed of drive wheels 102. In this regard, as later discussed, when any drive wheel 102 slips, wheel rotary speed WS deviates from a value corresponding to vehicle traveling speed VS. The slip is reflected as the load applied onto multiple motor generator unit MR. Therefore, the relation between vehicle traveling speed VS and wheel rotary speed WS can be detected to serve as load ML to be detected by load sensor 45. More specifically, a slip ratio may be defined as a ratio of difference between wheel rotary speed WS and vehicle traveling speed VS to vehicle traveling speed VS, and controller 240 may calculate the slip ratio based on the detection signals from vehicle traveling speed sensor 44 and wheel rotary speed sensor 257 instead of recognition of load ML based on the detection signal from load sensor 45. Therefore, either load sensor 45 or wheel rotary speed sensor 257 may be excepted from motor torque control system 202.

Figure 24:
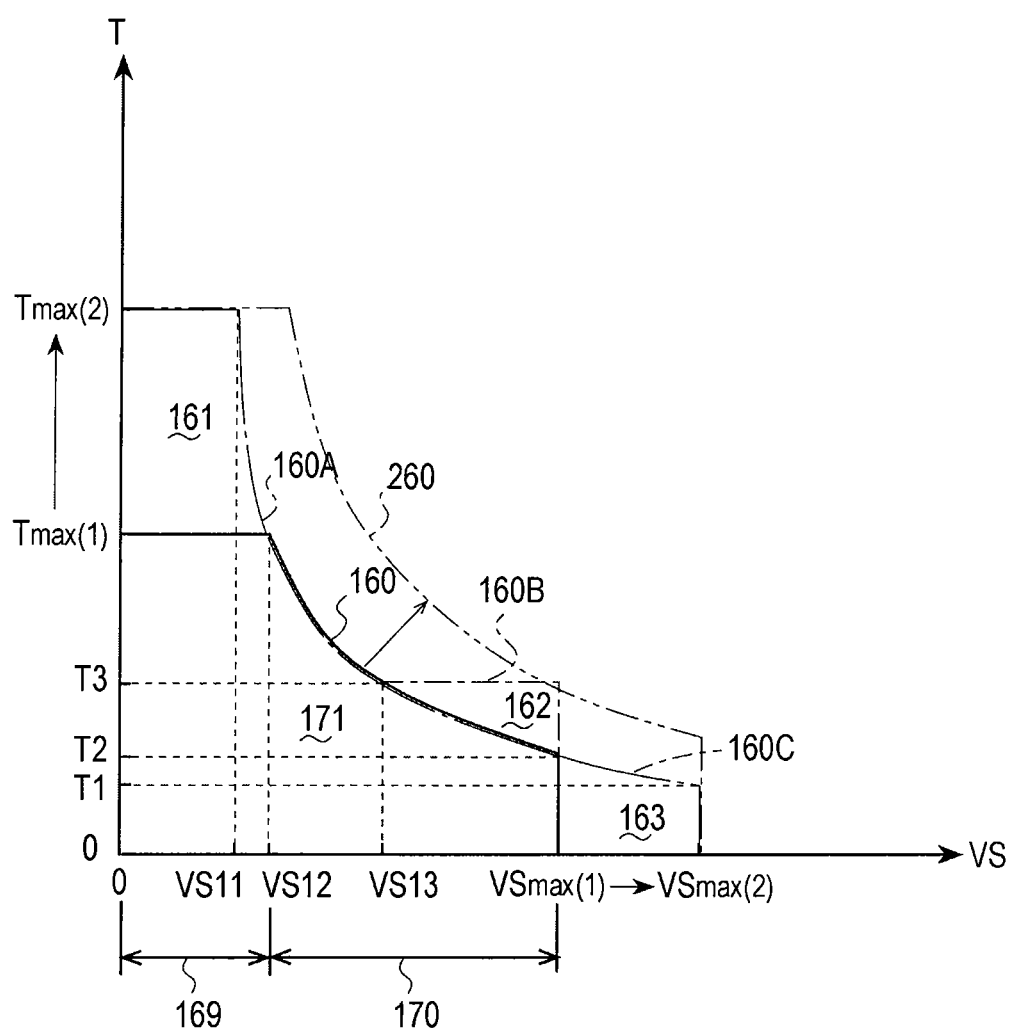
FIG. 24 is a graph of motor output torque T of multiple motor generator unit MR in wheel hub drive unit E relative to vehicle traveling speed VS of lawn mower 200.

FIG. 24 indicates variation of motor torque characteristic, which is motor output torque T relative to vehicle traveling speed VS, especially when the automatic motor driving control mode is set. A motor torque characteristic line 160 indicates a maximum value of motor output torque T every vehicle traveling speed VS, when multiple motor generator unit MR is set in the single motor driving mode and receives no load ML. Motor output torque T relative to vehicle traveling speed VS is variable in a region 171 defined by motor torque characteristic line 160. In this regard, as accelerator pedal 43 is depressed to increase its depression degree indicated as accelerator operation degree AD from zero toward its maximum, vehicle traveling speed VS is increased from zero to a maximum value VSmax(1) in the single motor driving mode. To increase vehicle traveling speed VS in a high torque and low speed range 169 from zero to VS12, first driver 254 is controlled to supply electric power to first motor generator MR1 so as to output a maximum torque Tmax(1), which is the maximum of motor output torque T of multiple motor generator unit MR in the single motor driving mode. As vehicle traveling speed VS increases in a low torque and high speed range 170 from VS12 to VSmax(1), motor output torque T is reduced from Tmax(1) to T2. VSmax(1) is a maximum of vehicle traveling speed VS which can be realized by multiple motor generator unit MR set in the single motor driving mode. T2 is a maximum of motor output torque T which can be outputted by multiple motor generator unit MR set in the single motor driving mode to realize maximum vehicle traveling speed VSmax(1). For example, when accelerator pedal 43 is depressed to accelerator operation degree AD for realizing a vehicle traveling speed VS13, a maximum value of motor output torque T of multiple motor generator unit MR set in the single motor driving mode, i.e., of only first motor generator MR1, is set to be T3.

When accelerator pedal 43 is depressed to a little degree so as to realize vehicle traveling speed VS in low speed range 169, multiple motor generator unit MR can be set into the double motor driving mode so as to change the maximum of motor output torque T into Tmax(2) which is larger than Tmax(1). In this regard, when the automatic motor driving control mode is set and controller 240 recognizes that motor output torque T of only first motor generator MR1 is insufficient to keep target vehicle traveling speed VS in speed range 169, controller 240 further commands second driver 255 to supply electric power to second stator MR2a of second motor generator MR2. Therefore, in addition to region 171, a region 161 defined by a motor torque characteristic line 160A is provided for variation of motor output torque T relative to vehicle traveling speed VS in low speed range 169, so as to increase motor output torque T for surely realizing vehicle traveling speed VS in low speed range 169. When the double motor driving mode is set for vehicle traveling speed VS in low speed range 169, the maximum of motor output torque T for realizing vehicle traveling speed VS between zero and VS11 less than VS12 is Tmax(2), which is the maximum of motor output torque T outputted by motor generators MR1 and MR2 in multiple motor generator unit MR set in the double motor driving mode. As vehicle traveling speed VS increases from VS11 to VS12, the maximum of motor output torque T is reduced from Tmax(2) to Tmax(1), however, it is ensured to be larger than Tmax(1).

When multiple motor generator unit MR is set in the single motor driving mode and accelerator pedal 43 is depressed to accelerator operation degree AD for realizing vehicle traveling speed VS13, the maximum of motor output torque T is set to be T3. As accelerator pedal 43 is further depressed to increase vehicle traveling speed VS from VS13 to VSmax(1), maximum motor output torque T is reduced from T3 to T2. This reduction of motor output torque T can be eliminated by setting multiple motor generator unit MR into the double motor driving mode. In this regard, when the automatic motor driving control mode is set and controller 240 recognizes that motor output torque T of only first motor generator MR1 is insufficient to keep vehicle traveling speed VS between VS13 and VSmax(1) in high speed range 170, controller 240 further commands second driver 255 to supply electric power to second stator MR2a of second motor generator MR2. Therefore, in addition to region 171, a region 162 defined by a motor torque characteristic line 160B is provided for variation of motor output torque T relative to vehicle traveling speed VS between VS13 and VSmax(1) in high speed range 170, so as to increase motor output torque T for surely realizing vehicle traveling speed VS between VS13 and VSmax(1) in high speed range 170. When the double motor driving mode is set for vehicle traveling speed VS between VS13 and VSmax(1) in high speed range 170, the maximum of motor output torque T for realizing vehicle traveling speed VS between VS13 and VSmax(1) is kept to be T3, which is the maximum of motor output torque T outputted by motor generators MR1 and MR2 in multiple motor generator unit MR set in the double motor driving mode.

If accelerator pedal 43 is further depressed beyond accelerator operation degree AD for realizing vehicle traveling speed VSmax(1), multiple motor generator unit MR can be set into the double motor driving mode so as to change the maximum of vehicle traveling speed VS into VSmax(2) which is larger than VSmax(1). In this regard, when the automatic motor driving control mode is set and controller 240 recognizes that detected accelerator operation degree AD is greater (i.e., the depression position of accelerator pedal 43 is deeper) than that corresponding to vehicle traveling speed VSmax(1) which is the maximum of vehicle traveling speed VS realized by motor output torque T of only first motor generator MR1, controller 240 further commands second driver 255 to supply electric power to second stator MR2a of second motor generator MR2. Therefore, in addition to region 171, a region 163 defined by a motor torque characteristic line 160C is provided as a super high speed range of vehicle traveling speed VS that can be realized by motor output torque T of multiple motor generator unit MR. While vehicle traveling speed VS is increased from VSmax(1) to VSmax(2), the maximum of motor output torque T is reduced from T2 to T1. T1 is the maximum of motor output torque T outputted by motor generators MR1 and MR2 of multiple motor generator unit MR set in the double motor driving mode 1 for realizing maximum vehicle traveling speed VSmax(2) when accelerator pedal 43 is depressed to the deepest position, i.e., maximum of accelerator operation degree AD.

Further or alternatively, while multiple motor generator unit MR is set in the single motor driving mode, the volume of electric power supplied to stator MR1a of first motor generator MR1 may be increased so as to create a motor torque characteristic line 260 defining an expanded region for variation of motor output torque T relative to vehicle traveling speed VS. As a result of the increase of electric power to first motor generator MR1, the maximum of motor output torque T can be increased to Tmax(2), for example, for realizing vehicle traveling speed VS in a low speed range, and the maximum of vehicle traveling speed VS realized by motor output torque T can be increased to VSmax(2), for example. In other words, the range of motor output torque T and the range of vehicle traveling speed VS covered by multiple motor generator unit MR set in the single motor driving mode can be enhanced. Therefore, the requirement of second motor generator MR2 for driving rotor shaft 205 can be reduced, and the capacity of second motor generator MR2 can be reduced relative to that of first motor generator MR1.

Figure 25:
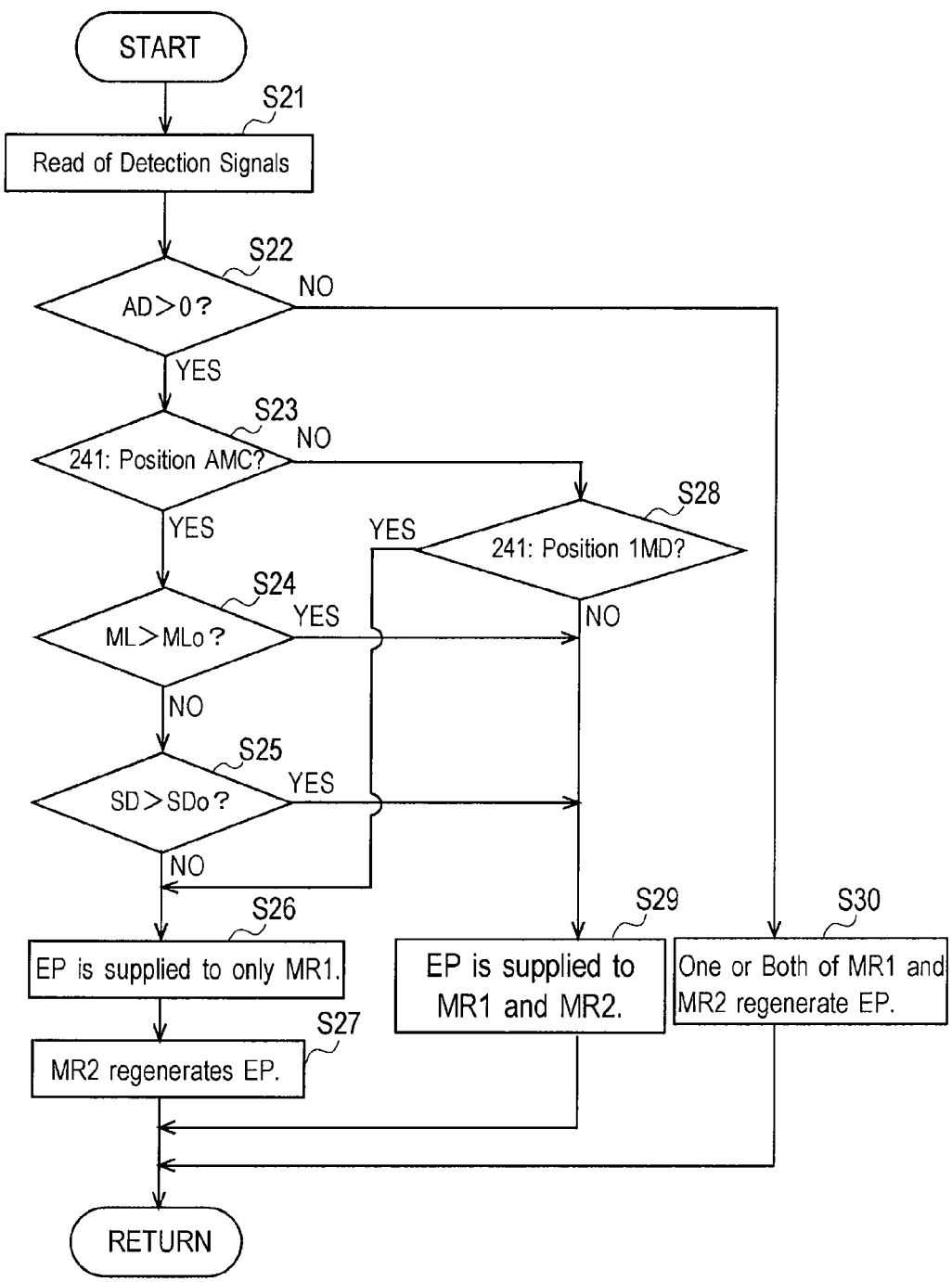
FIG. 25 is a flow chart for controlling electric power to motor generators MR1 and MR2 to control motor output torque T of multiple motor generator unit MR in wheel hub drive unit E.

A control flow for controlling motor generators MR1 and MR2 of multiple motor generator unit MR will be described with reference to FIG. 25. In FIG. 25, electric power is referred to as "EP". First, controller 240 reads the detection signals from sensors 242, 43a, 44, 45, 257, 258 and 46a (at a step S21). Incidentally, for the above-mentioned reason, either load sensor 45 or wheel rotary speed sensor 257 may be omitted. Controller 240 judges whether accelerator operation degree AD exceeds zero, i.e., whether accelerator pedal 43 is depressed or not, i.e., whether the accelerator is operated for traveling of the vehicle or not, based on the detection signal from accelerator sensor 43a indicating accelerator operation degree AD (at a step S22). Unless accelerator pedal 43 is depressed, i.e., when accelerator operation degree AD is zero (at step S22, NO), neither first motor generator MR1 nor second motor generator MR2 is not supplied with electric power EP from battery 107 (or generator 106). In this regard, if the reason why accelerator pedal 43 is not depressed (accelerator operation degree AD is zeroed) is that the vehicle is braked or descends a slope, one or both of motor generators MR1 and MR2 regenerate electric power EP to be charged to battery 107 (at a step S30).

If accelerator pedal 43 is depressed, i.e., accelerator operation degree AD exceeds zero (at step S22, YES), controller 240 judges at which of positions AMC, 1MD and 2MD motor control lever 241 is set based on the detection signal from lever sensor 242 (at steps S23 and S28). If motor control lever 241 is set at single motor driving position 1MD (at step S23, NO, and at step S28, YES), controller 240 selects the single motor driving mode, so that electric power EP from battery 107 (or generator 106) is supplied to only stator MR1a of first motor generator MR (at a step S26), and meanwhile, second motor generator MR2, which is not supplied with electric power EP, regenerates electric power EP to be charged into battery 107 (at a step S27). If motor control lever 241 is set at double motor driving position 2MD (at step S23, NO, and at step S28, NO), controller 240 selects the double motor driving mode, so that electric power EP from battery 107 (or generator 106) is supplied to both stator MR1a of first motor generator MR1 and stator MR2a of second motor generator MR2 (at a step S29).

If motor control lever 241 is set at automatic motor driving control position AMC (at step S23, YES), controller 240 recognizes load ML based on the detection signal from load sensor 45, and judges whether load ML exceeds a threshold value $ML_0$ or not (at a step S24). Alternatively, controller 240 may calculate the slip ratio based on the detection signals from vehicle traveling speed sensor 44 and wheel rotary speed sensor 257 indicating vehicle traveling speed VS and wheel rotary speed WS, and may judge whether the calculated slip ratio exceeds a threshold value of slip ratio or not. If load ML exceeds threshold value $ML_0$ (at step S24, YES), controller 240 selects the double motor driving mode, so that electric power EP is supplied to stators MR1a and MR2a of both first and second motor generators MR1 and MR2 (at step S29).

If load ML does not exceed threshold value $ML_0$ (at step S24, NO), controller 240 recognizes steering operation degree SD based on the detection signal from steering sensor 46a, and judges whether steering operation degree SD exceeds a threshold value $SP_0$ or not (at a step S25). If steering wheel 46 is rotated to steering operation degree SD beyond threshold value $SP_0$ (at step S25, YES), controller 240 selects the double motor driving mode, so that electric power EP is supplied to stators MR1a and MR2a of both first and second motor generators MR1 and MR2 (at step S29).

Incidentally, referring to FIG. 24, while motor control lever 241 is set at automatic motor driving control position AMC, the selection of the double motor driving mode because of load ML exceeding threshold value $ML_0$ or steering operation degree SD exceeding threshold value $SP_0$ means the addition of region 161, 162 or 163 for ensuring variation of motor output torque T relative to vehicle traveling speed VS.

When motor control lever 241 is set at automatic motor driving control position AMC, load ML does not exceed threshold value $ML_0$, and steering operation degree SD of steering wheel 46 does not exceed threshold value $SP_0$ (at step S23, YES, at step S24, NO, and at step S25, NO), controller 240 selects the single motor driving mode, so that electric power EP from battery 107 (or generator 106) is supplied to only stator MR1a of first motor generator MR (at step S26), and meanwhile, second motor generator MR2 which is not supplied with electric power EP regenerates electric power EP to be charged into battery 107 (at step S27). Referring to FIG. 24, this selection of the single motor driving mode means that the variation of motor control torque T relative to vehicle traveling speed VS is ensured in region 171.

Description will now be given of a structure of lawn mower 200 for supporting each of wheel hub drive units E1 or E2 as embodiments of wheel hub drive units E with reference to FIGS. 22 and 26 to 28, on the assumption that lawn mower 100 employs the same structure for supporting wheel hub drive units D. In lawn mower 200 (or 100), each of right and left side plate portions 101a of vehicle body frame 101 is formed with a notch 101b, as best shown in FIG. 27. Notch 101b is a downwardly opened recess, having a semicircular top edge. A hub casing 201 or 261 (or 1) of wheel hub drive unit E1 or E2 (or D) is stepped or flanged so as to have a vertical surface perpendicular to the axial direction of axle 4, an axially inward portion extended axially inward from the vertical surface, and an axially outward portion extended axially outward from the vertical surface. The vertical surface of hub casing 201 or 261 (or 1) contacts one of opposite (inside and outside) vertical surfaces of side plate portion 101a, and one of the axially inward and outward portions of hub casing 201 or 261 (or 1) is inserted into notch 101b so that its upper half and outer peripheral surface is fitted to the semicircular top edge of notch 101b. Then, a horizontal retaining bar 111 separated from side plate portion 101a is fastened to side plate portion 101a via bolts 112 so as to extend across a bottom space of notch 101b, so that a top end surface of retaining bar 111 contacts a bottom end of the axially inward or outward portion of hub casing 201 or 261 (or 1) fitted in notch 101b thereabove.

Figure 26:
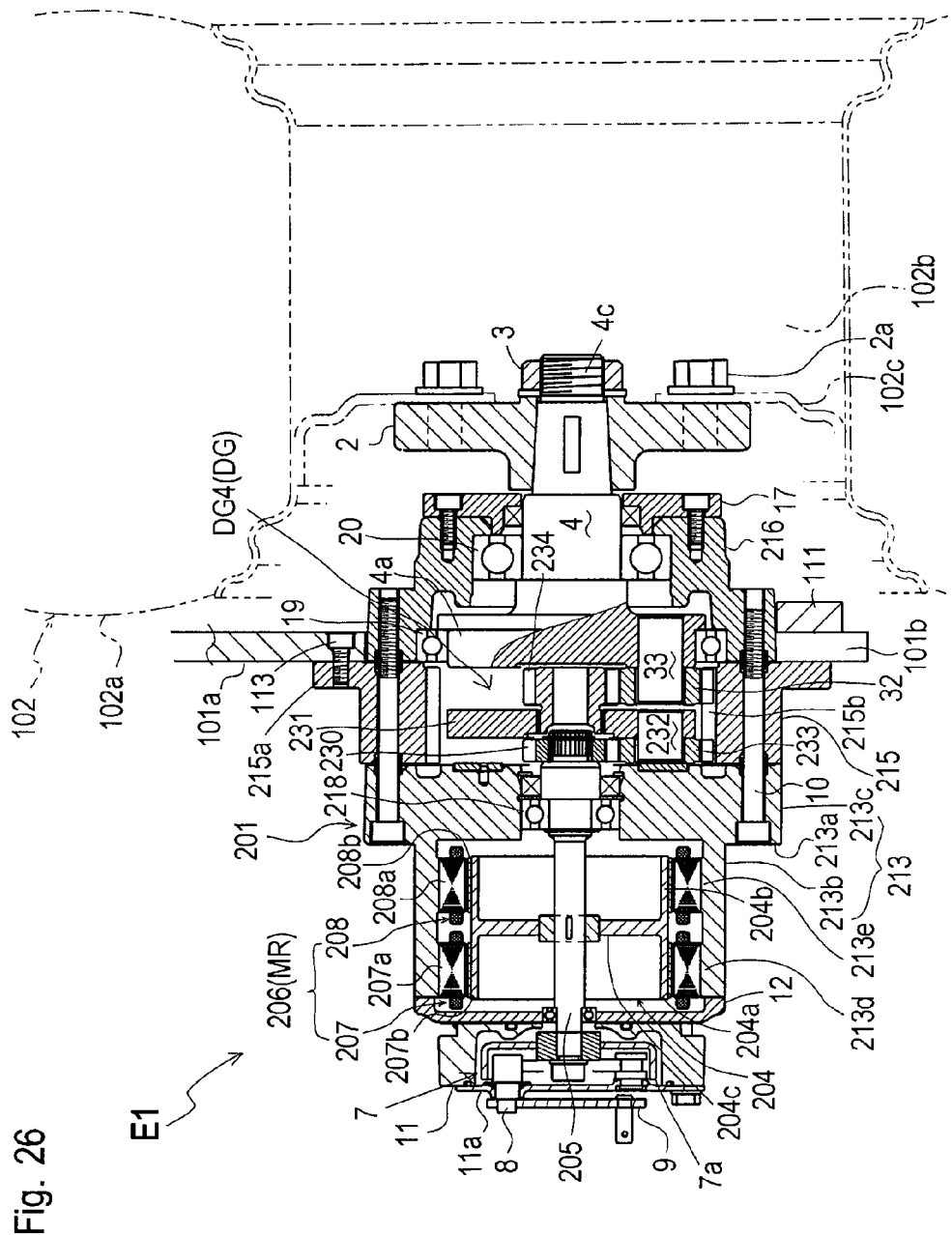
FIG. 26 is a sectional front view of wheel hub drive unit E1 serving as an embodiment of wheel hub drive unit E including multiple motor generator unit MR, a reduction transmission and axle 4, wherein wheel hub drive unit E1 includes a multiple motor generator unit 206 and a reduction gear transmission DG4, and wherein multiple motor generator unit 206 includes radial air gap type motor generators 207 and 208 serving as first and second motor generators MR1 and MR2.
Figure 27:
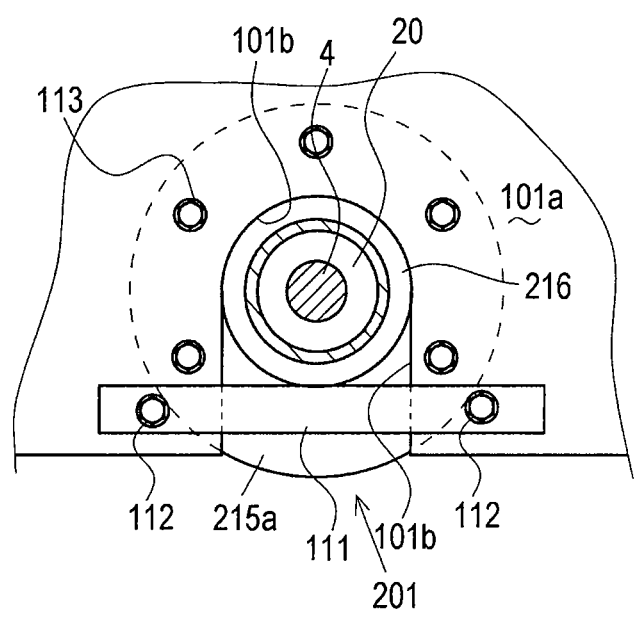
FIG. 27 is a side view of a portion of a vehicle body frame 101 of lawn mower 200 supporting a hub casing 201 of wheel hub drive unit E1.

Referring to FIG. 26, hub casing 201 of wheel hub drive unit E1 is constituted by joining brake housing 11, inside cover 12, a motor housing 213, a reduction gear housing 215, an axle housing 216 and outside cover 17 to one another. Housings 213, 215 and 216 correspond to respective housings 13, 15 and 16 of hub casing 1, and the alignment of housing and covers 11, 12, 213, 215, 216 and 17 in the axial direction of axle 4 is similar to the alignment of corresponding housings and covers 11, 12, 13, 15, 16 and 17 of hub casing 1. Wheel hub drive unit E1 includes a later-discussed multiple motor generator unit 206 serving as multiple motor generator unit MR and a later-discussed reduction planetary gear transmission DG4 serving as one embodiment of reduction transmission D for transmitting power from rotor shaft 205 of multiple motor generator unit 206 to axle 4. However, hub casing 201 does not have a housing corresponding to shifter housing 14 of hub casing 1 because wheel hub drive unit E1 has no speed changing transmission (with a shifter) interposed between rotor shaft 205 and reduction planetary gear transmission DG4.

Motor housing 213 is stepped at an axially intermediate outer peripheral portion thereof so as to have a vertical surface 213a, instead of vertical surface 14a of shifter housing 14, so that a diametrically small portion 213b of motor housing 213 is extended axially inward from vertical surface 213a to incorporate motor generators 207 and 208 of multiple motor generator unit 206, and a diametrically large portion 213c of motor housing 213 is extended axially outward from vertical surface 213a to support a bearing 218 journaling rotor shaft 205. Bolts 10 are axially screwed from vertical surface 213a into diametrically large portion 213c of motor housing 213, reduction gear housing 215 and axle housing 216 so as to fasten housings 213, 215 and 216 together. Further, reduction gear housing 215 is formed at an axially outward end thereof with a flange 215a having a vertical surface. In other words, hub casing 201 is flanged at another axially intermediate outer peripheral portion thereof so as to have another vertical surface.

Figure 28:
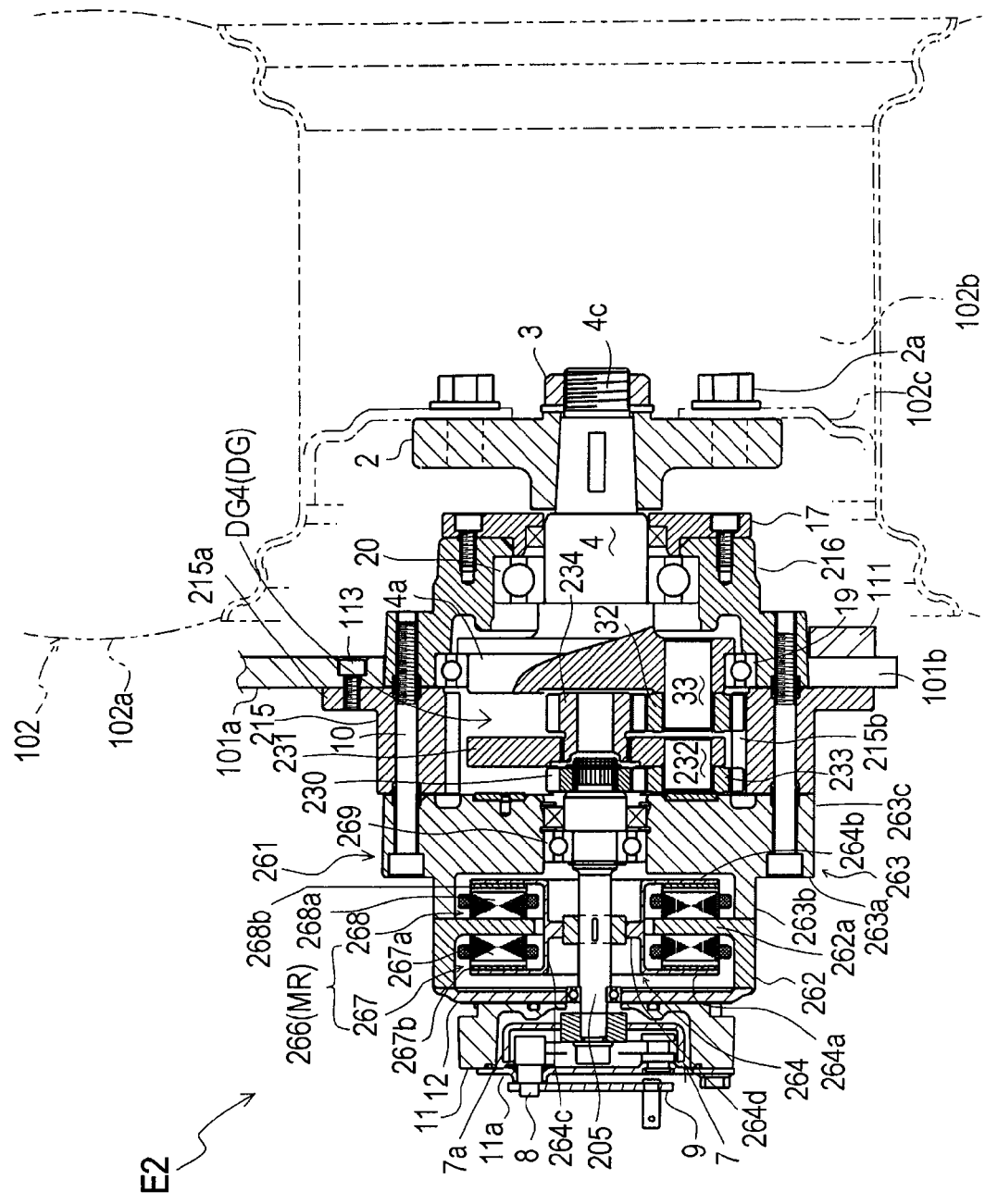
FIG. 28 is a sectional front view of wheel hub drive unit E2 serving as another embodiment of wheel hub drive unit E, wherein wheel hub drive unit E1 includes a multiple motor generator unit 266 and reduction gear transmission DG4, and wherein multiple motor generator unit 266 includes axial air gap type motor generators 267 and 268 serving as first and second motor generators MR1 and MR2.

Referring to FIG. 28, wheel hub drive unit E2 includes a later-discussed multiple motor generator unit 266 serving as multiple motor generator unit MR and reduction planetary gear transmission DG4. Hub casing 261 of wheel hub drive unit E2 is constituted by joining brake housing 11, inside cover 12, a first motor housing 262, a second motor housing 263, reduction gear housing 215, axle housing 216 and outside cover 17 to one another. In this way, hub casing 261 also has no housing corresponding shifter housing 14 of hub casing 1, because wheel hub drive unit E2 has no speed changing transmission (with a shifter) interposed between rotor shaft 205 of multiple motor generator unit 266 and reduction planetary gear transmission DG4.

Motor housings 262 and 263, corresponding to motor housing 213 of hub casing 201, incorporate motor generators 267 and 268 of multiple motor generator unit 266. Second motor housing 263 is stepped at an axially intermediate outer peripheral portion thereof so as to have a vertical surface 263a, instead of vertical surface 14a of shifter housing 14, so that a diametrically small portion 263b of second motor housing 263 is extended axially inward from vertical surface 263a to incorporate motor generator 268, and a diametrically large portion 263c of second motor housing 263 is extended axially outward from vertical surface 213a to support a bearing 269 journaling rotor shaft 205. Bolts 10 are axially screwed from vertical surface 263a into diametrically large portion 263c of second motor housing 263, reduction gear housing 215 and axle housing 216 so as to fasten housings 263, 215 and 216 together. Deceleration gear housing 215 of hub casing 261 is formed with flange 215a similar to reduction gear housing 215 of hub casing 201.

To attach either hub casing 201 or hub casing 261 to side plate portion 101a of vehicle body frame 101, the vertical surface of flange 215a of reduction gear housing 215 contacts the inside vertical surface of side plate portion 101a of vehicle body frame 101, and axle housing 216 is fitted into notch 101b. Flange 215a is fastened to side plate portion 101a by bolts 113, and retaining bar 111 is fastened to side plate portion 101a by bolts 112 so as to contact a bottom end of reduction gear housing 215 in notch 101b. In this way, in hub casing 201 or 261 of each of right and left wheel hub drive units E1 or E2, axle housing 216 and outside cover 217 are extended axially outward from side plate portion 101a into rim 102b of drive wheel 102, whereas reduction gear housing 215, motor housing 213 or motor housings 262 and 263, inside cover 212 and brake housing 211 are extended axially inward from side plate portion 101a.

If side plate portions 101a of vehicle body frame 101 of lawn mower 100 shown in FIG. 1 are formed with respective notches 101b and are provided with respective retaining bars 111, hub casing 1 of each wheel hub drive unit D1 is attached to side plate portion 101a so that vertical surface 14a formed on shifter housing 14 of each hub casing 1 contacts the outside vertical surface of each side plate portion 101a, and the diametrically small portion of shifter housing 14 extended axially inward from vertical surface 14a is fitted into notch 101b. To fix the diametrically large portion of shifter housing 14 axially outward from vertical surface 14a onto side plate portion 101a, bolts 10 may be screwed into the diametrically large portion of shifter housing 14 through side plate portion 101a. Retaining bar 111 is fastened to side plate portion 101a so as to contact a bottom end of the diametrically small portion of shifter housing 14 in notch 101b. In this way, as mentioned above, outside cover 17, axle housing 16, reduction gear housing 15, and the diametrically large portion of shifter housing 14 extended axially outward from vertical surface 14a are extended axially outward from side plate portion 101a, whereas the diametrically small portion of shifter housing 14, motor housing 13, inside cover 12 and brake housing 11 are extended axially inward from side plate portion 101a.

In this regard, in each of wheel hub drive units D and E, the portion of its hub casing extended axially inward from side plate portion 101a of vehicle frame 101 is desired to be axially short because many implements are disposed in the inside space of vehicle body frame 101 between right and left side plate portions 101a. Regarding each of wheel hub drive units E1 and E2, the axially inward portion of hub casing 201 or 261 extended axially inward from side plate portion 101a includes reduction gear housing 215 disposed toward the axially outer end of hub casing 201 or 261 rather than the axially inner end of hub casing 201 or 261, however, it is still axially short because each of hub casings 201 and 261 has no speed changing transmission interposed between multiple motor generator unit 206 or 266 and reduction planetary gear transmission DG4. On the contrary, reduction gear casing 15 of hub casing 1 and the diametrically large main portion of shifter housing 14 are disposed in the axially outward portion of hub casing 1 extended axially outward from side plate portion 101a, so as to shorten the axially inward portion of hub casing 1 extended axially inward from side plate portion 101a in consideration that hub casing 1 incorporates the speed changing transmission, e.g., SG1 or SG2, interposed between motor 6 and the reduction transmission, e.g., DG1.

However, alternatively, hub casing 201 or 261 of wheel hub drive unit E1 or E2 may be attached to side plate portion 101a of vehicle body frame 101 so that vertical surface 213a or 263a of motor housing 213 or 263 contacts the outside vertical surface of side plate portion 101a, and diametrically small portion 213b or 263b of motor housing 213 or 263 extended axially inward from vertical surface 213a or 263a is fitted into notch 101b, if such arrangement is desirable. In this case, outside cover 217, axle housing 216, reduction gear housing 215, and the diametrically large portion of motor housing 213 or 263 extended axially outward from vertical surface 213a or 263a are extended axially outward from side plate portion 101a toward the inside of rim 102b of drive wheel 102, whereas diametrically small portion of motor housing 213 or 263 (and motor housing 262), inside cover 12 and brake housing 11 are extended axially inward from side plate portion 101a. Also, alternatively, hub casing 1 may be stepped or flanged to have a vertical surface at another outer peripheral portion thereof, e.g., at an axially outer end of reduction gear housing 15, so that the axially outer end vertical surface of reduction gear housing 15 may contact the inside surface of side plate portion 101a, and axle housing 16 may be fitted into notch 101b, if such arrangement is desirable.

Figure 31:
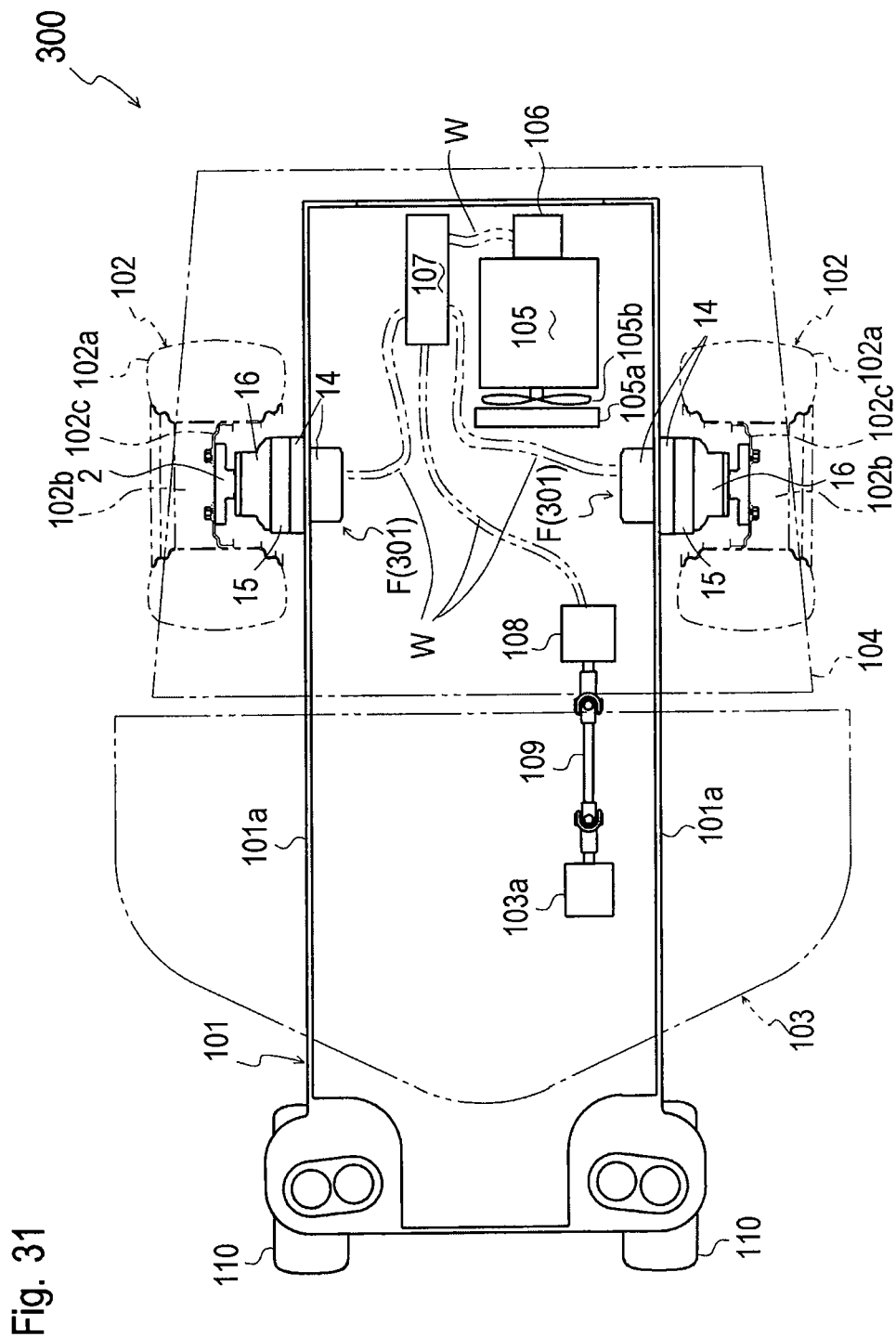
FIG. 31 is a schematic plan view of a lawn mower 300 serving as a vehicle equipped with right and left wheel hub drive units F for driving respective right and left drive wheels 102.

Further, a structure of a hub casing 301 of each of later-discussed wheel hub drive units F1 and F2 shown in FIGS. 32 and 33, serving as embodiments of a wheel hub drive unit F, and an arrangement of hub casing 301 to be attached to side plate portion 101a of vehicle body frame 101 of a later-discussed lawn mower 300 shown in FIG. 31 will now be referred to, on the assumption that side plate portions 101*a* of vehicle body frame 101 of lawn mower 300 are formed with notches 101*b* and are provided with retaining bars 111. Hub casing 301 is constituted by joining brake housing 11, inside cover 12, a motor housing 313, shifter housing 14, reduction gear housing 15, axle housing 16 and outside cover 17 to one another. Motor housing 313, corresponding to motor housing 213 of hub casing 201, incorporates motor generators 207 and 208 of multiple motor generator unit MR.

Similar to shifter housing 14 of hub casing 1 of wheel hub drive unit D, shifter housing 14 of hub casing 301 contacts the inside vertical surface of side plate portion 101*a* at vertical surface 14*a*, and the diametrically small portion of shifter housing 14 is fitted into notch 101*b*. At least one of bolts 10 fastening the diametrically large portion of shifter housing 14 to axle housing 16 through reduction gear housing 15 serve as a bolt 310 which is screwed into the diametrically large portion of shifter housing 14 through side plate portion 101*a*. Retaining plate 111 is fastened to side plate portion 101*a* so as to contact a bottom end of the diametrically small portion of shifter housing 14 in notch 101*b*. Therefore, outside cover 17, axle housing 16, reduction gear housing 15, and the diametrically large portion of shifter housing 14 are extended axially outward from side plate portion 101*a*, whereas the diametrically small portion of shifter housing 14, motor housing 313, inside cover 12 and brake housing 11 are extended axially inward from side plate portion 101*a*. In this regard, for the above-mentioned reason, the diametrically large portion of shifter housing 14 is disposed in the axially outward portion of hub casing 301 extended axially outward from side plate portion 101*a* so as to axially shorten the axially inward portion of hub casing 301 extended axially inward from side plate portion 101*a*. However, alternatively, hub casing 301 may be stepped or flanged to have a vertical surface at another outer peripheral portion thereof; e.g., at an axially outer end of reduction gear housing 15, so that the axially outer end vertical surface of reduction gear housing 15 may contact the inside surface of side plate portion 101*a*, and axle housing 16 may be fitted into notch 101*b*, if such arrangement is desirable.

As understood from the above description, an appropriate axial outward or inward length of wheel hub drive unit D, E or F from side plate portion 101*a* of vehicle body frame 101 can be set depending on which portion of its hub casing is stepped or flanged to have a vertical surface for contacting the vertical surface of side plate portion 101*a*, and depending on which portion of its hub casing is fitted into notch 101*b*. Further, while at least a part of each wheel hub drive unit D, E or F is disposed in rim 102*b* of drive wheel 102, an axial length of a portion of each wheel hub drive unit D, E or F between an inside end of drive wheel 102 and the outside vertical surface of side plate portion 101*a* of vehicle body frame 101 can be set to optimize positions of right and left drive wheels 102 relative to vehicle body frame 101 of lawn mower 100, 200 or 300.

A structure of wheel hub drive unit E1 serving as an embodiment of wheel hub drive unit E will now be described with reference to FIGS. 26 and 27. In wheel hub drive unit E1, as mentioned above, hub casing 201 is constituted by housings 11, 213, 215 and 216 and covers 12 and 17, axle housing 216 of hub casing 201 supports axle 4, and hub 2 is attached onto axle 4, so that the portion of wheel hub drive unit E1 extended axially outward from side plate portion 101*a* of vehicle body frame 101 is disposed in rim 102*b* of drive wheel 102.

Rotor shaft 205 is disposed coaxially to axle 4, is journalled by motor housing 213 via bearing 218, and is journalled by inside cover 12 via bearing 12*a*. An axially outer end of rotor shaft 205 is extended into reduction gear housing 215, and is fixedly provided thereon with a first sun gear 230 of later-discussed reduction planetary gear mechanism DG4 in reduction gear housing 215. An axially inner end of rotor shaft 205 is extended into brake housing 11, and is provided therearound with brake 7 which is similar to that of wheel hub drive unit D.

Motor housing 213 incorporates multiple motor generator unit 206, serving as multiple motor generator unit MR, which includes axially opposite motor generators 207 and 208 centered on rotor shaft 205. One of motor generators 207 and 208 serves as first motor generator MR1 serving as the main motor, and the other of motor generators 207 and 208 serves as second motor generator MR2 serving as the auxiliary motor. Axially inward side motor generator 207 includes armature windings 207*a*, which are fixed to a stator portion 213*d* formed on an axially inward inner peripheral surface of motor housing 213 adjacent to inside cover 12 and are aligned radially with respect to the center axis of rotor shaft 205, so that stator portion 213*d* of motor housing 213 and armature windings 207*a* serve as a stator of axially inward side motor generator 207. Axially outward side motor generator 208 includes armature windings 208*a*, which are fixed to a stator portion 213*e* formed on an axially outward inner peripheral surface portion 213*e* of motor housing 213 adjacent to vertical surface 213*a* of motor housing 213 and are aligned radially with respect to the center axis of rotor shaft 205, so that stator portion 213*e* of motor housing 213 and armature windings 208*a* serve as a stator of axially outward side motor generator 208.

In motor housing 213, rotor shaft 205 is fixedly provided thereon with a rotor drum 204. Rotor drum 204 is formed with a vertical discoid center plate portion 204*c*, which is fixed at a center portion thereof onto rotor shaft 205 and is extended radially (vertically) from rotor shaft 205. Further, rotor drum 204 is formed with a cylindrical rotor portion 204*a* extended axially inward toward inside cover 12 from center plate portion 204*c*, and is formed with a cylindrical rotor portion 204*b* extended axially outward toward diametrically large portion 213*c* of motor housing 213 from center plate portion 204*c*.

Permanent magnets 207*b* are fixed on an outer peripheral surface of rotor portion 204*a* of rotor drum 204 so as to face armature windings 207*a*, so that rotor portion 204*a* of rotor drum 204 with permanent magnets 207*b* serves as a rotor for motor generator 207. Permanent magnets 208*b* are fixed on an outer peripheral surface of rotor portion 204*b* of rotor drum 204 so as to face armature windings 208*a*, so that rotor portion 204*b* of rotor drum 204 with permanent magnets 208*b* serves as a rotor for motor generator 208.

In this way, rotor drum 204 with permanent magnets 207*b* and 208*b* serves as a common rotor shared between motor generators 207 and 208, and rotor shaft 205 serves as a common rotary axis of the common rotor shared between motor generators 207 and 208. In other words, rotor drum 204 and rotor shaft 205 serve as the rotor and rotor shaft of motor generator 207, and also serve as the rotor and rotor shaft of motor generator 208, so that rotor drum 204 and rotor shaft 205 are rotated together if at least one of motor generators 207 and 208 is supplied with electric power from battery 107 (or generator 106) to its armature windings 207*a* or 208*a*. Therefore, rotor drum 204 as a single member is formed with rotor portions 204*a* and 204*b* for respective motor generators 207 and 208 so as to reduce the number of components for providing rotors of respective motor generators 207 and 208.

For convenience of description, armature windings 207a are referred to as stator 207a of motor generator 207, permanent magnets 207b on rotor portion 204a are referred to as rotor 207b of motor generator 207, armature windings 208a are referred to as stator 208a of motor generator 208, and permanent magnets 208b on rotor portion 204b are referred to as rotor 208b of motor generator 208. Motor generators 207 and 208 of multiple motor generator unit 206 are radial air gap type motor generators. In this regard, in motor generator 207, stator 207a, rotor 207b, and an air gap between stator 207a and rotor 207b are aligned radially with respect to the axis of rotor shaft 205. Similarly, in motor generator 208, stator 208a, rotor 208b, and an air gap between stator 208a and rotor 208b are aligned radially with respect to the axis of rotor shaft 205. Radial air gap type motor generators 207 and 208 are advantageous for reducing axial deviation or axial vibration of rotating rotor shaft 205.

In reduction gear housing 215, reduction planetary gear transmission DG4 is configured to transmit the rotation of rotor shaft 205 to axle 4 in axle housing 216. In this regard, as mentioned above, first sun gear 230 is fixed on the axial outward end portion of rotor shaft 205 in reduction gear housing 215. The axially outward end portion of rotor shaft 205 is further extended axially outward from first sun gear 230 and is fitted into a central boss portion of a second sun gear 234 rotatably relative to second sun gear 234. Second sun gear 234 is disposed between rotor shaft 205 and axle 4 and coaxially to rotor shaft 205 and axle 4.

A carrier 231 is fixed on the central boss of second sun gear 234. A first planetary gear (or gears) 233 is pivoted on carrier 231 via a horizontal pivot shaft 232 disposed parallel to rotor shaft 205 and the center axis of second sun gear 234. Reduction gear housing 215 is formed on an inner peripheral surface thereof with a ring (internal) gear 215b. First planetary gear (or gears) 233 meshes with first sun gear 230 and ring gear 215b, so as to receive the rotary force of rotor shaft 205 via first sun gear 230 against the resistance of reduction gear housing 215 via ring gear 215b, thereby revolving centered on rotor shaft 205. Carrier 231 rotates following the revolution of first planetary gear 233 so as to rotate second sun gear 234 integrally with carrier 231.

Flange 4a of axle 4 serves as a carrier which pivots second planetary gear (or gears) 32 via horizontal pivot shaft 232 disposed parallel to the center axis of second sun gear 234. Second planetary gear (or gears) 32 meshes with second sun gear 234 and ring gear 215b, so as to receive the rotary force of second sun gear 234 against the resistance of reduction gear housing 215 via ring gear 215b, thereby revolving centered on axle 4. Axle 4 rotates following the revolution of second planetary gear 32 pivoted on flange 4a.

Referring to wheel hub drive unit E2 shown in FIG. 28 serving as another embodiment of wheel hub drive unit E, its hub casing 261 includes housings 11, 215, 216 and covers 12 and 17, which are identical to those of hub casing 201 of wheel hub drive unit E1, and brake 7, reduction planetary gear transmission DG4 and axle 4 are disposed in hub casing 261 in the same way as those in hub casing 201 of wheel hub drive unit E1. For description of wheel hub drive unit E2, only the structure of multiple motor generator unit 266 and motor housings 262 and 263 will be described because it is the only different structure of wheel hub drive unit E2 from wheel hub drive unit E1. As mentioned above, second motor housing 263 supports rotor shaft 205 via bearing 269 in diametrically large portion 263c thereof. First motor housing 262 is sandwiched between inside cover 12 and diametrically small portion 263b of second motor housing 263. Multiple motor generator unit 266, serving as multiple motor generator unit MR, includes axially opposite motor generators 267 and 268 centered on rotor shaft 205. One of motor generators 267 and 268 serves as first motor generator MR1 serving as the main motor, and the other of motor generators 267 and 268 serves as second motor generator MR2 serving as the auxiliary motor. First motor housing 262 incorporates axially inward side motor generator 267, and diametrically small portion 263b of second motor housing 263 incorporates axially outward side motor generator 268.

First motor housing 262 is formed with a vertical wall portion 262a, which is extended radially (vertically) toward rotor shaft 205 from a cylindrical outer peripheral portion thereof and at an axially outward end thereof adjacent to an axially inward end of diametrically small portion 263b of second motor housing 263. Vertical wall portion 262a has an axially inward vertical surface, on which armature windings 267a are fixed and are aligned radially with respect to the center axis of rotor shaft 205 so as to serve as a stator of motor generator 267. Vertical wall portion 262a has an axially outward vertical surface, on which armature windings 268a are fixed and are aligned radially with respect to the center axis of rotor shaft 205 so as to serve as a stator of motor generator 268.

In first motor housing 262 and diametrically small portion 263b of second motor housing 263, rotor shaft 205 is fixedly provided thereon with a rotor drum 264. Rotor drum 264 is formed with a vertical discoid center plate portion 264d, which is fixed at a center portion thereof onto rotor shaft 205 and is extended radially (vertically) from rotor shaft 205. Further, rotor drum 264 is formed with a cylindrical portion 264c, which is extended axially inward and outward from an outer peripheral end of center plate portion 264d and is flanged at axially inward and outward ends thereof so as to form an axially inward side vertical flat rotor portion 264a and an axially outward side vertical flat rotor portion 264b. Vertical wall portion 262a of first motor housing 262 is disposed in a space between vertical rotor portions 264a and 264b of rotor drum 264.

Permanent magnets 267b are fixed on a vertical surface of axially inward side rotor portion 264a of rotor drum 264 so as to face armature windings 267a fixed on the axially inward vertical surface of vertical wall portion 262a of first motor housing 262, so that rotor portion 264a of rotor drum 264 with permanent magnets 267b serves as a rotor for motor generator 267. Permanent magnets 268b are fixed on a vertical surface of axially outward side rotor portion 264b of rotor drum 264 so as to face armature windings 268a fixed on the axially outward vertical surface of vertical wall portion 262a of first motor housing 262, so that rotor portion 264b of rotor drum 264 with permanent magnets 268b serves as a rotor for motor generator 268.

In this way, rotor drum 264 with permanent magnets 267b and 268b serves as a common rotor shared between motor generators 267 and 268, and rotor shaft 205 serves as a common rotary axis of the common rotor shared between motor generators 267 and 268. Rotor drum 264 and rotor shaft 205 are rotated together if at least one of motor generators 267 and 268 is supplied with electric power from battery 107 (or generator 106) to its armature windings 267a or 268a. Therefore, rotor drum 264 as a single member is formed with rotor portions 264a and 264b for respective motor generators 267 and 268 so as to reduce the number of components for providing rotors of respective motor generators 267 and 268.

For convenience of description, armature windings 267a are referred to as stator 267a of motor generator 267, permanent magnets 267b on rotor portion 264a are referred to as rotor 267b of motor generator 267, armature windings 268a are referred to as stator 268a of motor generator 268, and permanent magnets 268b on rotor portion 264b are referred to as rotor 268b of motor generator 268. Motor generators 267 and 268 of multiple motor generator unit 266 are axial air gap type motor generators. In this regard, in motor generator 267, stator 267a, rotor 267b, and an air gap between stator 267a and rotor 267b are aligned axially in parallel to the axis of rotor shaft 205. Similarly, in motor generator 268, stator 268a, rotor 268b, and an air gap between stator 268a and rotor 268b are aligned axially in parallel to the axis of rotor shaft 205.

Therefore, magnetic flux areas of motor generators 267 and 268 between stator 267a and rotor 267b and between stator 268a and rotor 268b can be expanded in the radial direction of rotor shaft 205 so as to increase their magnetic fluxes, in comparison with magnetic flux areas of radial air gap type motor generators 207 and 208 between stator 207a and rotor 207b and between stator 208a and rotor 208b which are restricted in the axial direction of rotor shaft 205. Even if the magnetic flux areas of motor generators 267 and 268 are as large as the magnetic flux areas of motor generators 207 and 208 so as to ensure magnetic fluxes as much as those of motor generators 207 and 208, first motor housing 262 and diametrically small portion 263b of second motor housing 263 incorporating axial air gap type motor generators 267 and 268 can be axially shorter than corresponding diametrically small portion 213b of motor housing 213 incorporating radial type motor generators 207 and 208. In this way, axial air gap type motor generator unit 266 is advantageous for axially minimizing wheel hub drive unit E in comparison with radial air gap type motor generator unit 206.

Incidentally, hereinafter, an air gap between a stator and a rotor, in the condition that the stator, rotor and air gap are aligned axially in parallel to rotor shaft 205, is referred to as an axial air gap, and an air gap between a stator and a rotor, in the condition that the stator, rotor and air gap are aligned radially with respect to the axis of rotor shaft 205, is referred to as a radial air gap.

Figure 29:
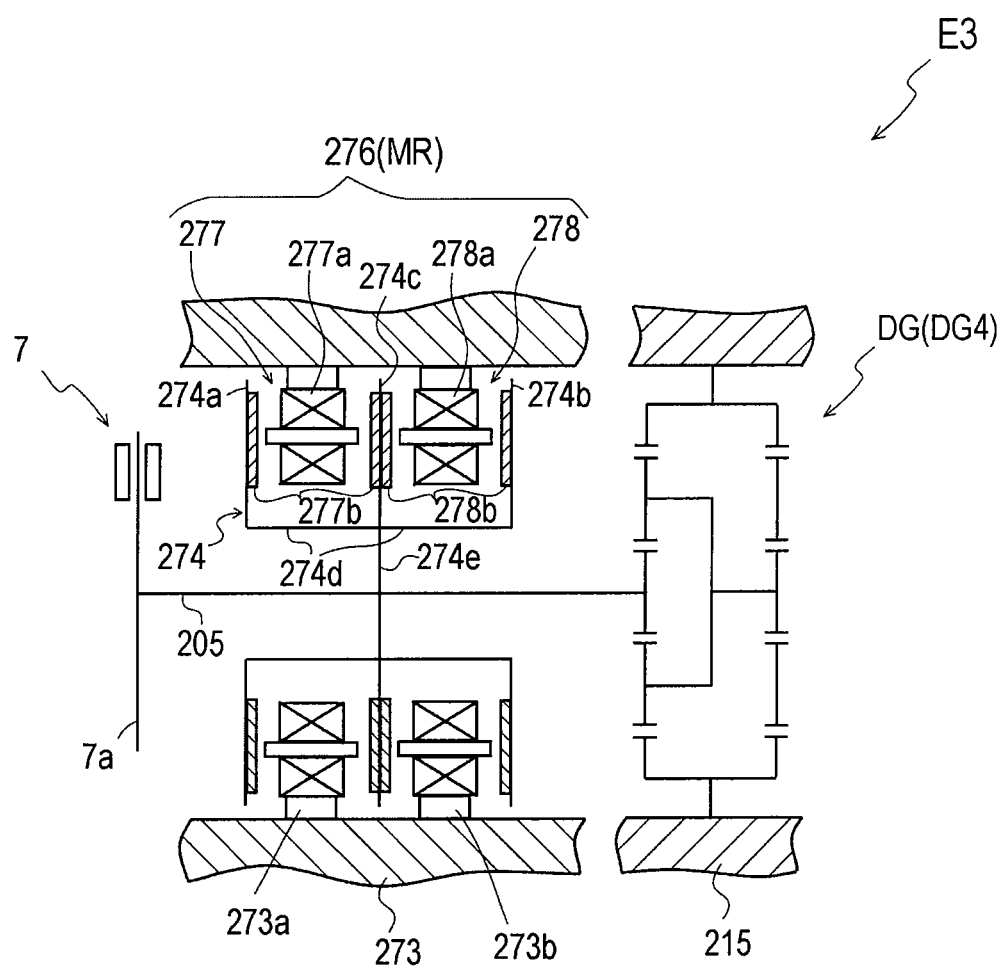
FIG. 29 is a skeleton diagram of a wheel hub drive unit E3 serving as another embodiment of wheel hub drive unit E, wherein wheel hub drive unit E3 includes a multiple motor generator unit 276 and reduction gear transmission DG4, and wherein multiple motor generator unit 276 includes axial air gap type motor generators 277 and 278 serving as first and second motor generators MR1 and MR2.

A wheel hub drive unit E3 shown in FIG. 29 is another embodiment of wheel hub drive unit E, and includes reduction planetary gear transmission DG4 serving as an embodiment of reduction transmission DG, and brake 7. A multiple motor generator unit 276 of wheel hub drive unit E3, serving as multiple motor generator unit MR, includes axial air gap type motor generators 277 and 278, which are improved to increase their magnetic fluxes in comparison with axial air type motor generators 267 and 268 of wheel hub drive unit E2. For description of wheel hub drive unit E3, only the structure of multiple motor generator unit 276 and a motor housing 273 will be described because it is the only different structure of wheel hub drive unit E3 from wheel hub drive unit E2.

In multiple motor generator unit 276, axially opposite motor generators 277 and 278 are provided centered on rotor shaft 205. One of motor generators 277 and 278 serves as first motor generator MR1 serving as the main motor, and the other of motor generators 277 and 278 serves as second motor generator MR2 serving as the auxiliary motor. A hub casing of wheel hub drive unit E3 includes motor housing 273 incorporating motor generators 277 and 278.

Motor housing 273 is formed with stator portions 273a and 273b at axially inward and outward sides on an inner peripheral surface thereof. Armature windings 277a are fixed to axially inward side stator portion 273a and are aligned radially with respect to the center axis of rotor shaft 205 so as to serve as a stator of axially inward side motor generator 277. Armature windings 278a are fixed to axially outward side stator portion 273b and are aligned radially with respect to the center axis of rotor shaft 205 so as to serve as a stator of axially outward side motor generator 278.

In motor housing 273, rotor shaft 205 is fixedly provided thereon with a rotor drum 274. Rotor drum 274 is formed with a vertical center plate portion 274e, which is fixed at a center portion thereof onto rotor shaft 205 and is extended radially (vertically) from rotor shaft 205. Further, rotor drum 274 is formed with a cylindrical portion 274d, which is extended axially inward and outward from an outer peripheral end of vertical center plate portion 274e and is flanged at axially inward and outward ends thereof so as to form an axially inward side vertical flat rotor portion 274a and an axially outward side vertical flat rotor portion 274b. Further, rotor drum 274 is formed with an axially middle vertical flat rotor portion 274c extended radially outward from cylindrical portion 274d between axially inward side rotor portion 274a and axially outward side rotor portion 274b. Armature windings 277a fixed to stator portion 273a are disposed in a space between rotor portions 274a and 274c, and armature windings 278a fixed to stator portion 273b are disposed in a space between rotor portions 274b and 274c.

Permanent magnets 277b are fixed on vertical surfaces of respective rotor portions 274a and 274c of rotor drum 274 facing armature windings 277a therebetween, so that rotor portions 274a and 274c of rotor drum 274 with permanent magnets 277b serve as a rotor for axially inward side motor generator 277. Permanent magnets 278b are fixed on vertical surfaces of respective rotor portions 274b and 274c of rotor drum 274 facing armature windings 278a therebetween, so that rotor portions 274b and 274c of rotor drum 274 with permanent magnets 278b serves as a rotor for axially outward side motor generator 278.

In this way, rotor drum 274 with permanent magnets 277b and 278b serves as a common rotor shared between motor generators 277 and 278, and rotor shaft 205 serves as a common rotary axis of the common rotor shared between motor generators 277 and 278. Rotor drum 274 and rotor shaft 205 are rotated together if at least one of motor generators 277 and 278 is supplied with electric power from battery 107 (or generator 106) to its armature windings 277a or 278a. Therefore, rotor drum 274 as a single member is formed with rotor portions 274a, 274b and 274c for both motor generators 277 and 278 so as to reduce the number of components for providing rotors of respective motor generators 277 and 278.

For convenience of description, armature windings 277a are referred to as stator 277a of motor generator 277, permanent magnets 277b on the vertical surfaces of rotor portions 274a and 274c facing stator 277a therebetween are referred to as rotor 277b of motor generator 277, armature windings 278a are referred to as stator 278a of motor generator 278, and permanent magnets 278b on the vertical surfaces of rotor portions 274b and 274c facing stator 277b therebetween are referred to as rotor 278b of motor generator 278.

Motor generators 277 and 278 of multiple motor generator unit 276 are axial air gap type motor generators. In this regard, axially inward side motor generator 277 has an axial air gap between stator 277a and rotor 277b on axially inward side rotor portion 274a of rotor drum 274, and has another axial air gap between stator 277a and rotor 277b on axially middle rotor portion 274c of rotor drum 274. Similarly, axially outward side motor generator 278 has an axial air gap between stator 278a and rotor 278b on axially outward side rotor portion 274b of rotor drum 274, and has another axial air gap between stator 278a and rotor 278b on axially middle rotor portion 274c of rotor drum 274. In other words, each of motor generators 277 and 278 has the axial air gaps on axially opposite sides of its stator 277a or 278a.

Therefore, each of axial air gap type motor generators 277 and 278, whose stator 277a or 278a has magnetic fields on axially opposite sides thereof, increases motor output torque T in comparison with each of motor generators 267 and 268 whose stator 267a or 268a has a magnetic field on its only one axial side. Further, even in the situation of motor generator unit 276 that rotor portion 274c with permanent magnets 277b and 278b on axially opposite surfaces thereof has to be disposed between stators 277a and 278a so as to serve as rotors for motor generators 277 and 278, axial air gap type motor generator unit 276 still has a merit for axially minimizing wheel hub drive unit E in comparison with radial air gap type motor generator unit 206.

Figure 30:
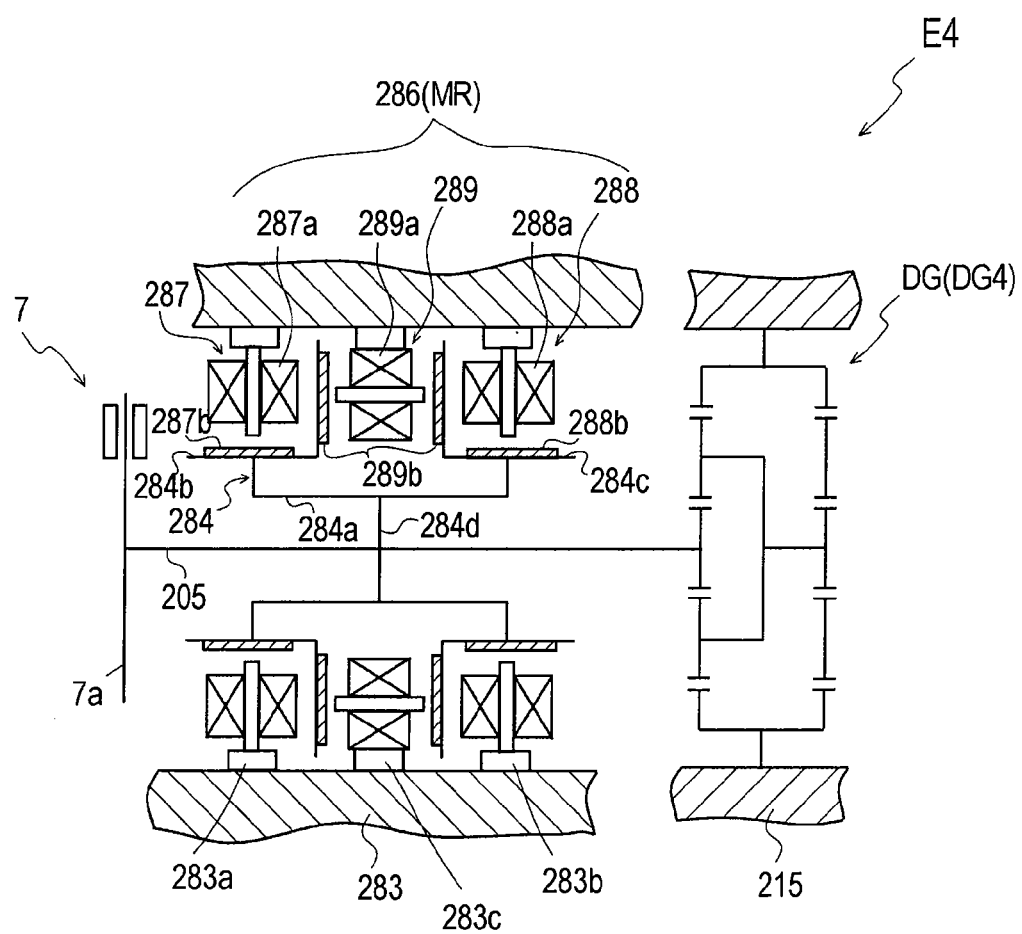
FIG. 30 is a skeleton diagram of a wheel hub drive unit E4 serving as another embodiment of wheel hub drive unit E, wherein wheel hub drive unit E4 includes a multiple motor generator unit 286 and reduction gear transmission DG4, and wherein multiple motor generator unit 286 includes axial air gap type motor generators 287 and 288 and a radial air gap motor generator 289, serving as first and second motor generators MR1 and MR2.

A wheel hub drive unit E4 shown in FIG. 30 is another embodiment of wheel hub drive unit E, and includes reduction planetary gear transmission DG4 serving as an embodiment of reduction transmission DG, and brake 7. A multiple motor generator unit 286 of wheel hub drive unit E3, serving as multiple motor generator unit MR, includes radial air gap type motor generators 287 and 288 and an axial air gap type motor generator 289. For description of wheel hub drive unit E3, only the structure of multiple motor generator unit 286 and a motor housing 283 will be described because it is the only different structure of wheel hub drive unit E4 from wheel hub drive unit E3.

In multiple motor generator unit 286, an axial inward side motor generator 287, an axial outward side motor generator 288, and an axial middle motor generator 289 between motor generators 287 and 288 are provided centered on rotor shaft 205. One or two of motor generators 287, 288 and 289 serve as first motor generator MR1 serving as the main motor, and the other one or two of motor generators 287, 288 and 289 serve as second motor generator MR2 serving as the auxiliary motor. A hub casing of wheel hub drive unit E4 includes motor housing 283 incorporating motor generators 287, 288 and 289.

Motor housing 283 is formed on an inner peripheral surface thereof with an axially inward side stator portion 283a, an axially outward side stator portion 283b and an axially middle stator portion 283c between stator portions 283a and 283b. Armature windings 287a are fixed to axially inward side stator portion 283a and are aligned radially with respect to the center axis of rotor shaft 205 so as to serve as a stator of axially inward side motor generator 287. Armature windings 288a are fixed to axially outward side stator portion 283b and are aligned radially with respect to the center axis of rotor shaft 205 so as to serve as a stator of axially outward side motor generator 288. Armature windings 289a are fixed to axially middle stator portion 283c and are aligned radially with respect to the center axis of rotor shaft 205 so as to serve as a stator of axially middle motor generator 289.

In motor housing 283, rotor shaft 205 is fixedly provided thereon with a rotor drum 284. Rotor drum 284 is formed with a vertical center plate portion 284d, which is fixed at a center portion thereof onto rotor shaft 205 and is extended radially (vertically) from rotor shaft 205. Further, rotor drum 284 is formed with a cylindrical portion 284c extended axially inward and outward from an outer peripheral end of vertical center plate portion 284d. Cylindrical portion 284c of rotor drum 284 is formed at an axially inward end portion thereof with a rotor portion 284a, and is formed at an axially outward end portion thereof with a rotor portion 284b.

Rotor portion 284a is formed with an outer peripheral surface axially extended between rotor shaft 205 and armature windings 287a fixed to stator portion 283a, and permanent magnets 287b are fixed onto the outer peripheral surface of rotor portion 284a so as to face armature windings 287a, thereby serving as a rotor of axially inward side motor generator 287. Rotor portion 284b is formed with an outer peripheral surface extended axially between rotor shaft 205 and armature windings 288a fixed to stator portion 283b, and permanent magnets 288b are fixed onto the outer peripheral surface of rotor portion 284b so as to face armature windings 288a, thereby serving as a rotor of axially outward side motor generator 288.

Rotor portion 284a is formed with a vertical surface, which is extended radially outward from an axially outward end of the outer peripheral surface of rotor portion 284a and is disposed between stators 287a and 289a. Rotor portion 284b is also formed with a vertical surface, which is extended radially outward from an axially inward end of the outer peripheral surface of rotor portion 284b and is disposed between stators 288a and 289a. Permanent magnets 289b are fixed on the vertical surfaces of respective rotor portions 284a and 284b of rotor drum 284 so as to face armature windings 289a therebetween so that the vertical surfaces of rotor portions 284a and 284b of rotor drum 284 with permanent magnets 289b serve as a rotor of axially middle motor generator 289.

In this way, rotor drum 284 with permanent magnets 287b, 288b and 289b serves as a common rotor shared between motor generators 287, 288 and 289, and rotor shaft 205 serves as a common rotary axis of the common rotor shared among motor generators 287, 288 and 289, so that rotor drum 284 and rotor shaft 205 are rotated if at least one of motor generators 287, 288 and 289 is supplied with electric power from battery 107 (or generator 106) to its armature windings 287a, 288a or 289a. Therefore, rotor drum 284 as a single member is formed with rotor portions 284a and 284b for all motor generators 287, 288 and 289 so as to reduce the number of components for providing rotors of respective motor generators 287, 288 and 289.

For convenience of description, armature windings 287a are referred to as stator 287a of motor generator 287, permanent magnets 287b on the outer peripheral surface of rotor portion 284a are referred to as rotor 287b of motor generator 287, armature windings 288a are referred to as stator 288a of motor generator 288, permanent magnets 288b on the outer peripheral surface of rotor portion 284b are referred to as rotor 288b of motor generator 288, armature windings 289a are referred to as stator 289a of motor generator 289, and permanent magnets 289b on the vertical surfaces of rotor portions 284a and 284b are referred to as rotor 289b of motor generator 289.

In multiple motor generator unit 286, motor generators 287 and 288 are radial air gap type motor generators, that is, motor generator 287 has a radial air gap between stator 287a and rotor 287b on rotor portion 284a, and motor generator 288 has a radial air gap between stator 288a and rotor 288b on rotor portion 284b. Further, in multiple motor generator unit 286, motor generator 289 disposed between radial air gap type motor generators 287 and 288 has an axial air gap between stator 289a and rotor 289b on rotor portion 284a, and has another axial air gap between stator 289a and rotor 289b on rotor portion 284b. In other words, motor generator 289 has the axial air gaps on axially opposite sides of stator 289a.

Therefore, multiple motor generator unit 286 includes three stators 287a, 288a and 289a to be supplied with electric power from battery 107 (or generator 106), thereby increasing motor output torque T. Further, axial air gap type motor generator 289 having the axial air gaps on axially opposite sides of stator 289a can output a large torque by itself. While three motor generators 287, 288 and 289 are aligned in the axial direction of rotor shaft 205, the axial deviation or vibration of rotor shaft 205 during its rotation can be reduced because radial air gap type motor generators 287 and 288 are disposed on axially inward and outward ends of multiple motor generator unit 286, and the axial length of multiple motor generator unit 286 can be reduced as a result of the arrangement of axial air gap type motor generator 289.

Wheel hub drive units F1 and F2 serving as embodiments of wheel hub drive unit F, including multiple motor generator unit MR, the speed changing transmission, reduction transmission DG, axle 4, and brake 7, will be described simply, because the structure of hub casing 301 of each of wheel hub drive units F1 and F2 is mentioned above, and the interior structure of each of wheel hub drive units F1 and F2 is combination of above-mentioned elements.

Figure 32:
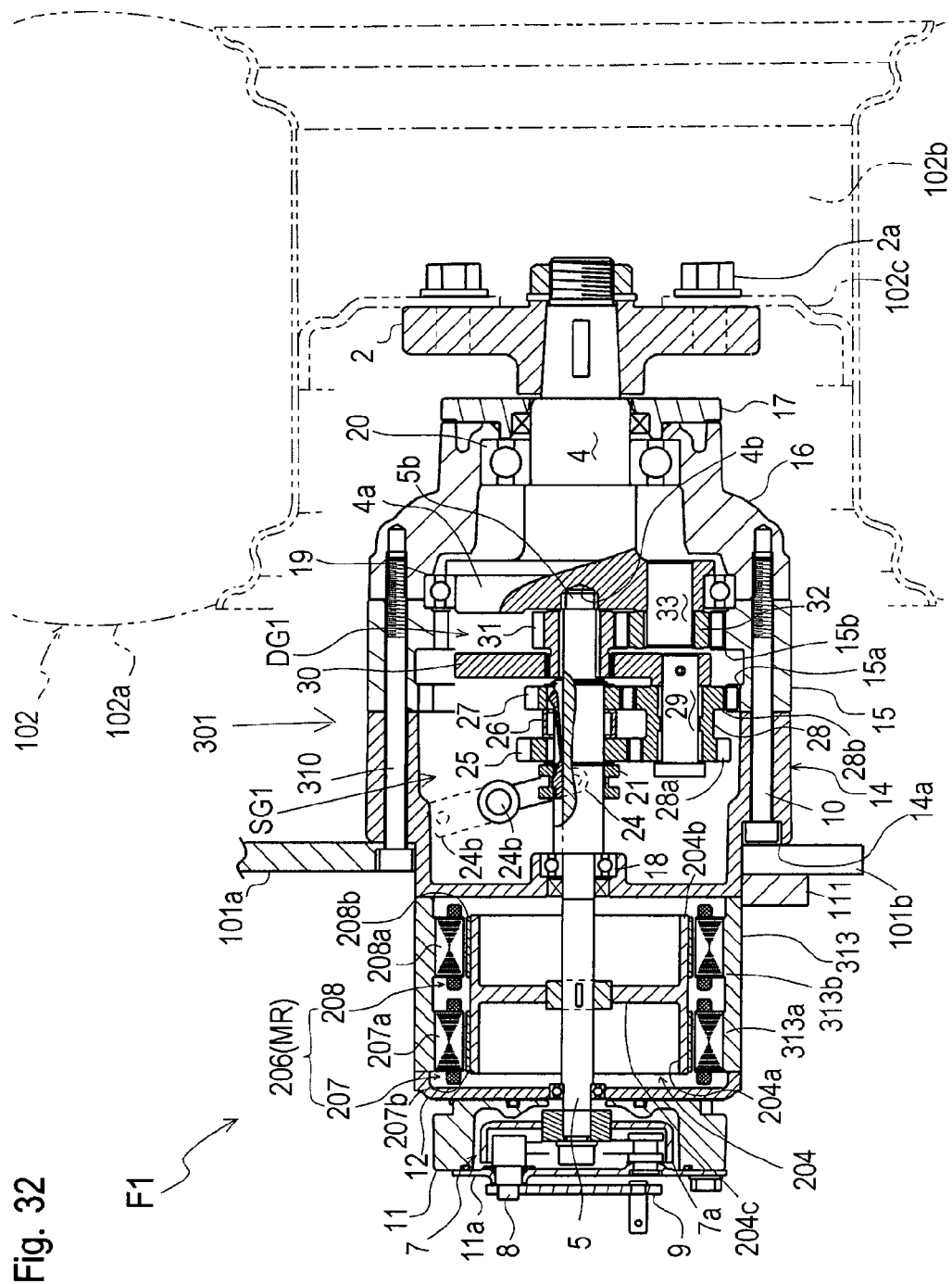
FIG. 32 is a sectional front view of wheel hub drive unit F1 serving as an embodiment of wheel hub drive unit F including multiple motor generator unit MR, a speed changing transmission, a reduction transmission and axle 4, wherein wheel hub drive unit F1 includes multiple motor generator unit 206, speed changing planetary gear transmission SG1 and reduction planetary gear transmission DG1.
Figure 33:
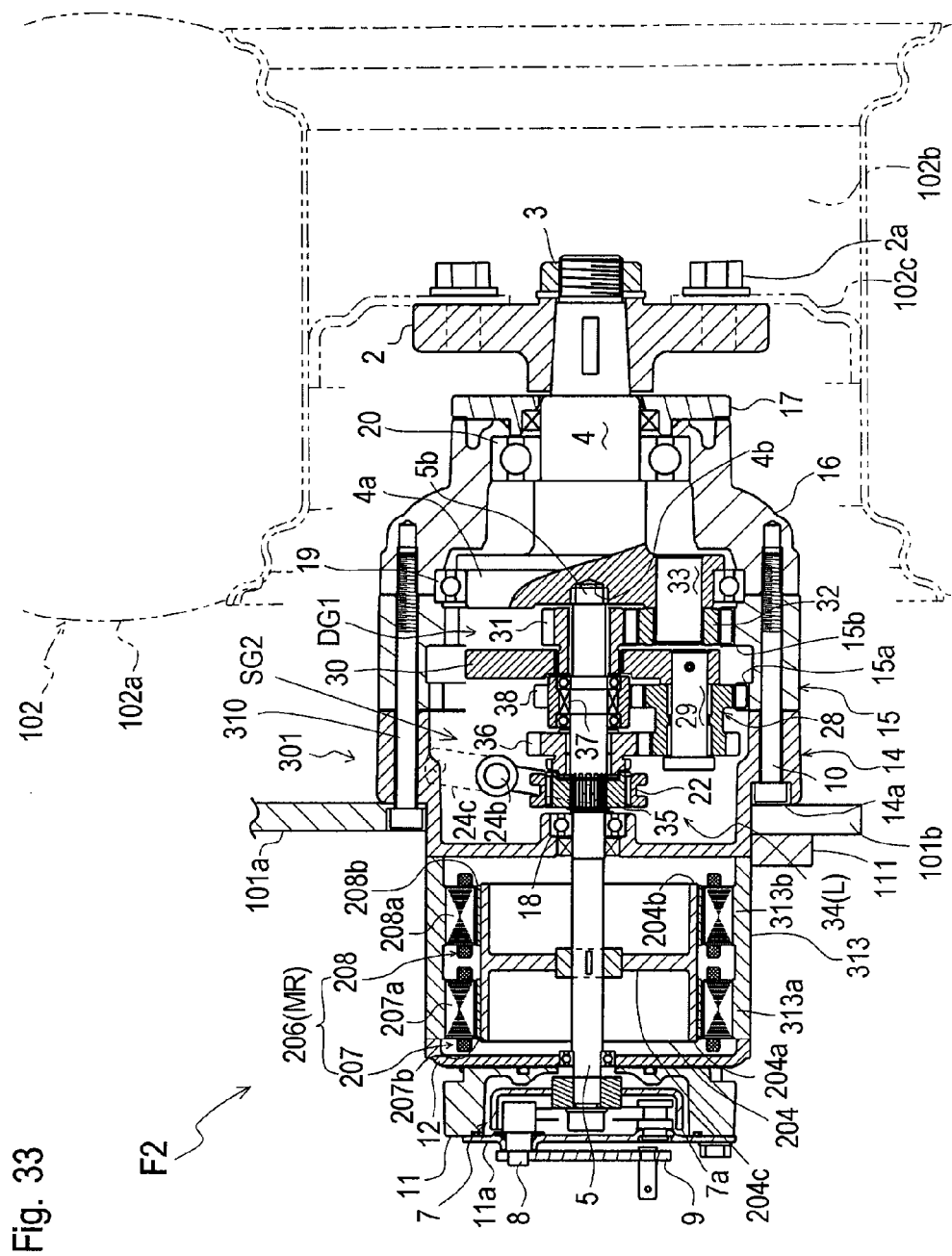
FIG. 33 is a sectional front view of wheel hub drive unit F2 serving as an embodiment of wheel hub drive unit F, wherein wheel hub drive unit F2 includes multiple motor generator unit 206, speed changing gear transmission SG2 and reduction planetary gear transmission DG1.

Referring to FIG. 32, the power train of illustrated wheel hub drive unit F1 for driving axle 4 is configured as combination of radial air gap type multiple motor generator unit 206 (serving as multiple motor generator unit MR), speed changing planetary gear transmission SG1 including three-position shiftable shifter 21, and reduction planetary gear transmission DG1 (serving as reduction transmission DG). Referring to FIG. 33, the power train of illustrated wheel hub drive unit F2 for driving axle 4 is configured as combination of radial air gap type multiple motor generator unit 206 (serving as multiple motor generator unit MR), speed changing planetary gear transmission SG2 including two-position shiftable shifter 34, and reduction planetary gear transmission DG1 (serving as reduction transmission DG).

Alternatively, any multiple motor generator unit, such as axial air gap type multiple motor generator units 266 or 276 or radial and axial air gap type multiple motor generator unit 286, may serve as multiple motor generator unit MR of wheel hub drive unit F. Any reduction transmission, such as reduction planetary gear transmission DG2, DG3 or DG4, may serve as reduction transmission DG of wheel hub drive unit F. Any speed changing transmission, such as toroidal CVT 50, may serve as the speed changing transmission of wheel hub drive unit F.

The vehicle equipped with wheel hub drive units F (e.g., F1 or F2), i.e., lawn mower 300, may be provided with a control system for manually or automatically shifting a speed state of the speed changing transmission (e.g., for controlling shifter 21 or 34 of speed changing planetary gear transmission SG1 or SG2), such as shifter control system 120, and may be provided with a motor torque control system for automatically or manually controlling motor output torque T of multiple motor generator unit MR, such as motor torque control system 202.

Therefore, wheel hub drive unit F is advantageous for expanding variation of torque and rotary speed of axle 4 because it includes a combination of multiple motor generator unit MR and the speed changing transmission.

Figure 34:
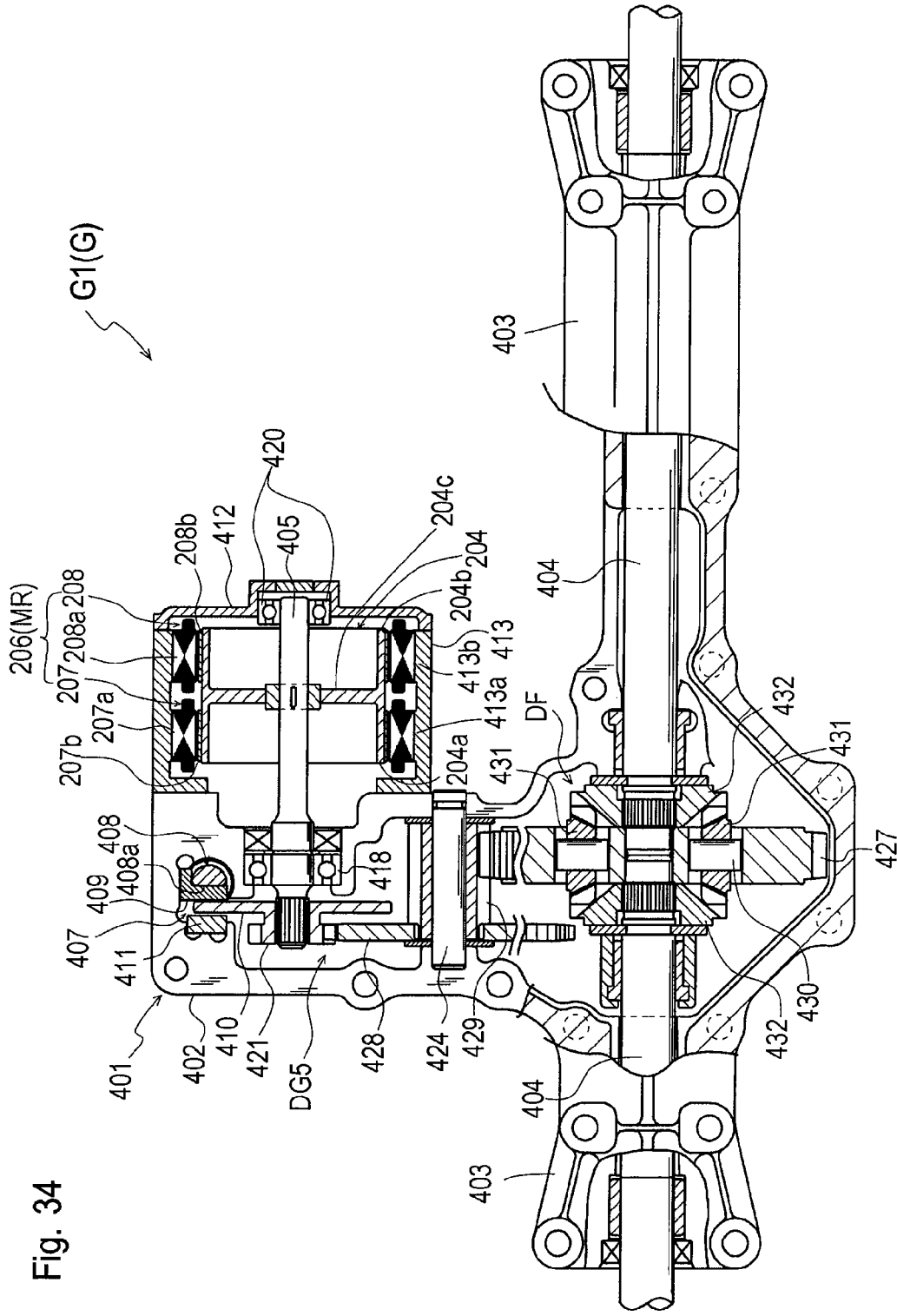
FIG. 34 is a sectional plan view of a transaxle G1 serving as an embodiment of a transaxle G including multiple motor generator unit MR, a reduction transmission, a differential unit DF and a pair of axles 404, wherein transaxle G1 includes radial air gap type multiple motor generator unit 206 having rotor shaft 405 parallel to axles 404, and includes a spur gear type reduction gear transmission DG5.

Referring to FIG. 34, a transaxle G1 serving as a representative embodiment of a transaxle G will be described, on an assumption that transaxle G is defined to include at least a pair of axles 404, a differential unit DF differentially connecting axles 404 to each other, and multiple motor generator unit MR for driving differential unit DF. Transaxle G1 includes a transaxle casing incorporating multiple motor generator unit MR, differential unit DF, and the pair of axles 404, and the transaxle casing is constituted by joining an axle housing 401 and a motor housing 413 to each other. Motor housing 413 incorporates multiple motor generator unit 206 serving as multiple motor generator unit MR, and axle housing 401 incorporates differential unit DF and supports axles 404. Illustrated axle housing 401 is formed by joining an upper housing half 403 and a lower housing half 402 (lower housing half 402 is mainly shown in FIG. 34), however, axle housing 401 may be formed in any way.

Axles 404 supported by axle housing 401 are extended horizontally and coaxially to each other, and in axle housing 401, differential unit DF differentially connects axially proximal portions of axles 404 to each other. Incidentally, in description of differential unit DF, "axial" and "axially" are defined as the axial direction of axles 4. Illustrated differential unit DF is a gear mechanism including a bull gear 427, differential pinions 431 and a pair of differential side gears 432. Bull gear 427 serves as an input gear of differential unit DF. The pair of differential side gears 432 are fixed on respective axles 404 so as to serve as output gears of differential unit DF. Axles 404 are fitted at axially proximal end portions thereof into a center axial hole of bull gear 427 rotatably relative to bull gear 427. Differential pinions 431 are pivoted in bull gear 427 via pinion shafts 430 extended radially with respect to bull gear 427, and each of differential pinions 431 meshes with both differential side gears 432. Alternatively, any type of differential unit DF may be provided only if it differentially connects axles 404 to each other.

Axle housing 401 of transaxle G1 incorporates a spur gear type reduction gear transmission DG5 for transmitting the output power of multiple motor generator unit 206 (serving as MR) to differential unit DF. Deceleration gear transmission DG5 includes a horizontal counter shaft 424, a diametrically large gear 428 and a diametrically small gear 239. Counter shaft 424 is supported by axle housing 401 so as to extend parallel to axles 404. Diametrically small gear 429 is fitted on counter shaft 424 and meshes with bull gear 427. Diametrically large gear 428 is fixed to diametrically small gear 429 and meshes with a later-discussed motor output gear 421. All gears 421, 428, 429 and 427 constituting reduction gear transmission DG5 are spur gears.

To incorporate radial air gap type multiple motor generator unit 206 serving as multiple motor generator unit MR, motor housing 413 is formed on an inner peripheral surface thereof with stator portions 413a and 413b onto which respective stators 207a and 208b, i.e., armature windings, are fixed. A rotor shaft 405, corresponding to rotor shaft 205, is journalled at one axial end thereof in motor housing 413 via a bearing 420 so as to serve as the common rotor shaft of motor generators 207 and 208. Rotor drum 204 is fixed on rotor shaft 405 so that permanent magnets 207b and 208b on rotor drum 204 face respective stators 207a and 208a, thereby constituting radial air gap type motor generators 207 and 208, serving as motor generators MR1 and MR2.

Motor housing 413 incorporating motor generators 207 and 208 is joined to axle housing 401. Motor housing 413 incorporating motor generators 207 and 208 may be an assembly detachably attached to axle housing 401. Rotor shaft 405 is extended horizontally in parallel to counter shaft 424 and axles 404, projects at the other axial end portion thereof outward from motor housing 413 joined to axle housing 401, is journalled in axle housing 401 via a bearing 418, and is fixedly provided thereon with motor output gear 421 meshing with diametrically large gear 428 of reduction gear transmission DG5.

A brake 407 is provided in axial housing 401 of transaxle D1. Brake 407 includes a vertical brake camshaft 408, a brake shoe 409, a brake rotor 410 and a brake pad 411. A portion of brake rotor 410 is disposed between brake shoe 409 and brake pad 411, and brake shoe 409 is disposed between brake camshaft 408 and the portion of brake rotor 410. Brake rotor 410 illustrated in FIG. 34 is a discoid portion formed on a central boss portion of motor output gear 421. However, any member or portion serves as brake rotor 410 only if it is rotatable integrally with rotor shaft 405 or with any rotatable portion of a power train between rotor shaft 405 and axles 404. Brake camshaft 408 is formed with a sectionally semicircular portion whose vertical flat cam surface 408a faces brake shoe 409. Brake camshaft 408 is extended outward from axle housing 401 and is operatively connected to a brake operation device, such as a brake pedal, provided on a vehicle, such as a lawn mower. In the vehicle, an actuator may be operatively connected to brake camshaft 408 and may be remotely (e.g., electrically or hydraulically) controlled according to operation of the brake operation device.

Unless the brake operation device is operated for braking, flat cam surface 408a is disposed parallel to brake shoe 409 so as to be spaced from brake shoe 409, thereby spacing brake shoe 409 from bake rotor 421a and thereby allowing rotation of rotor shaft 405 free from brake shoe 409. When the brake operation device is operated for braking, camshaft 408 is rotated so that flat cam surface 408a is slanted with respect to brake shoe 409 and pushes brake shoe 409 toward brake rotor 421a, thereby frictionally pressing brake rotor 421a between brake shoe 409 and brake pad 411, and thereby braking rotor shaft 405.

Figure 35:
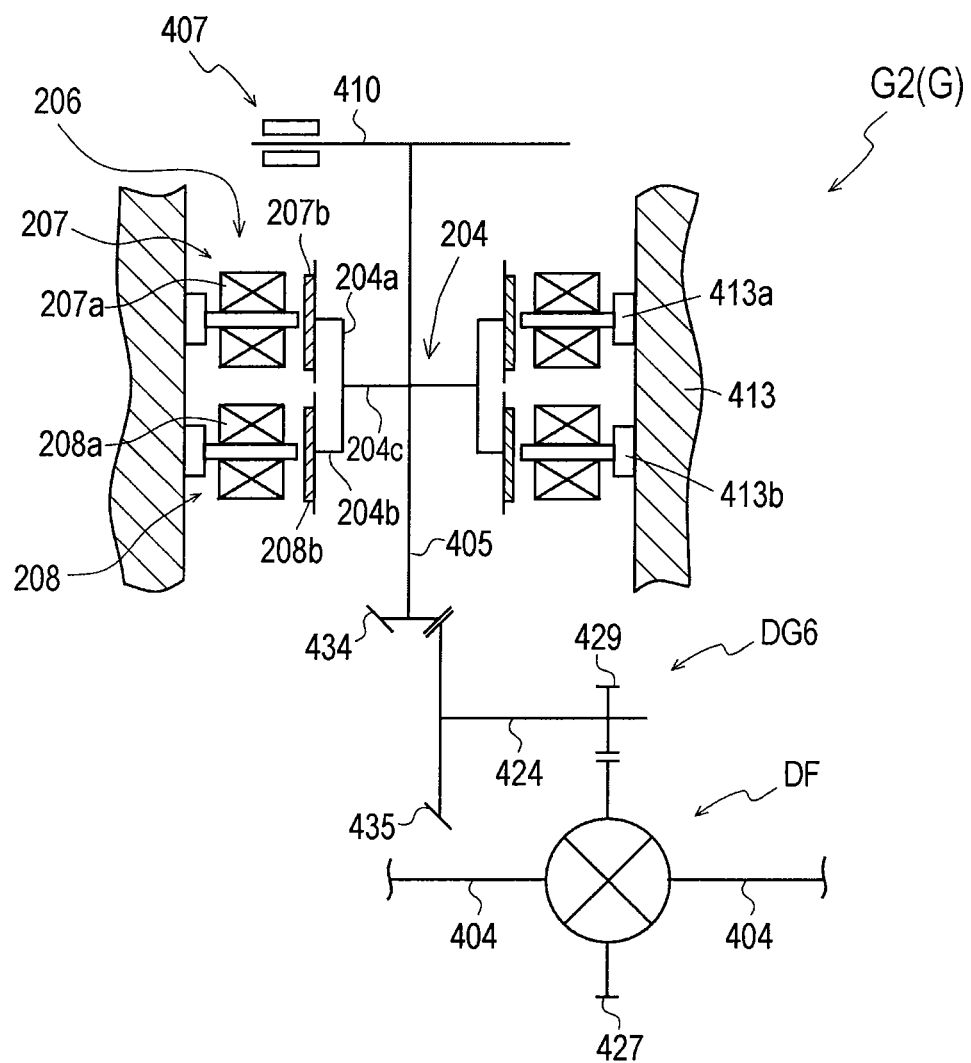
FIG. 35 is a skeleton diagram of a transaxle G2 serving as another embodiment of transaxle G, wherein transaxle G2 includes multiple motor generator unit 206 having rotor shaft 405 perpendicular to axles 404, and includes a bevel gear type reduction gear transmission DG6.

Referring to FIG. 35, a transaxle G2 serves as another embodiment of transaxle G. In transaxle G2, rotor shaft 405 is extended perpendicular to counter shaft 424, while counter shaft 424 is extended parallel to axles 404. In this regard, a bevel gear type reduction gear transmission DG6 serves as a reduction transmission of transaxle G2, and includes a bevel motor output gear 434 and a bevel diametrically large gear 435 meshing with each other. Bevel motor output gear 434 is fixed or formed on rotor shaft 405, and bevel diametrically large gear 435 is provided on counter shaft 424 so as to be rotatably integral with diametrically small gear 429.

In transaxle G2, rotor shaft 405 is extended through multiple motor generator unit 206 opposite to bevel motor output gear 434 in its axial direction, and is provided thereon with brake rotor 410 which is rotatably integral with rotor shaft 405, so as to constitute brake 407 opposite to reduction gear transmission DG6 with respect to multiple motor generator unit 206. Brake 407 may be disposed outward from motor housing 413 incorporating motor generators 207 and 208. Alternatively, brake 407 may be disposed on the side of multiple motor generator unit 206 toward reduction gear transmission DG6, so that brake 407 can be disposed in an axle housing (not shown) incorporating reduction gear transmission DG6, and differential unit DF and axles 404.

Figure 36:
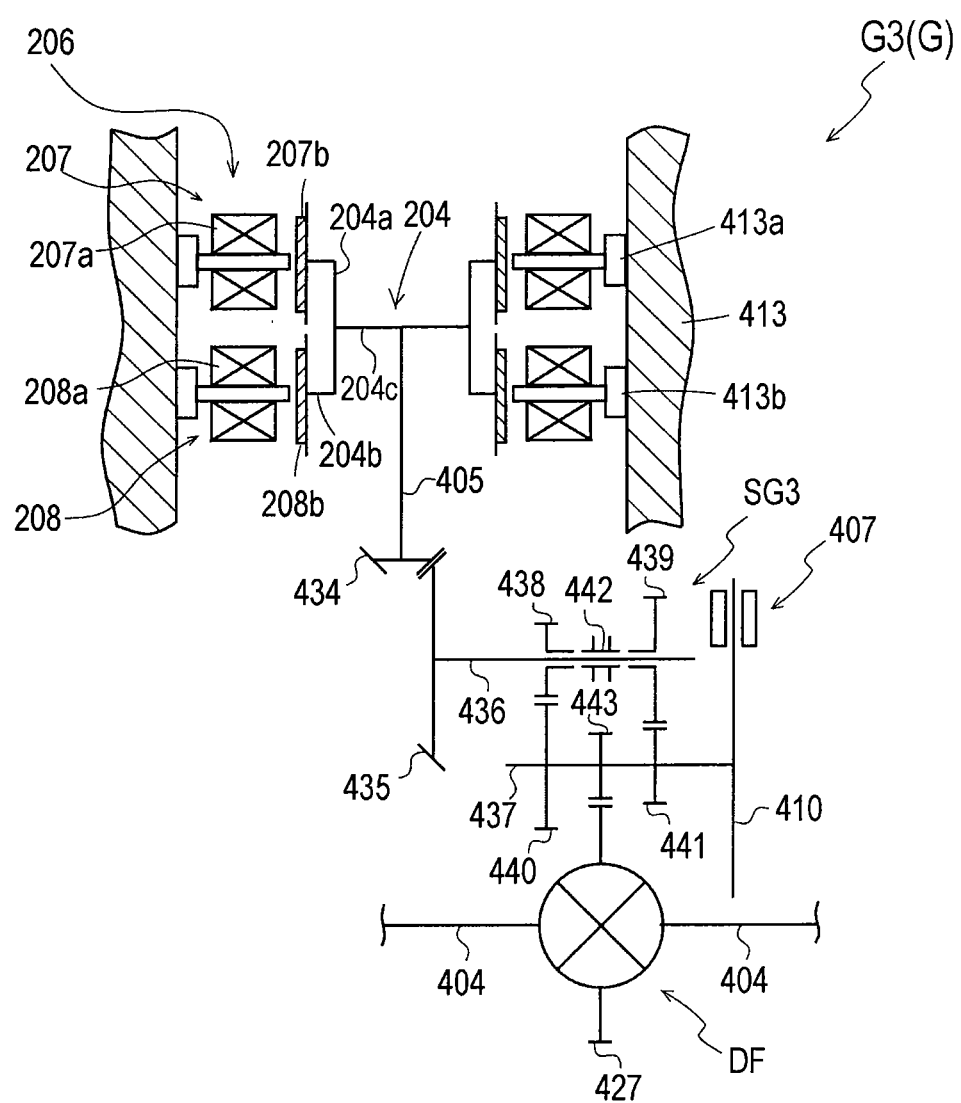
FIG. 36 is a skeleton diagram of a transaxle G3 serving as another embodiment of transaxle G, wherein transaxle G3 includes multiple motor generator unit 206 having rotor shaft 405 perpendicular to axles 404, and includes a reduction and speed changing gear transmission SG3.

Referring to FIG. 36, a transaxle G3, serving as another embodiment of transaxle G, includes a reduction and speed changing gear transmission SG3 interposed between rotor shaft 405 of multiple motor generator unit 206 and differential unit DF. Deceleration and speed changing gear transmission SG3 includes transmission shafts 436 and 437 extended parallel to axles 404. Rotor shaft 405 is extended perpendicular to transmission shafts 436 and 437 and axles 404. Bevel diametrically large gear 435, which is diametrically larger than bevel motor output gear 434, is fixed or formed on transmission shaft 436, and meshes with bevel motor output gear 434 on rotor shaft 405, so that bevel gears 434 and 435 serve as a part of a reduction gear transmission mechanism of reduction and speed changing gear transmission SG3.

A low speed drive gear 438 and a high speed drive gear 439 are provided on transmission shaft 436 rotatably relative to transmission shaft 436. A shifter 442 is provided on transmission shaft 436 between gears 438 and 439 so as to be axially slidable on transmission shaft 436 and unrotatable relative to transmission shaft 436. Shifter 442 is shiftable among a low speed position, a neutral position and a high speed position according to its axial slide on transmission shaft 436. Shifter 442 set at the low speed position meshes with low speed drive gear 438 so as to transmit power from transmission shaft 436 to low speed drive gear 438. Shifter 442 set at the high speed position meshes with high speed drive gear 439 so as to transmit power from transmission shaft 436 to high speed drive gear 439. Shifter 442 set at the neutral position is separated from gears 438 and 439 so as to isolate gears 438 and 439 from the rotation power of transmission shaft 436.

A low speed driven gear 440 and a high speed driven gear 441 are fixed on transmission shaft 437 and mesh with respective drive gears 438 and 439. Low speed gears 438 and 440 mesh with each other so as to serve as a low speed gear train. High speed gears 439 and 441 mesh with each other so as to serve as a high speed gear train. A final pinion 443 is fixed on transmission shaft 437 and meshes with bull gear 427 of differential unit DF, so that transmission shaft 437 receives the rotary power of rotor shaft 405 via either the selected low or high speed gear train, and transmits the power to differential unit DF via final pinion 443. Final pinion 443 and bull gear 427 meshing with each other serve as another part of the reduction gear transmission mechanism of reduction and speed changing gear transmission SG3. Brake rotor 410 is fixed or formed on transmission shaft 437 so as to constitute brake 407 for braking transmission shaft 437.

Figure 37:
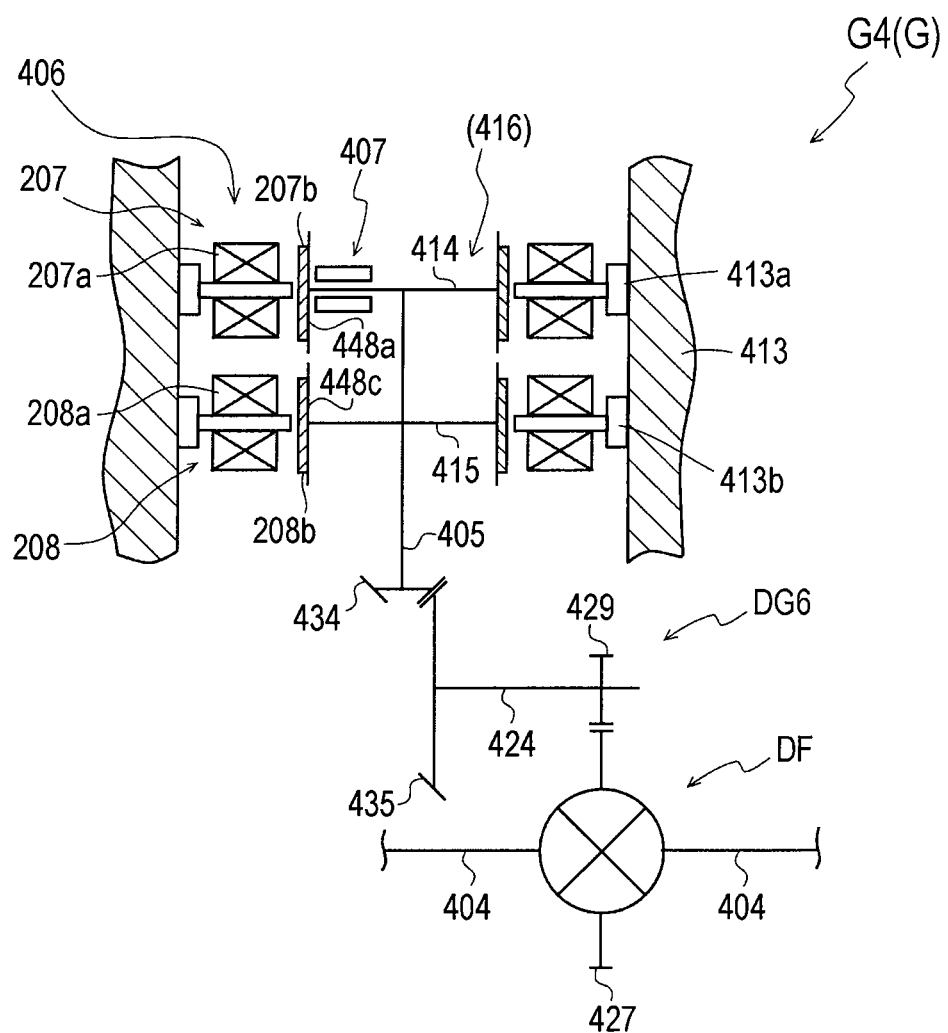
FIG. 37 is a skeleton diagram of a transaxle G4 serving as another embodiment of transaxle wherein transaxle G4 includes multiple motor generator unit 206 having rotor shaft 405 perpendicular to axles 404, includes a brake 407 disposed in multiple motor generator unit 206, and includes reduction gear transmission DG6.

Referring to FIG. 37, a transaxle G4, serving as another embodiment of transaxle G, includes a radial air gap type multiple motor generator unit 406 serving as multiple motor generator unit MR, and includes bevel gear type reduction gear transmission DG6 interposed between multiple motor generator unit 406 and differential unit DF, similar to transaxle G2. Multiple motor generator unit 406 includes radial air gap type motor generators 207 and 208, similar to those of multiple motor generator unit 206. Multiple motor generator unit 406 further incorporates brake 407. In this regard, rotor discs 414 and 415 are fixed on rotor shaft 405 so as to extend radially from rotor shaft 405, and are formed on respective outer peripheral ends thereof with respective rotor portions 414a and 415a. A single rotor member 416 formed integrally with rotor discs 414 and 415 may be fixed on rotor shaft 405. Permanent magnets 207b are fixed on an outer peripheral surface of rotor portion 414a so as to face stator (armature windings) 207a, thereby constituting radial air gap type motor generator 207. Permanent magnets 208b are fixed on an outer peripheral surface of rotor portion 415a so as to face stator (armature windings) 208a, thereby constituting radial air gap type motor generator 208. One of rotor discs 414 and 415 (in this embodiment, rotor disc 414) serves as brake rotor 410, and components of brake 407, such as brake shoe 409, are disposed adjacent to rotor disc 414 serving as brake rotor 410.

Figure 38:
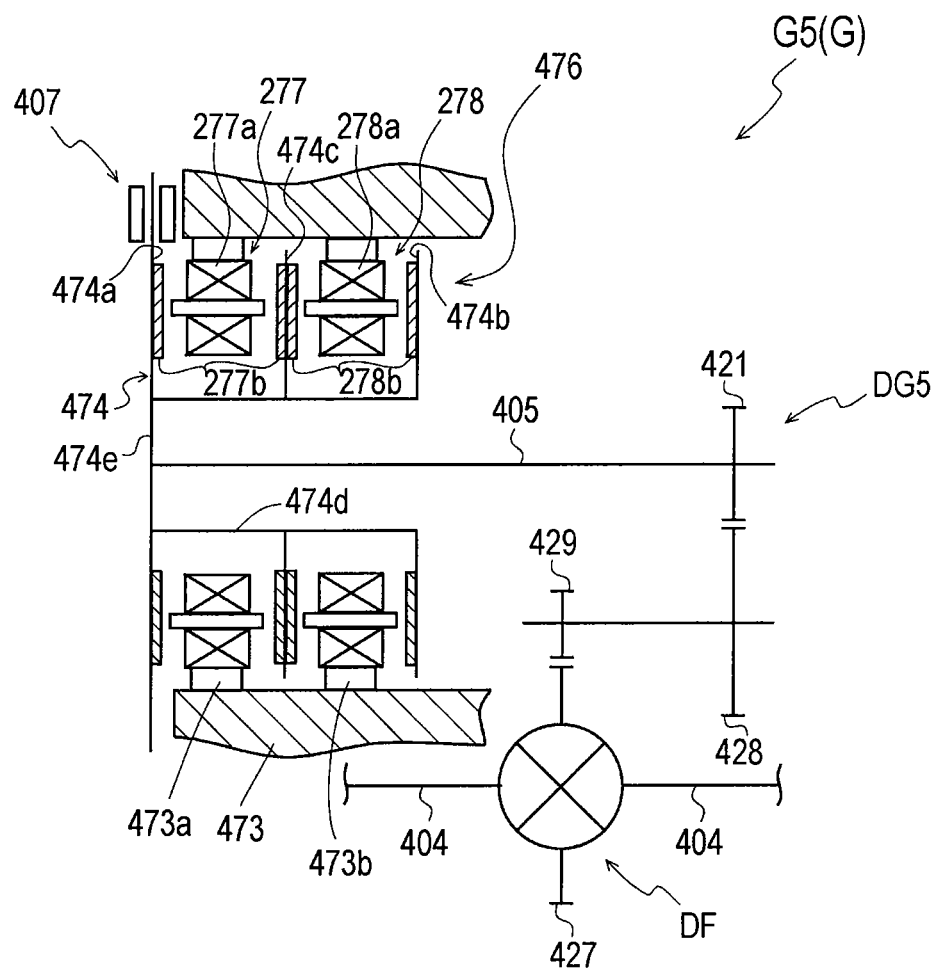
FIG. 38 is a schematic diagram of a transaxle G5 serving as another embodiment of transaxle G, wherein transaxle G5 includes axial air gap type multiple motor generator unit 276 having rotor shaft 405 parallel to axles 404, and includes reduction gear transmission DG5.

Referring to FIG. 38, a transaxle G4, serving as another embodiment of transaxle G, includes an axial air gap type multiple motor generator unit 476 serving as multiple motor generator unit MR. Multiple motor generator unit 476 includes axial air gap type motor generators 277 and 278, each of which stator 277a or 278a has axial air gaps on axially opposite sides thereof. Incidentally, here, "axial" and "radial" are defined with respect to the axis of rotor shaft 405. A motor housing 473 incorporating multiple motor generator unit 476 is formed on an inner peripheral surface thereof with stator portions 473a and 473b, and stators 277a and 278a are fixed on respective stator portions 473a and 473b.

A rotor drum 474 is fixed on rotor shaft 405. More specifically, a center portion 474e of rotor drum 474 is fixed on rotor shaft 405 and is extended radially from rotor shaft 405. Rotor drum 474 is formed with a cylindrical portion 474*d* on an outer peripheral end of center portion 474*e*. Cylindrical portion 474*d* is axially extended around rotor shaft 405, and discoid rotor portions 474*a*, 474*c* and 474*b* are extended radially outward from cylindrical portion 474*d*. Permanent magnets 277*b* are fixed on surfaces of respective rotor portions 474*a* and 474*c* so as to face stator (armature windings) 277*a* therebetween, thereby constituting axial air gap type motor generator 277. Permanent magnets 278*b* are fixed on surfaces of rotor portions 474*c* and 474*b* so as to face stator (armature windings) 278*a* therebetween, thereby constituting axial air gap type motor generator 278.

Rotor portions 474*c* and 474*b* are disposed in motor housing 473 so as to extend toward the inner peripheral surface of motor housing 473. Rotor portion 474*a* is disposed outward from motor housing 473 and is further extended radially outward from permanent magnets 277*b* thereon so as to serve as brake rotor 410. Components of brake 407, such as brake shoe 409, are disposed adjacent to rotor portion 474*a* so as to constitute brake 407.

In transaxle G5, rotor shaft 405 is extended parallel to counter shaft 424, and spur gear type reduction gear transmission DG5, including spur gears 421, 428, 429 and 427 and counter shaft 424, is interposed between rotor shaft 405 and differential unit DF.

Figure 39:
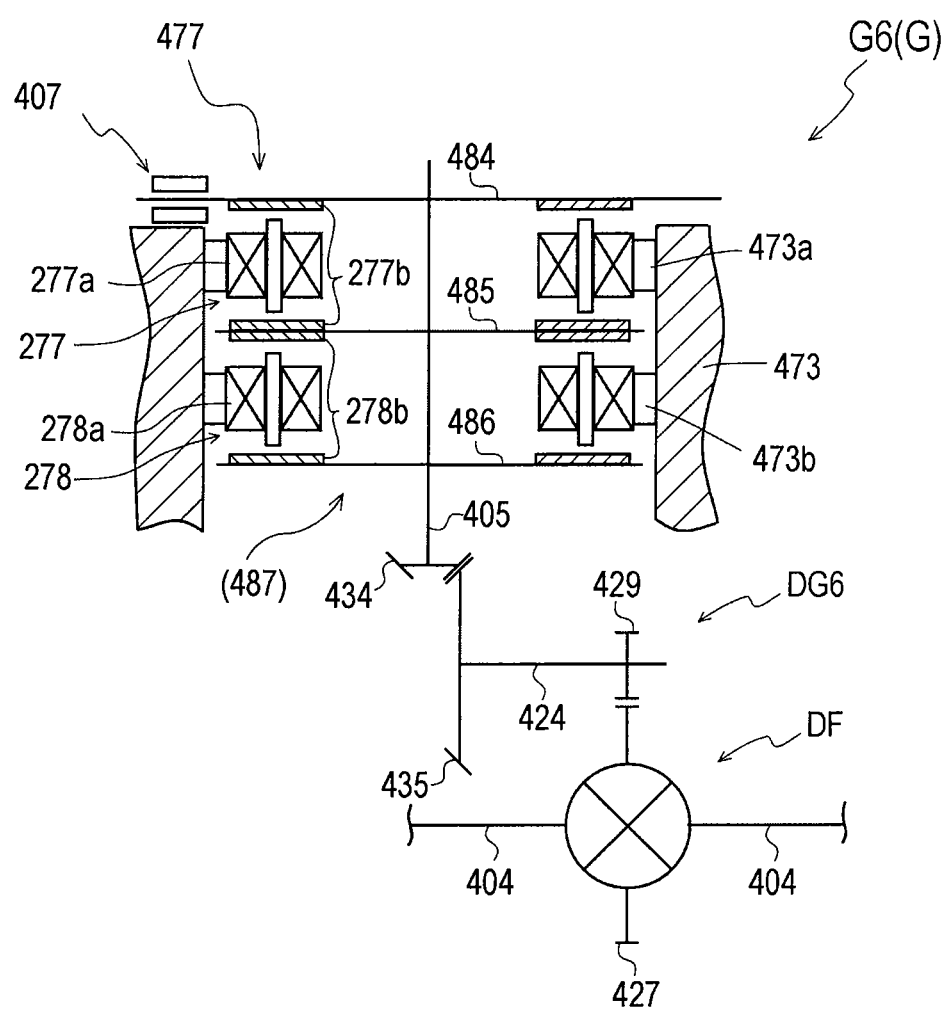
FIG. 39 is a schematic diagram of a transaxle G6 serving as another embodiment of transaxle G, wherein transaxle G6 includes multiple motor generator unit 276 having rotor shaft 405 perpendicular to axles 404, and includes reduction gear transmission DG6.

Referring to FIG. 39, a transaxle G6, serving as another embodiment of transaxle includes an axial air gap type multiple motor generator unit 477 serving as multiple motor generator unit MR. Multiple motor generator unit 477 includes axial air gap type motor generators 277 and 278, each of which stator 277*a* or 278*a* has axial air gaps on axially opposite sides thereof. Incidentally, here, "axial" and "radial" are defined with respect to the axis of rotor shaft 405. Stators 277*a* and 278*a* are fixed on respective stator portions 473*a* and 473*b* of motor housing 473. Rotor discs 484, 485 and 486 are fixed on rotor shaft 405, and are extended radially outward from rotor shaft 405. A single rotor member 487 formed integrally with rotor discs 484, 485, 486 may be fixed on rotor shaft 405. Permanent magnets 277*b* are fixed on surfaces of respective rotor discs 484 and 485 so as to face stator (armature windings) 277*a* therebetween, thereby constituting axial air gap type motor generator 277. Permanent magnets 278*b* are fixed on surfaces of rotor discs 485 and 486 so as to face stator (armature windings) 278*a* therebetween, thereby constituting axial air gap type motor generator 278.

Rotor discs 485 and 486 are disposed in motor housing 473 so as to extend toward the inner peripheral surface of motor housing 473. Rotor disc 484 is disposed outward from motor housing 473 and is further extended radially outward from permanent magnet 277*b* thereon so as to serve as brake rotor 410. Components of brake 407, such as brake shoe 409, are disposed adjacent to rotor disc 484 so as to constitute brake 407.

In transaxle G6, rotor shaft 405 is extended perpendicular to counter shaft 424, and bevel gear type reduction gear transmission DG6, including bevel gears 434 and 435, spur gears 429 and 427 and counter shaft 424, is interposed between rotor shaft 405 and differential unit DF.

It is further understood by those skilled in the art that the foregoing description is a preferred embodiment of the disclosed apparatus and that various changes and modifications may be made in the invention without departing from the scope thereof defined by the following claims.

For example, each of illustrated lawn mowers 100, 200 and 300 is equipped with engine 105 serving as a prime mover for driving generator 106 for supplying electric power to the motors. However, a vehicle equipped with the illustrated transaxle or transaxles including the electric motor or motors can be a purely electric vehicle equipped with only a chargeable battery for supplying electric power to the motor or motors.

What is claimed is:

1. A transaxle comprising:
 an axle; and
 a multiple motor generator unit including first and second motor generators for driving the axle, the multiple motor generator unit including:
 a common rotor shaft drivingly connected to the axle,
 armature windings serving as a first stator and a second stator aligned opposite each other in the axial direction of the rotor shaft,
 a common rotor member, wherein the rotor shaft serves as a rotary axis of the rotor member and is rotatably integral with the rotor member, and
 permanent magnets provided on the common rotor member, so as to serve as a first rotor facing the first stator, and a second rotor facing the second stator,
 wherein the first stator and the first rotor constitute the first motor generator,
 wherein the second stator and the second rotor constitute the second motor generator,
 wherein the first stator and the second stator can be independently supplied with electric power so that, when at least one of the first and second stators is supplied with electric power, the corresponding first or second motor generator functions as a motor and outputs a torque to rotate the rotor member and the rotor shaft, and
 wherein a total motor output torque of the first and second motor generators for rotating the rotor member and the rotor shaft can be changed in correspondence to a load applied from the axle to the rotor shaft.

2. The transaxle according to claim 1, wherein the transaxle is equipped on a vehicle having a drive wheel drivingly connected to the axle, and wherein a torque applied from the drive wheel to the rotor shaft is detected to be recognized as the load.

3. The transaxle according to claim 1, wherein the transaxle is equipped on a vehicle having a drive wheel drivingly connected to the axle, and wherein an actual traveling speed of the vehicle is detected as a vehicle traveling speed, and an actual rotary speed of the drive wheel is detected as a wheel rotary speed, so that a ratio of a difference between the vehicle traveling speed and the wheel rotary speed to the vehicle traveling speed is recognized as the load.

4. The transaxle according to claim 1, wherein the multiple motor generator unit is automatically shiftable between a single motor driving mode, where only the first stator is supplied with electric power to rotate the rotor member, and a double motor driving mode, where both the first and second stators are supplied with electric power to rotate the rotor member, so as to correspond to the load, and wherein, when the multiple motor generator unit is set in the single motor driving mode, the second motor generator can function as a regenerator.

5. The transaxle according to claim 4, wherein the multiple motor generator unit can be also manually shifted between the single motor driving mode and the double motor driving mode.

6. The transaxle according to claim 4, wherein the transaxle is equipped on a vehicle having an accelerator to be operated for changing a traveling speed of the vehicle, and wherein the multiple motor generator unit is set in the double motor driving mode when an operation degree of the accelerator is not zero and when the load exceeds a threshold value.

7. The transaxle according to claim 4, wherein the transaxle is equipped on a vehicle having an accelerator to be operated for changing a traveling speed of the vehicle, and having a steering operation device to be operated for turning of the vehicle, and wherein the multiple motor generator unit is set in the double motor driving mode when an operation degree of the accelerator is not zero and when an operation degree of the steering operation device exceeds a threshold value.

8. The transaxle according to claim 4, wherein the transaxle is equipped on a vehicle having an accelerator to be operated for changing a traveling speed of the vehicle, and having a steering operation device to be operated for turning of the vehicle, wherein while an operation degree of the accelerator is not zero, the multiple motor generator unit is set in the double motor driving mode when the load exceeds its threshold value or when an operation degree of the steering operation device exceeds its threshold value, and wherein while the operation degree of the accelerator is not zero, the multiple motor generator unit is set in the single motor driving mode when the load does not exceed its threshold value and when the operation degree of the steering operation device does not exceed its threshold value.

9. The transaxle according to claim 4, wherein the transaxle is equipped on a vehicle having an accelerator to be operated for changing a traveling speed of the vehicle, and wherein, while an operation degree of the accelerator is zero, neither the first stator nor the second stator is supplied with electric power for rotating the rotor member, and at least one of the first and second motor generators can function as a regenerator.

10. The transaxle according to claim 4, wherein a capacity of the first motor generator for driving the rotor member is larger than a capacity of the second motor generator for driving the rotor member.

11. The transaxle according to claim 1, wherein the multiple motor generator unit includes an axial air gap type motor generator, in which its stator, its rotor and an air gap between the stator and the rotor are aligned in the axial direction of the rotor shaft, so as to serve as at least one of the first and second motor generators.

12. The transaxle according to claim 11, wherein both the first and second motor generators are axial air gap type motor generators, wherein the rotor member is formed with a portion having axially opposite surfaces between the first and second stators, wherein the permanent magnet serving as the first rotor is provided on one of the surfaces of the portion of the rotor member so as to face the first stator, and wherein the permanent magnet serving as the second rotor is provided on the other of the surfaces of the portion of the rotor member so as to face the second stator.

13. The transaxle according to claim 11, wherein the multiple motor generator unit further includes a radial air gap type motor generator, in which its stator, its rotor and an air gap between the stator and the rotor are aligned radially with respect to the rotor shaft, so as to serve as at least one of the first and second motor generators.

14. The transaxle according to claim 1, wherein the transaxle further comprises a brake including a brake rotor disposed on the rotor shaft.

15. The transaxle according to claim 1, wherein the transaxle further comprises a brake including a brake rotor constituted by a part of the rotor member.

16. The transaxle according to claim 1, wherein the transaxle further comprises a speed changing transmission interposed between the rotor shaft and the axle so as to transmit power from the rotor shaft to the axle.

17. The transaxle according to claim 1, wherein the axle and the rotor shaft are coaxial to each other, and wherein the transaxle further comprises a reduction transmission interposed between the rotor shaft and the axle so as to power from the rotor shaft to the axle.

18. The transaxle according to claim 17, wherein the transaxle further comprises a casing incorporating both the multiple motor generator unit and the reduction transmission.

19. The transaxle according to claim 1, wherein the transaxle serves as a wheel hub drive unit including a single axle to be connected to a hub of a drive wheel of a vehicle, and wherein at least a part of the transaxle is disposed in a rim of the drive wheel.

20. The transaxle according to claim 1, wherein the axle is paired, and wherein the transaxle further comprises a differential unit differentially connecting the pair of axles to each other.

* * * * *